(12) United States Patent
Lee et al.

(10) Patent No.: US 10,484,526 B2
(45) Date of Patent: Nov. 19, 2019

(54) METHOD FOR PROVIDING CONTENTS CORRESPONDING TO ACCESSORY DEVICES AND ELECTRONIC DEVICE THEREOF

(71) Applicant: Samsung Electronics Co., Ltd., Suwon-si, Gyeonggi-do (KR)

(72) Inventors: Jae-Wook Lee, Suwon-si (KR); Jung-Hun Kim, Suwon-si (KR); Seung Woo Park, Seongnam-si (KR); Young Ho Rhee, Yongin-si (KR); Kihuk Lee, Suwon-si (KR); Cheolho Cheong, Seoul (KR); Chang-Ryong Heo, Suwon-si (KR); Hochul Hwang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/940,095

(22) Filed: Mar. 29, 2018

(65) Prior Publication Data

US 2018/0288208 A1 Oct. 4, 2018

(30) Foreign Application Priority Data

Mar. 31, 2017 (KR) ........................ 10-2017-0042286

(51) Int. Cl.
*H04B 1/38* (2015.01)
*H04M 1/725* (2006.01)
(Continued)

(52) U.S. Cl.
CPC ...... *H04M 1/72527* (2013.01); *G06F 1/1683* (2013.01); *G06F 21/44* (2013.01);
(Continued)

(58) Field of Classification Search
CPC ......... H04M 1/72527; H04M 1/72575; H04M 1/7253; G06F 1/1683; G06F 21/44; G06F 21/73
See application file for complete search history.

(56) References Cited

U.S. PATENT DOCUMENTS

| 8,898,348 B2 * | 11/2014 | Minoo ................. G06F 1/1632 320/107 |
| 2006/0156415 A1 * | 7/2006 | Rubinstein ............ G06F 21/445 726/27 |

(Continued)

FOREIGN PATENT DOCUMENTS

| CN | 106973166 A | 7/2017 |
| EP | 2 549 722 A1 | 1/2013 |

(Continued)

*Primary Examiner* — Tuan Pham
(74) *Attorney, Agent, or Firm* — Jefferson IP Law, LLP

(57) ABSTRACT

A method for providing contents corresponding to accessory devices and an electronic device thereof are disclosed. The electronic device includes a communication interface, at least one processor configured to be connected to the communication interface, and a memory connected to the at least one processor. The memory may store instructions that instruct the at least one processor to perform validity check on a first accessory device in response to detection of mounting of the first accessory device, determine a first content corresponding to the first accessory device, and provide a second content corresponding to a combination of the first accessory device and a second accessory device having an association relationship with the first accessory device, in response to detection of mounting of the second accessory device.

13 Claims, 56 Drawing Sheets

(51) Int. Cl.
*G06F 1/16* (2006.01)
*G06F 21/44* (2013.01)
*G06F 21/73* (2013.01)

(52) U.S. Cl.
CPC ........ *G06F 21/73* (2013.01); *H04M 1/72575* (2013.01); *H04M 1/7253* (2013.01)

(56) References Cited

U.S. PATENT DOCUMENTS

| | | |
|---|---|---|
| 2011/0145444 A1 | 6/2011 | Dai |
| 2011/0185048 A1 | 7/2011 | Yew et al. |
| 2016/0241687 A1 | 8/2016 | Son |
| 2017/0097791 A1* | 4/2017 | Sato ........................ G06F 3/061 |

FOREIGN PATENT DOCUMENTS

| | | |
|---|---|---|
| EP | 3 018 888 A1 | 5/2016 |
| KR | 10-2013-0067720 A | 6/2013 |
| KR | 10-2016-0026318 A | 3/2016 |
| KR | 10-2016-0100674 A | 8/2016 |
| WO | 2016/021885 A1 | 2/2016 |

\* cited by examiner

WELCOME

LOCK SCREEN

THEME

VIDEO VIEWER

GOODBYE

METHOD FOR PROVIDING CONTENTS CORRESPONDING TO ACCESSORY DEVICES AND ELECTRONIC DEVICE THEREOF

CROSS-REFERENCE TO RELATED APPLICATION(S)

This application is based on and claims priority under 35 U.S.C. § 119 to Korean Patent Application No. 10-2017-0042286, filed on Mar. 31, 2017, in the Korean Intellectual Property Office, the disclosure of which is incorporated by reference herein in its entirety.

TECHNICAL FIELD

The disclosure relates to an apparatus and method for providing contents corresponding to a plurality of accessory devices in an electronic device.

BACKGROUND

With the development of information communication technology and semiconductor technology, electronic devices are being developed as multimedia devices providing various multimedia services. For example, the electronic devices can provide various multimedia services such as a voice call service, a message service, a broadcast service, a wireless Internet service, a camera service, a sound reproduction service, and the like.

As such electronic devices provide the multimedia services, use thereof has increased. As widespread use of such electronic devices increases, users of the electronic device may use an accessory device that is installed in an interlocking manner with the electronic device to enhance the appearance of the electronic device or to utilize various additional functions. For example, a user may use an accessory device in the form of a cover that is mounted to enclose a part or all of the electronic device.

The electronic device may provide an application corresponding to the accessory device to meet various user needs as widespread use of accessory devices continues to increase. For example, the electronic device may change a wallpaper, a lock screen, or a user interface to correspond to the accessory device connected to the electronic device.

However, it is inconvenient for the user of the electronic device to have to search for and install an application corresponding to the accessory device in order to provide the corresponding application. In addition, the provider of the accessory device may incur the burden of separately providing the user with an instruction manual for the accessory device in order for the user to recognize the application that is interlocked with the corresponding accessory device.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide an apparatus and method for providing a content corresponding to an accessory device connected to an electronic device in the electronic device based on a content control policy corresponding to the accessory device.

In accordance with an aspect of the disclosure, an electronic device is provided. The electronic device includes a communication interface, at least one processor configured to be connected to the communication interface, and a memory connected to the at least one processor, wherein the memory stores instructions that instruct the at least one processor to perform validity check on a first accessory device in response to detection of mounting of the first accessory device, determine a first content corresponding to the first accessory device, and provide a second content corresponding to a combination of the first accessory device and a second accessory device having an association relationship with the first accessory device, in response to detection of mounting of the second accessory device.

In accordance with another aspect of the disclosure, an accessory device is provided. The accessory device includes a sensor association device configured to stimulate a sensor provided in an electronic device, a communication interface configured to transmit accessory-related information to the electronic device, and at least one processor configured to control a connection state between the communication interface and an antenna.

In accordance with another aspect of the disclosure, a system for providing a content is provided. The system includes at least one server configured to manage the content and information about accessory devices, a first accessory device configured to be mountable to an electronic device, a second accessory device configured to have an association relationship with the first accessory device. The electronic device is configured to perform a validity check on the first accessory device by interworking with the at least one server when the first accessory device is mounted, determine a first content corresponding to the first accessory device from the at least one server, perform a validity check on the second accessory device by interworking with the at least one server when the second accessory device is mounted, and determine a second content corresponding to a combination of the first accessory device and the second accessory device from the at least one server.

In accordance with another aspect of the disclosure, an operation method of an electronic device is provided. The operation method includes performing a validity check on a first accessory device in response to detection of mounting of the first accessory device, determining a first content corresponding to the first accessory device, performing a validity check on a second accessory device having an association relationship with the first accessory device, in response to detection of mounting of the second accessory device, and providing a second content corresponding to a combination of the first accessory device and the second accessory device.

As described above, the electronic device according to various embodiments may manage contents or functions associated with services (for example, a user interface (UI) theme change, customized advertisement, game item, camera function, social network service (SNS) function, chatbot, translation service, speech recognition-based secretarial service, multimedia content play, content update, or message transmission/reception, etc.) corresponding to an accessory device according to a service policy of the content, thereby providing the contents or functions included in the services corresponding to the accessory device, and providing users with various useful experiences.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components, and structures.

DETAILED DESCRIPTION

Figure 1:
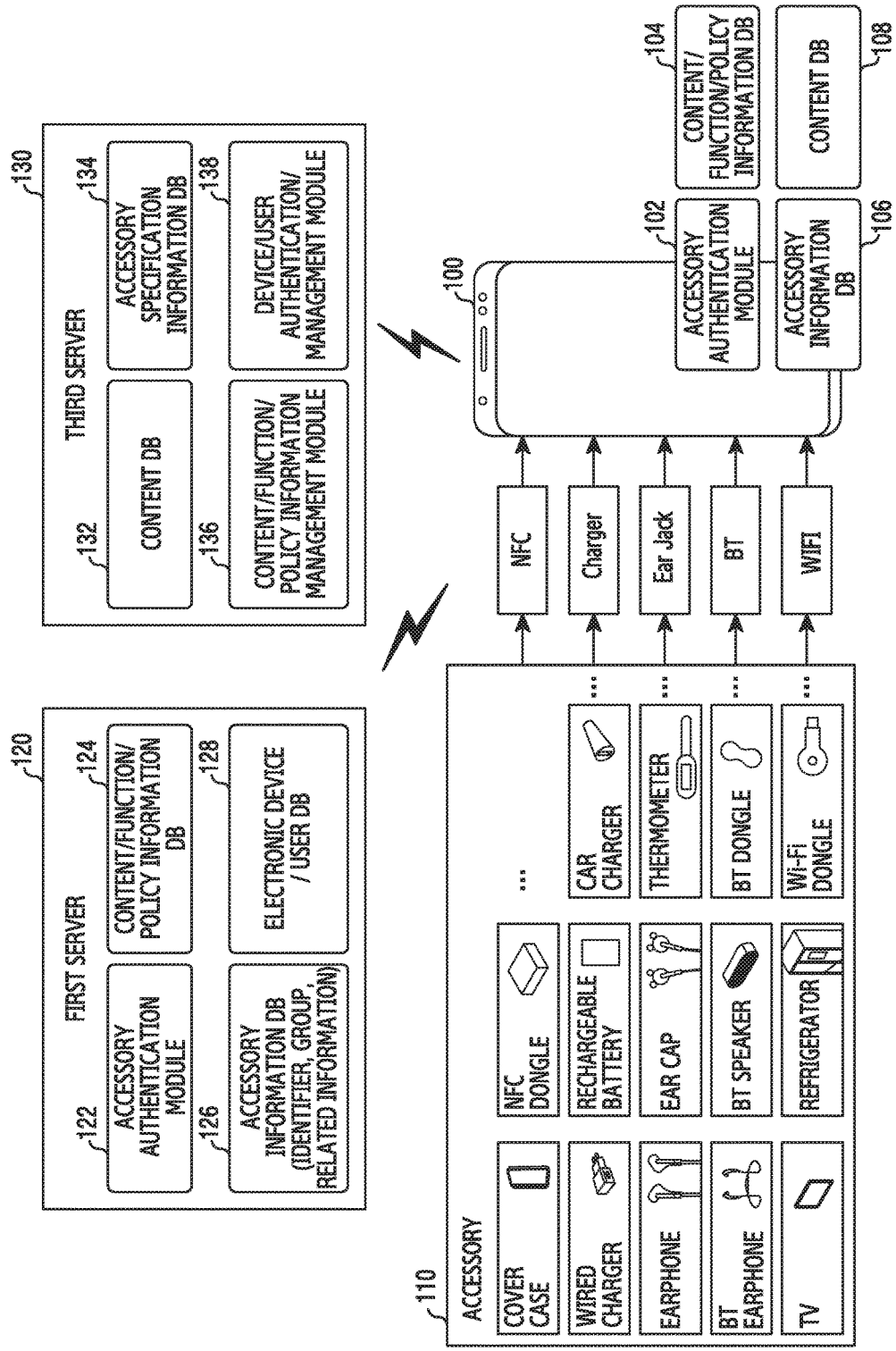
FIG. 1 illustrates the configuration of a system for providing a service corresponding to an accessory device according to various embodiments of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The expression "configured to" as used in various embodiments of the disclosure may be interchangeably used with, for example, "suitable for", "having the capacity to", "designed to", "adapted to", "made to", or "capable of" in terms of hardware or software, according to circumstances. Alternatively, in some situations, the expression "device configured to" may mean that the device, together with other devices or components, "is able to". For example, the phrase "processor adapted (or configured) to perform A, B, and C" may mean a dedicated processor (e.g., embedded processor) only for performing the corresponding operations or a generic-purpose processor (e.g., central processing unit (CPU) or application processor (AP)) that can perform the corresponding operations by executing one or more software programs stored in a memory device.

An electronic device according to various embodiments of the disclosure may include at least one of, for example, a smart phone, a tablet personal computer (PC), a mobile phone, a video phone, an electronic book reader (e-book reader), a desktop PC, a laptop PC, a netbook computer, a workstation, a server, a personal digital assistant (PDA), a portable multimedia player (PMP), a motion picture experts group-1 audio layer-3 (MP3) player, a mobile medical device, a camera, and a wearable device. According to various embodiments, the wearable device may include at least one of an accessory type (e.g., a watch, a ring, a bracelet, an anklet, a necklace, a pair of glasses, a contact lens, or a head-mounted device (HMD)), a fabric or clothing integrated type (e.g., an electronic clothing), a body-mounted type (e.g., a skin pad, or tattoo), and a bio-implantable type (e.g., an implantable circuit).

In some embodiments, the electronic device may include at least one of, for example, a television (TV), a digital versatile disc (DVD) player, an audio, a refrigerator, an air conditioner, a vacuum cleaner, an oven, a microwave oven, a washing machine, an air cleaner, a set-top box, a home automation control panel, a security control panel, a TV box (e.g., Samsung HomeSync™, Apple TV™, or Google TV™), a game console (e.g., Xbox™ and PlayStation™), an electronic dictionary, an electronic key, a camcorder, and an electronic photo frame.

In other embodiments, the electronic device may include at least one of various medical devices (e.g., various portable medical measuring devices (a blood glucose monitoring device, a heart rate monitoring device, a blood pressure measuring device, a body temperature measuring device, etc.), a magnetic resonance angiography (MRA), a magnetic resonance imaging (MRI), a computed tomography (CT) machine, and an ultrasonic machine), a navigation device, a global positioning system (GPS) receiver, an event data recorder (EDR), a flight data recorder (FDR), a vehicle infotainment devices, an electronic devices for a ship (e.g., a navigation device for a ship, and a gyro-compass), avionics, security devices, an automotive head unit, a robot for home or industry, an automatic teller's machine (ATM) in banks, point of sales (POS) in a shop, or internet device of things (e.g., a light bulb, various sensors, electric or gas meter, a sprinkler device, a fire alarm, a thermostat, a streetlamp, a toaster, a sporting goods, a hot water tank, a heater, a boiler, etc.).

According to some embodiments, an electronic device may include at least one of a part of furniture or a building/structure, an electronic board, an electronic signature receiving device, a projector, and various types of measuring instruments (e.g., a water meter, an electric meter, a gas meter, a radio wave meter, and the like). In various embodiments, the electronic device may be flexible, or may be a combination of one or more of the aforementioned various devices. The electronic device according to one embodiment of the disclosure is not limited to the above described devices. In the disclosure, the term "user" may indicate a person using an electronic device or a device (e.g., an artificial intelligence electronic device) using an electronic device.

FIG. 1 illustrates the configuration of a system for providing a service corresponding to an accessory device according to various embodiments of the disclosure. In the following description, a service may include at least one of content-related information or policy information for controlling a function associated with the content.

Referring to FIG. 1, the system may include an electronic device 100, at least one accessory device (or accessory) 110, a first server 120, and a second server 130.

The electronic device 100 may be, for example, functionally connected to the at least one accessory device 110 and may control contents or functions of the electronic device 100 based on information received from the at least one accessory device 110. According to one embodiment, the electronic device 100 may perform authentication to determine whether the at least one accessory device 110 includes or generates information that conforms to a predetermined rule using the server 120 or 130, and may have different content indication or function control by controlling the electronic device 100 based on the authentication result. According to one embodiment, the electronic device 100 may be connected to the at least one accessory device 110 via a wired or wireless communication interface to receive or transmit information. For example, the electronic device 100 and the at least one accessory device 110 may transmit or receive information in a manner such as near field communication (NFC), a charger (e.g., universal serial bus (USB)-C), an ear jack, Bluetooth (BT), Wi-Fi, or the like.

Referring to FIG. 1, the electronic device 100 may include one or more of an accessory authentication module 102, a content/function/policy information DB 104, an accessory information DB 106, and a content DB 108.

The accessory authentication module 102 may authenticate accessory information (e.g., an accessory identifier (ID)) received from, for example, the at least one accessory device 110, or may perform authentication based on a server and may verify the result.

The content/function/policy information DB 104 may store or manage permissions (one or more conditions of user, device, due date, and location) associated with, for example, the at least one accessory device 110 and policies such as determining whether the mounting or dismounting of the at least one accessory device 110 is displayed.

The accessory information DB 106 may be, for example, a repository for managing accessory information. For example, the accessory information DB 106 may include or manage one or more pieces of information among information associated with an accessory group, association information between accessory devices, and contents or functions associated with an accessory device and an accessory group. The accessory information DB 106 may update or synchronize information in conjunction with the server 120 or 130. For example, the accessory information DB 106 of the electronic device 100 may update the accessory information in conjunction with accessory information DB 126 or accessory specification information DB 134 of the server 120 or 130. According to another embodiment, the accessory information DB 106 may not be the same as the accessory information DB 126 or accessory specification information DB 134 of the server 120 or 130. For example, the accessory information DB 106 of the electronic device 100 may update only some pieces of accessory information of the accessory information DB 126 or accessory specification information DB 134 of the server 120 or 130. For example, the accessory information DB 106 of the electronic device 100 may store accessory information (e.g., registration of accessories that provide services without exchanging information with the server) which is not included in the accessory information DB 126 or accessory specification information DB 134 of the server 120 or 130. To this end, the electronic device 100 may record the accessory information received from the at least one accessory device 110 in the accessory information DB 106, may select a content or a function by a user input, may select a policy associated with the selected content or function, and may input the selected policy to the content/function/policy information DB 104.

According to one embodiment, functions or contents corresponding to two pieces of accessory information may be mapped and managed on one piece of accessory information. According to one embodiment, after receiving one or more accessory IDs, the electronic device 100 may record a plurality of accessory IDs in one accessory device (e.g., memory). For example, when the electronic device 100 and the accessory device include an NFC module with the ability to generate and interpret signals for NFC communications, the electronic device 100 may record the plurality of accessory IDs in one accessory device (e.g., NFC chip) using the NFC module. The information associated with the accessory group may include information on a group including accessory devices that are associated with each other. For example, the information associated with the accessory group may include at least one of model names and accessory IDs of the accessory devices capable of providing services to the same electronic device 100. For example, the information associated with the accessory group may include IDs of accessory devices that can be coupled or connected to each other. For example, the information associated with the accessory group may include IDs of accessory devices that include at least one of a content provider identifier and an accessory manufacturer identifier. For example, the information associated with the accessory group may include IDs of accessory devices owned by a specific user. For example, the information associated with the accessory group may include at least one of accessory IDs used by users of a chat room of a specific social network service (SNS) or by users who have joined a specific guild of online games and user information (e.g., IDs, telephone numbers, or e-mail addresses) associated with the accessory IDs. The information associated with the accessory group may be information about accessory IDs that are designated to a group in an accessory manufacturer or a content provider.

The content DB 108 may store or manage information about the content or function, for example, associated with the accessory device in a memory. The content may include at least one of files such as one or more apps (or applications), videos, images, audios, address books, phonebooks, documents, and the like and uniform resource location (URL) information associated with content stored in another device. The information about the content or function may be received from the server 120 or 130, and may be a content stored in the electronic device 100.

The at least one accessory device 110 may be an assistant mechanism that can be associated with, for example, the electronic device 100 and may be designed for various purposes such as ease of use of the electronic device 100, increase in appearance, increase in usability, and the like. The at least one accessory device 110 may or may not be brought into physical contact with the electronic device 100. According to one embodiment, the at least one accessory device 110 may be functionally connected to the electronic device 100 using a wired or wireless communication module and may transmit accessory information for the electronic device 100 controlling the content or the function. According to one embodiment, the at least one accessory device 110 may include an authentication module for encrypting/decrypting one or more pieces of information included in the accessory information or storing and managing the same in a physical/virtual memory area that is not directly accessible from the outside. According to one embodiment, the at least one accessory device 110 may communicate with the electronic device 100, or may provide information through communication between the accessory devices. For example, a plurality of accessory devices may be functionally connected to one electronic device 100. For example, a second accessory device may be functionally connected to a first accessory device, and second accessory information may be transmitted to the electronic device 100 via the first accessory device. According to one embodiment, the at least one accessory device 110 may be functionally connected to the server 120 or 130. In various embodiments, the at least one accessory device 110 may be various types of products such as a cover case, an NFC dongle, a car charger, an earphone, an ear cap (e.g., an accessory device attached to a cellular phone audio connector), a thermometer, an electronic pen, a BT earphone, a BT speaker, a BT dongle, a TV, a refrigerator, a Wi-Fi dongle, etc.

The servers 120 and 130 may provide a predetermined content or function based on the accessory information in conjunction with the electronic device 100. For example, the servers 120 and 130 may manage registration of the accessory information, authentication associated with the registration, and policies, and may manage user or device information associated with the at least one accessory device 110. According to one embodiment, the servers 120 and 130 may store or manage at least one of a repository for storing contents associated with the at least one accessory device 110, a database (DB) for managing the repository, a content provider providing contents or functions, hardware specification information and manufacturer information of the accessory device, a service provider providing services such as SNS, speech recognition-based translation, chatbot services or games, network provider information providing communication services, user information, and subscriber information. Such information may be divided and operated by the first server 120 and the second server 130. According to another embodiment, the first server 120 and the second server 130 may be implemented as a single device.

The first server 120 may include, for example, a server or a cloud device for services associated with the at least one accessory device 110, or a hub device for controlling services in a smart home environment. Referring to FIG. 1, the first server 120 may include at least one of an accessory authentication module 122, a content/function/policy information DB 124, the accessory information DB 126, and an electronic device/user DB 128. The first server 120 may be referred to as an "accessory management server", "accessory server", or "accessory-related server".

The second server 130 may include, for example, a server or a cloud device for providing services or contents, or a hub device for providing services in a smart home environment. Referring to FIG. 1, the second server 130 may include at least one of a content DB 132, the accessory specification information DB 134, a content/function/policy information management module 136, and a device/user authentication/management module 138. The second server 130 may be referred to as a "content management server", "content server", or "content-related server".

According to one embodiment, the second server 130 may be operated by a content provider or a service provider, and may include at least one of the content DB 132, the accessory specification information DB 134, the content/function/policy information management module 136, and the device/user authentication/management module 138 to provide a specific content or service. For example, in order to provide game services, the content DB 132 may store or manage game contents and multimedia contents, and the accessory specification information DB 134 may determine whether accessory information associated with the electronic device 100 is used by managing the electronic device in which resources (e.g., operating system (OS), processor specification, minimum required memory capacity, supported multimedia codec, etc.) capable of being provided with the game contents are supported or the accessory information associated with the electronic device 100. The content/function/policy information management module 136 may manage content/function/policy provided by the game services, and the device/user authentication/management module 138 may provide user subscription information for using the game services and device and user authentication function for game login.

Figure 2:
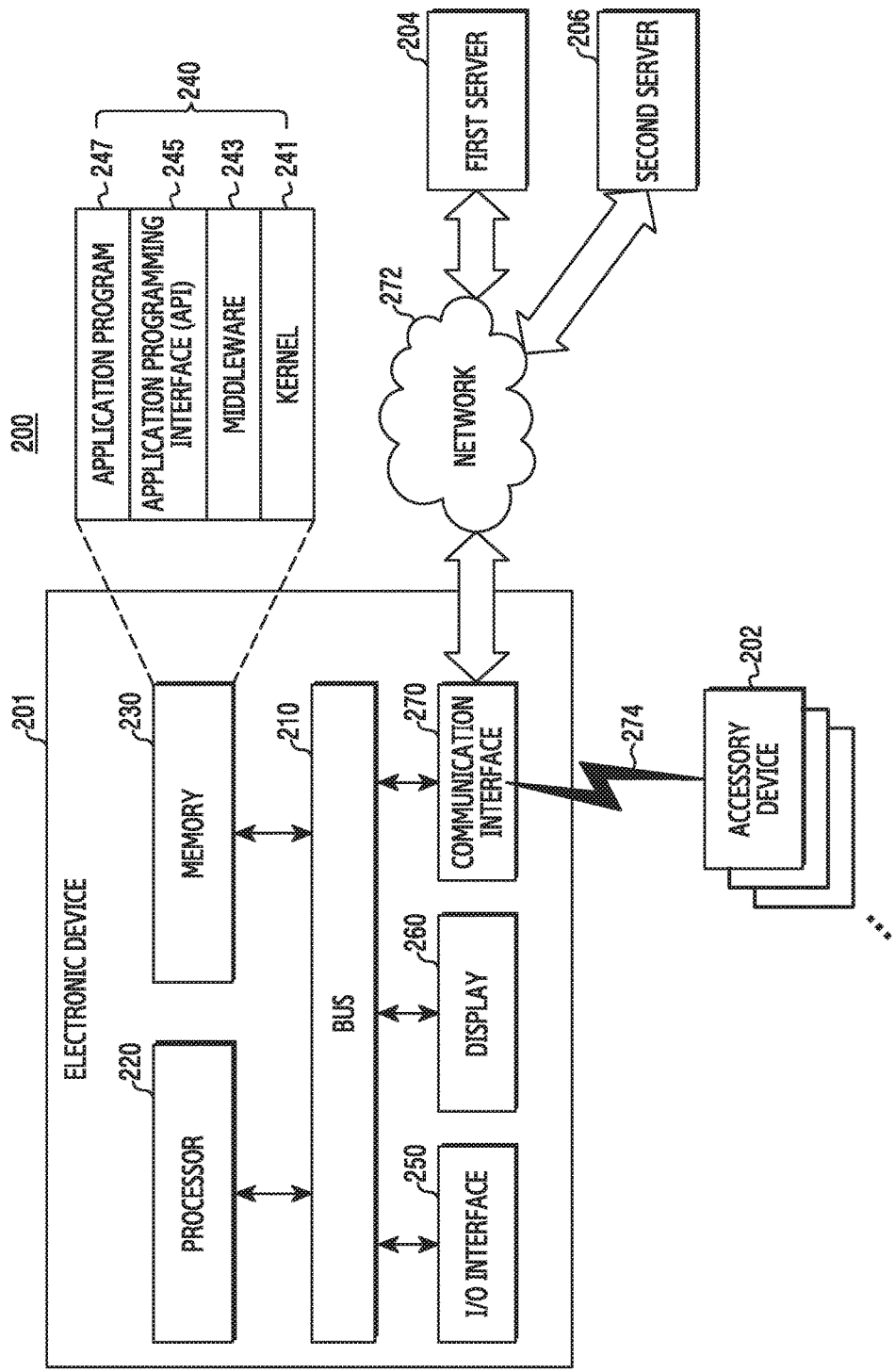
FIG. 2 illustrates an electronic device in a network environment according to various embodiments of the disclosure.

FIG. 2 illustrates an electronic device 201 in a network environment 200 according to various embodiments of the disclosure. In the following description, the electronic device 201 may include the electronic device 100 of FIG. 1. An accessory device 202 may include the accessory device 110 of FIG. 1. A first server 204 may include the first server 120 of FIG. 1. A second server 206 may include the second server 130 of FIG. 1.

Referring to FIG. 2, the electronic device 201 may include a bus 210, a processor 220, a memory 230, an input/output (I/O) interface 250, a display 260, and a communication interface 270. In some embodiments, at least one of the foregoing elements may be omitted or another element may be added to the electronic device 201.

The bus 210 may include, for example, a circuit for connecting the above-mentioned elements 220 to 270 to each other and transferring communications (e.g., control messages and/or data) among the above-mentioned elements.

The processor 220 may include at least one of a central processing unit (CPU), an application processor (AP), an image signal processor (ISP), a communication processor (CP), and a low-power processor (such as a sensor hub). The processor 220 may perform an operation or data processing for control and/or communication of at least one of the other elements of the electronic device 201.

The memory 230 may include volatile and/or nonvolatile memory. The memory 230 may store instructions or data associated with at least one of the other elements of the electronic device 201. According to one embodiment, the memory 230 may store software and/or a program 240. The program 240 may include, for example, a kernel 241, a middleware 243, an application programming interface (API) 245, or an application program (or an "application") 247. At least a portion of the kernel 241, the middleware 243, or the API 245 may be referred to as an operating system (OS).

The kernel 241 may control or manage system resources (e.g., the bus 210, the processor 220, the memory 230, or the like) used to perform operations or functions implemented in other programs (e.g., the middleware 243, the API 245, or the application program 247). Furthermore, the kernel 241 may provide an interface for allowing the middleware 243, the API 245, or the application program 247 to access individual elements of the electronic device 201 in order to control or manage the system resources.

The middleware 243 may serve as an intermediary so that, for example, the API 245 or the application program 247 communicates and exchanges data with the kernel 241. Furthermore, the middleware 243 may handle one or more task requests received from the application program 247 according to a priority order. For example, the middleware 243 may assign a priority for using the system resources (e.g., the bus 210, the processor 220, the memory 230, or the like) of the electronic device 201 to at least one of the application programs 247, and may process the one or more task requests. The API 245, which is an interface for allowing the application program 247 to control a function provided by the kernel 241 or the middleware 243, may include, for example, at least one interface or function (e.g., instructions) for file control, window control, image processing, character control, or the like.

The I/O interface 250 may serve to transfer an instruction or data input from, for example, a user or another external device to (an)other element(s) of the electronic device 201. For example, the I/O interface 250 may include at least one of an ear jack, a charging port, an audio I/O circuit, and a connection electrode to which the accessory device can be connected. The I/O interface 250 may be, for example, one or more sensor devices capable of receiving sensor data relating to biometric information, motion, temperature, sound, image, and the like.

The display 260 may include, for example, a liquid crystal display (LCD), a light emitting diode (LED) display, an organic light emitting diode (OLED) display, a micro electro mechanical system (MEMS) display, or an electronic paper display. The display 260 may display, for example, various contents (e.g., texts, images, videos, icons, and/or symbols, etc.) to a user. The display 260 may include a touch screen and may receive, for example, touch, gesture, proximity, or hovering input using an electronic pen or a portion of the user's body.

The communication interface 270 may establish communication between the electronic device 201 and an external device (e.g., the accessory device 202, the first server 204, or the second server 206). For example, the communication interface 270 may be connected to a network 272 via wireless or wired communication to communicate with an external device (e.g., the first server 204 or the second server 206). Additionally, the communication interface 270 may establish a short-range wireless communication connection 274 between the electronic device 201 and any other electronic device (e.g., electronic device 202).

The wireless communication may include, for example, cellular communication using at least one of long term evolution (LTE), LTE advanced (LET-A), code division multiple access (CDMA), wideband CDMA (WCDMA), universal mobile telecommunications system (UMTS), wireless broadband (WiBro), global system for mobile communications (GSM), and the like. According to one embodiment, the wireless communication may include, for example, at least one of Wi-Fi, Bluetooth (BT), Bluetooth low energy (BLE), Zigbee, near field communication (NFC), magnetic secure transmission, radio frequency (RF), and body area network (BAN). According to one embodiment, the wireless communication may include a global navigation satellite system (GNSS). The GNSS may be, for example, a global positioning system (GPS), a global navigation satellite system (Glonass), a Beidou navigation satellite system (hereinafter, referred to as "Beidou"), Galileo, or European global satellite-based navigation system. Hereinafter, in this document, "GPS" can be used interchangeably with "GNSS". The wired communication may include at least one of, for example, a universal serial bus (USB), a high definition multimedia interface (HDMI), a recommended standard 232 (RS-232), power line communication, and a plain old telephone service (POTS). The network 272 may include at least one of telecommunications network, for example, a computer network (e.g., local area network (LAN) or wide area network (WAN)), Internet, and a telephone network.

Each of the accessory device 202, the first server 204, and the second server 206 may be a device of the same type as or a different type (e.g., accessory device or server) from the electronic device 201. According to various embodiments, all or some of the operations performed in the electronic device 201 may be performed in another electronic device or a plurality of electronic devices (e.g., the accessory device 202, the first server 204, or the second server 206). According to one embodiment, when the electronic device 201 has to execute a function or a service automatically or at a request, the electronic device 201 may request another device (e.g., the accessory device 202, the first server 204, or the second server 206) to execute at least some functions associated with the function or the service instead of or in addition to executing the function or the service itself. The other electronic device (e.g., the accessory device 202, the first server 204, or the second server 206) may execute the requested function or additional function and may transfer the execution result to the electronic device 201. The electronic device 201 may then process or further process the received result to provide the requested function or service. To this end, for example, cloud computing, distributed computing, or client-server computing technologies may be used.

Figure 3:
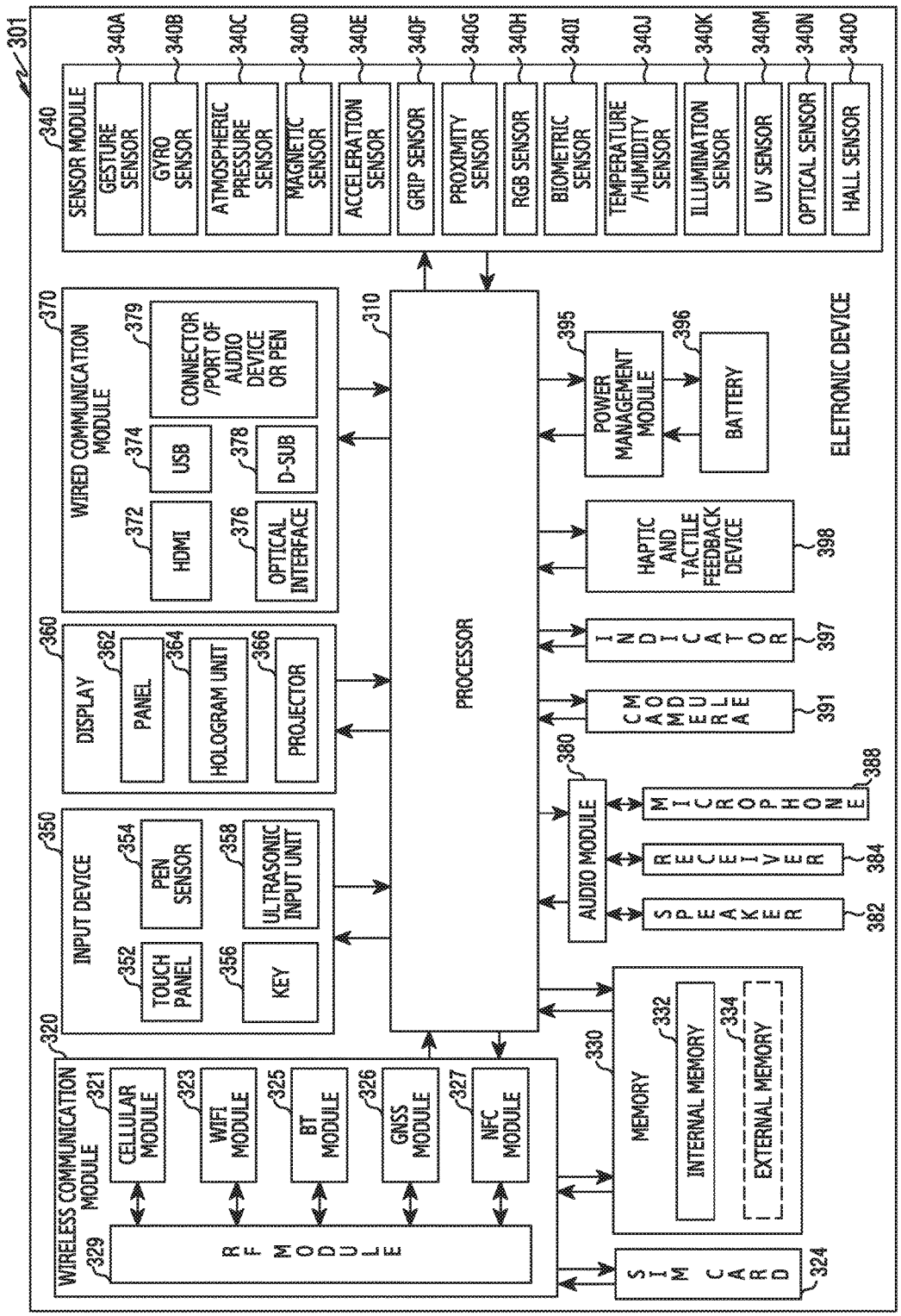
FIG. 3 is a block diagram illustrating an electronic device according to various embodiments of the disclosure.

FIG. 3 is a block diagram illustrating an electronic device 301 according to various embodiments of the disclosure. The electronic device 301 may include all or some of the elements of the electronic device 201 illustrated in FIG. 2.

Referring to FIG. 3, the electronic device 301 may include one or more processors (e.g., AP) 310, a wireless communication module 320, a subscriber identification module (SIM) 324, a memory 330, a sensor module 340, an input device 350, a display 360, a wired communication module 370, an audio module 380, a camera module 391, a power management module 395, a battery 396, an indicator 397, and a haptic and tactile feedback device 398.

The processor 310 may control multiple hardware or software elements connected to the processor 310 by driving an OS or an application program, and may perform processing and operations with respect to a variety of data. The processor 310 may be implemented with, for example, a system on a chip (SoC). According to one embodiment, the processor 310 may further include a graphics processing unit (GPU) and/or an image signal processor (ISP). The processor 310 may include at least some (e.g., a cellular module 321) of the elements illustrated in FIG. 3. The processor 310 may load an instruction or data received from at least one of other elements (e.g., a non-volatile memory) into a volatile memory to process the instruction or data, and may store result data in the non-volatile memory. According to one embodiment, the processor 310 may include a plurality of processors. For example, the processor 310 may include a sensor hub processor and an application processor. When the application processor is turned off (e.g., in a sleep mode), the sensor hub processor operating at a low power may control a power management module 395, or turn on or awake the application processor based on a sensor signal received through the sensor module 340, a communication signal received through the wired/wireless communication modules 320 and 370, or an input signal received through the input device 350.

The communication module 320 may have a configuration that is the same as or similar to the communication interface 270 of FIG. 2. The wireless communication module 320 may include, for example, a cellular module 321, a Wi-Fi module 323, a BT module 325, a GNSS module 327, an NFC module 328, and an RF module 329.

The cellular module 321 may provide, for example, a voice call, a video call, a text service, or an Internet service over a communication network. According to one embodiment, the cellular module 321 may identify and authenticate the electronic device 301 in a communication network by using a subscriber identification module (SIM) (e.g., a SIM card) 324. According to one embodiment, the cellular module 321 may perform at least some of functions that may be provided by the processor 310. According to one embodiment, the cellular module 321 may include a communication processor (CP).

According to some embodiments, at least some (e.g., two or more) of the cellular module 321, the Wi-Fi module 323, the BT module 325, the GNSS module 326, and the NFC module 327 may be included in one integrated chip (IC) or IC package.

The RF module 329 may transmit and receive, for example, a communication signal (e.g., an RF signal). The RF module 329 may include a transceiver, a power amp module (PAM), a frequency filter, a low noise amplifier (LNA), or an antenna. According to another embodiment, at least one of the cellular module 321, the Wi-Fi module 323, the BT module 325, the GNSS module 326, and the NFC module 327 may transmit and receive an RF signal through a separate RF module. The SIM 324 may include, for example, a card including an SIM or an embedded SIM, and may include unique identification information (e.g., an integrated circuit card identifier (ICCID)) or subscriber information (e.g., an international mobile subscriber identity (IMSI)).

The memory 330 (e.g., the memory 230 of FIG. 2) may include, for example, an internal memory 332 or an external memory 334. The internal memory 332 may include, for example, at least one of a volatile memory (e.g., dynamic random access memory (DRAM), static RAM (SRAM), synchronous dynamic RAM (SDRAM), etc.), and a non-volatile memory (e.g., one time programmable read only memory (OTPROM), programmable ROM (PROM), erasable and programmable ROM (EPROM), electrically erasable and programmable ROM (EEPROM), etc.), mask ROM, flash ROM, a flash memory, hard drive, and a solid state drive (SSD). The external memory 334 may further include flash drive, for example, compact flash (CF), secure digital (SD), micro-SD, mini-SD, extreme Digital (xD), a multi-media card (MMC), or a memory stick. The external memory 334 may be functionally or physically connected with the electronic device 301 through various interfaces.

The sensor module 340 may measure, for example, physical quantity or sense an operation state of the electronic device 301 to convert the measured or sensed information into an electric signal. The sensor module 340 may include, for example, at least one of a gesture sensor 340A, a gyro sensor 340B, an atmospheric pressure sensor 340C, a magnetic sensor 340D, an acceleration sensor 340E, a grip sensor 340F, a proximity sensor 340G a color sensor 340H (e.g., red, green, blue (RGB) sensor), a biometric sensor 340I, a temperature/humidity sensor 340J, an illumination sensor 340K, an ultraviolet (UV) sensor 340M, an optical sensor 340N, and a Hall sensor 340O. For example, the sensor module 340 may include an e-nose sensor, an electromyography (EMG) sensor, an electroencephalogram (EEG) sensor, an electrocardiogram (ECG) sensor, an infrared (IR) sensor, an iris sensor, and/or a fingerprint sensor. For example, the sensor module 340 may further include a module for performing time measurement in connection with the communication module or for providing time or time measurement using a built-in clock or timer. The sensor module 340 may further include a control circuit for controlling at least one sensor included therein. In some embodiment, the electronic device 301 may further include a processor configured to control the sensor module 340 as part of or separately from the processor 310, to control the sensor module 340 during a sleep state of the processor 310. For example, the temperature/humidity sensor 340J may include a plurality of temperature sensors disposed at different positions.

The input device 350 may include, for example, a touch panel 352, a (digital) pen sensor 354, a key 356, or an ultrasonic input device 358. The touch panel 352 may use at least one of, for example, a capacitive type, a resistive type, an IR type, or an ultrasonic type. The touch panel 352 may further include a control circuit. The touch panel 352 may further include a tactile layer to provide tactile reaction to a user. The (digital) pen sensor 354 may include, for example, a recognition sheet which is a part of the touch panel or a separate recognition sheet. The key 356 may include, for example, a physical button, an optical key, or a keypad. The ultrasonic input device 358 may sense ultrasonic waves generated by an input tool through a microphone (e.g., a microphone 388) and may check data corresponding to the sensed ultrasonic waves.

The display 360 (e.g., the display 260 of FIG. 2) may include a panel 362, a hologram device 364, a projector 366, and/or a control circuit for controlling them. The panel 362 may be implemented to be flexible, transparent, or wearable. The panel 362 may be configured with the touch panel 352 in one module. The hologram device 364 may show a stereoscopic image in the air using interference of light. The projector 366 may display an image by projecting light on a screen. The screen may be positioned inside or outside the electronic device 301. According to one embodiment, the wired communication module 370 may include, for example, a HDMI 372, a USB 374, an optical interface 376, a D-subminiature (D-sub) 378, or a connector/port 379 of audio device or pen. The wired communication module 370 may be included, for example, in the communication interface 270 illustrated in FIG. 2. By way of example, the wired communication module 370 may include, for example, a mobile high-definition link (MHL) interface, an SD card/multi-media card (MMC) interface, or an infrared data association (IrDA) standard interface. For example, the connector/port 379 of audio device or pen may include a connector and port for wired connection with an accessory device (e.g., earphone, headphone, external microphone, external speaker, ear cap, or electronic pen). The wired communication module 370 may include, for example, a wired LAN interface.

The audio module 380 may bi-directionally convert, for example, sound and an electric signal. At least some elements of the audio module 380 may be included in the I/O interface 250 illustrated in FIG. 2. The audio module 380 may process sound information input or output through, for example, a speaker 382, a receiver 384, an earphone 386, or a microphone 388.

The camera module 391 is, for example, a device capable of capturing a still image or a moving image, and according to one embodiment, may include one or more image sensors (e.g., a front sensor or a rear sensor), a lens, an image signal processor (ISP), or a flash (e.g., an LED, a xenon lamp, etc.). The power management module 395 may manage power of, for example, the electronic device 301.

The power management module 395 may include a power management integrated circuit (PMIC), a charger IC, a battery, or a fuel gauge. The PMIC may have a wired and/or wireless charging scheme. The wireless charging scheme may include, for example, a magnetic-resonance type, a magnetic induction type, and an electromagnetic wave type, and an additional circuit for wireless charging, for example, a coil loop, a resonance circuit, or a rectifier may be further included. The battery gauge may measure the remaining capacity of the battery 396 or the voltage, current, or temperature of the battery 396 during charging. The battery 396 may include a rechargeable battery and/or a solar battery.

The indicator 397 may display a particular state, for example, a booting state, a message state, or a charging state, of the electronic device 301 or a part thereof (e.g., the processor 310). The haptic and tactile feedback device 398 or a haptic device (not shown) may convert an electric signal into mechanical vibration, and may generate vibration or a haptic effect (e.g., pressure or texture). The electronic device 301 may include a device for supporting a mobile TV (e.g., a GPU) to process media data according to a standard such as digital multimedia broadcasting (DMB), digital video broadcasting (DVB), or MediaFLO™.

Each of the foregoing elements described herein may be configured with one or more components, names of corresponding elements may vary according to a type of the electronic device. In various embodiments, some components of the electronic device (e.g., the electronic device 301) may be omitted or may further include other elements, and some of the components may be coupled to each other to form one entity and identically perform functions of the components before being coupled.

Figure 4:
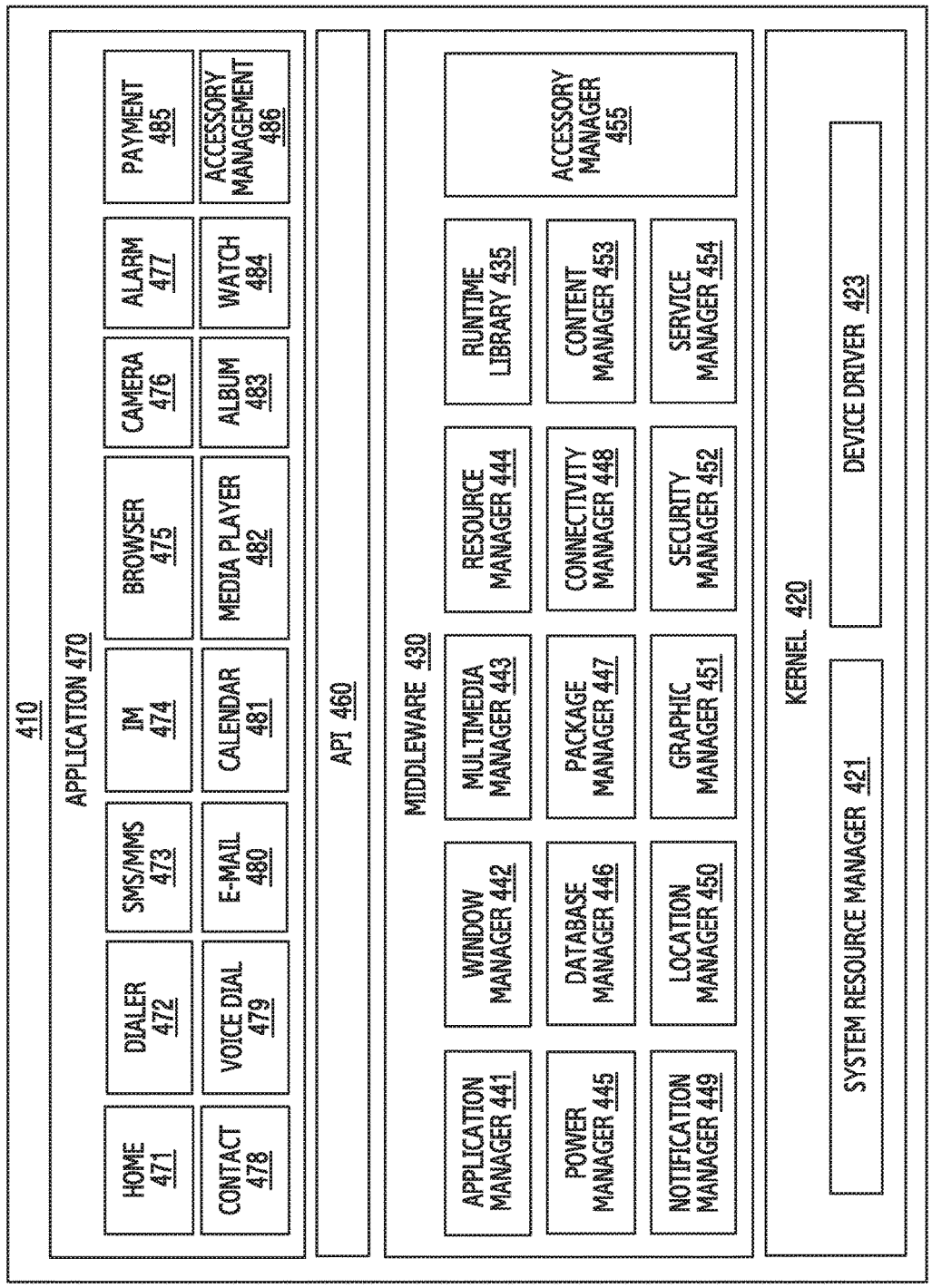
FIG. 4 is a block diagram illustrating a program module according to various embodiments of the disclosure.

FIG. 4 is a block diagram illustrating a program module according to various embodiments of the disclosure. According to one embodiment, a program module 410 (e.g., the program 240 of FIG. 2) may include an OS that controls resources associated with an electronic device (e.g., the electronic device 201 of FIG. 2) and/or various applications (e.g., the application or application program 247 of FIG. 2) driven on the OS. The OS may include, for example, Android™, iOS™, Windows™, Symbian™, Tizen™, or Bada™.

Referring to FIG. 4, the program module 410 may include a kernel 420 (e.g., the kernel 241 of FIG. 2), a middleware 430 (e.g., the middleware 243 of FIG. 2), an API 460 (e.g., the API 245 of FIG. 2), and/or an application 470 (e.g., the application or the application program 247). At least a portion of the program module 410 may be preloaded on an electronic device, or may be downloadable from an external electronic device (e.g., the accessory device 202 or 204, the server 206, etc., of FIG. 2).

The kernel 420 may include, for example, a system resource manager 421 and/or a device driver 423. The system resource manager 421 may perform control, allocation, or retrieval of system resources. According to one embodiment, the system resource manager 421 may include a process management unit, a memory management unit, or a file system management unit. The device driver 423 may include, for example, a display driver, a camera driver, a Bluetooth driver, a common memory driver, an USB driver, a keypad driver, a Wi-Fi driver, an audio driver, or an inter-process communication (IPC) driver. The middleware 430 may provide, for example, a function which the application 470 needs in common, or may provide diverse functions to the application 470 through the API 460 to allow the application 470 to use limited system resources of the electronic device.

According to one embodiment, the middleware 430 may include at least one of a runtime library 435, an application manager 441, a window manager 442, a multimedia manager 443, a resource manager 444, a power manager 445, a database manager 446, a package manager 447, a connectivity manager 448, a notification manager 449, a location manager 450, a graphic manager 451, a security manager 452, a content manager 453, a service manager 454, and the accessory manager 455.

The runtime library 435 may include, for example, a library module which is used by a compiler to add a new function through a programming language while the application 470 is being executed. The runtime library 435 may perform input/output management, memory management, or arithmetic function processing. The application manager 441 may manage, for example, a life cycle of the application 470. According to one embodiment, the application manager 441 may install, delete, or update an application corresponding to the accessory device connected to the electronic device 201 in conjunction with the first server 120 of FIG. 1. The window manager 442 may manage a graphical user interface (GUI) resource which is used in a screen. The multimedia manager 443 may identify a format necessary for playing media files, and may perform encoding or decoding of the media files using a codec suitable for the format. The resource manager 444 may manage a source code of the application 470 or a space of the corresponding memory. The power manager 445 may manage, for example, capacity or power of a battery, and may provide power information required for the operation of the electronic device. According to one embodiment, the power manager 445 may operate in conjunction with a basic input/output system (BIOS). The database manager 446 may generate, search for, or modify a database which is to be used in, for example, the application 470. The package manager 447 may manage the installation or update of an application which is distributed in the form of package file.

The connectivity manager 448 may manage, for example, wireless connection. The notification manager 449 may provide an event such as arrival message, promise, proximity notification, or the like to a user. The location manager 450 may manage location information measured indoors or outdoors using wireless communication technologies such as GNSS, cellular network identifier, radio-frequency identification (RFID), NFC, Wi-Fi fingerprint, etc., in the electronic device, or using a barometer, an acceleration sensor, a gyro sensor, a pedometer, or a geomagnetic sensor. The graphic manager 451 may manage a graphic effect that is provided to a user, or manage a user interface relevant thereto. The security manager 452 may provide, for example, system security or user authentication. The content manager 453 may manage, for example, contents provided from, for example, the first server 120 or the second server 130 of FIG. 1. The service manager 454 may manage, for example, the first server 120 of FIG. 1 to provide services required for the electronic device 201 in conjunction with the first server 120 of FIG. 1. According to one embodiment, the middleware 430 may include a telephony manager for managing the voice or video call function of an electronic device or a middleware module capable of forming a combination of the functions of the above-described elements. According to one embodiment, the middleware 430 may provide a module specialized for each type of the OS.

The accessory manager 455 may control the connection with the accessory device to be detected through the connectivity manager 448 and may control identification information (e.g., accessory ID) to be received. The accessory manager 455 may control accessory-related contents or functions to be displayed or driven through an application in conjunction with another manager. The accessory manager 455 may control the corresponding memory to associate and store identification information (e.g., accessory ID) and content information of the accessory device. The accessory manager 455 may store and manage policy information based on the identification information (e.g., accessory ID) of the accessory device. The accessory manager 455 may manage the mounting or dismounting of the accessory device and the state thereof, and may determine and manage the corresponding service according to the managed mounting and state of the accessory device. The accessory manager 455 may ascertain and determine an association relationship between the accessory devices. The accessory manager 455 may perform or request authentication using the security manager 452 based on the accessory information (e.g., accessory ID). The accessory manager 455 may synchronize an external device (e.g., server or external memory) with accessory-related information (e.g., policy information, relationship information between accessories, contents, functions, etc.) or may share at least a part of the accessory-related information with an external device.

The middleware 430 may dynamically delete some of existing elements or add new elements. The API 460 may be, for example, a set of API programming functions and another API having a different configuration may be provided according to OSs. For example, in the case of Android or iOS, one API set may be provided for each platform. In the case of Tizen, two or more API sets may be provided for each platform.

The applications 470 may include a home application 471, a dialer application 472, a short message service (SMS)/multimedia message service (MMS) application 473, an instant messaging (IM) application 474, a browser application 475, a camera application 476, an alarm application 477, a contact application 478, a voice dial application 479, an email application 480, a calendar application 481, a media player application 482, an album application 483, a clock application 484, a payment application 485, an accessory management application 486, a health care (e.g., an application for measuring an exercise amount, a blood sugar, etc.) application, or environmental information (e.g., an application for providing air pressure, humidity, or temperature information or the like) providing application.

According to one embodiment, the accessory management application 486 may include at least one instruction for managing and installing/updating applications associated with the accessory-related content or function. The electronic device 100 may display or control the content or function controlled through the accessory management application 486 via an app. According to another embodiment, the accessory management application 486 may be implemented to be integrated into the accessory manager 455.

According to one embodiment, the applications 470 may include an information exchange application supporting information exchange between the electronic device and an external electronic device. The information exchange application may include, for example, a notification relay application for transferring specific information to the external electronic device or a device management application for managing the external electronic device. For example, the notification relay application may transfer notification information having occurred in another application of the electronic device to an external electronic device or may receive notification information from the external electronic device and provide the notification information to the user. The device management application may install, remove, or update a function (e.g., turn on/turn off of an external electronic device itself (or some components thereof) or control of brightness (or resolution) of a display) of an external electronic device communicating with the electronic device, or an application operating in the external electronic device. According to one embodiment, the application 470 may include an application (e.g., health care application of mobile medical equipment) designated according to an attribute of the external electronic device. According to one embodiment, the application 470 may include an application received from the external electronic device. At least a part of the programming module 410 may be implemented (e.g., executed) by software, firmware, hardware (e.g., the processor 310 of FIG. 3), or a combination of two or more thereof, and may include modules, programs, routines, sets of instructions, or processes for performing one or more functions.

Figure 5:
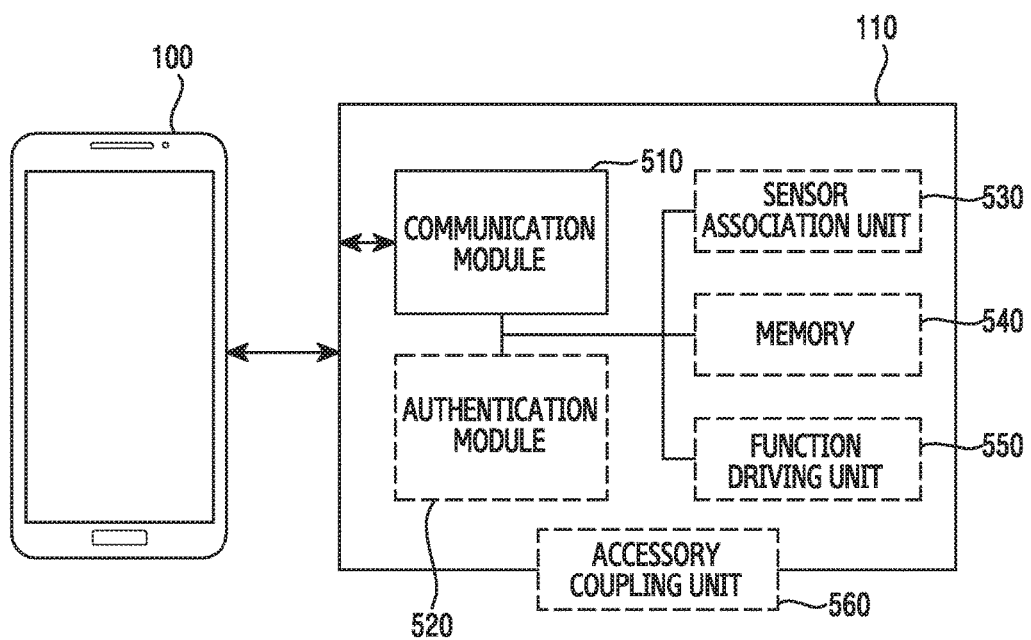
FIG. 5 illustrates the functional configuration of an accessory device mountable to an electronic device according to various embodiments of the disclosure.

FIG. 5 illustrates the functional configuration of an accessory device mountable to an electronic device according to various embodiments of the disclosure.

Referring to FIG. 5, the accessory device 110 may include a communication module 510 and may further include at least one of an authentication module 520, a sensor association unit 530, a memory 540, a function driving unit 550 and an accessory coupling unit 560. According to another embodiment, one or more of the authentication module 520, the sensor association unit 530, the memory 540, the function driving unit 550, and the accessory coupling unit 560 may be omitted.

The communication module 510 may transmit or receive signals suitable for communication, for example, to exchange data between the electronic device 100 or a plurality of accessory devices. The communication module 510 may be configured to support wired or wireless communication, and may further include a communication connector or an antenna.

The authentication module 520 may store information required for authentication or perform an authentication operation so as to enable an operation of exchanging information between the memory 540 and the electronic device 100, for example, by authentication. The authentication module 520 may be implemented in the form of a chip or a software module, and may perform encryption, decryption, validation check of an accessory ID, and the like. The authentication module 520 may encrypt/decrypt one or more pieces of information included in the accessory information, or may store and manage the same in a physical/virtual memory area that is not directly accessible from the outside. For example, the authentication module 520 may be controlled to perform the authentication operation according to various embodiments described below.

The sensor association unit 530 may include components (e.g., magnetic field, light, etc.) for allowing, for example, the electronic device 100 or a sensor of another accessory device to react. For example, the sensor association unit 530 may include at least one of a magnet or an electromagnet module for causing a Hall sensor (e.g., a hall integrated circuit (IC) sensor, a hall effect sensor, or a hall magnetic sensor) to react, a light source or a light shielding portion (e.g., a shielding material such as a switch, a cover, or the like) for causing an optical sensor to react, an infrared (IR) light emitting portion corresponding to IrDA, and a speaker or a microphone for stimulating an audio sensor. That is, the sensor association unit 530 may stimulate the sensor of the electronic device 100, and may be a device for enabling the electronic device 100 to determine whether the accessory device 110 is connected or the corresponding accessory type. According to one embodiment, when a magnet or an electromagnet is disposed at a predetermined position of the cover type accessory device and the cover type accessory device is mounted to the electronic device 100, a Hall sensor (for example, 340O) of the electronic device 100 corresponding to the magnet or the electromagnet may sense a magnetic field (or magnetic force), so that the electronic device 100 may determine that the cover type accessory device is mounted. The electronic device 100 may determine the mounting or dismounting state of the accessory device or a state change thereof based on at least one of whether the magnetic field is sensed through the Hall sensor (e.g., 340O), the strength of the sensed magnetic field, the polarity of the sensed magnetic field, and the sensing direction of the magnetic field. According to one embodiment, the accessory device 110 may include components such as a connector and a terminal for connection of the accessory device 110 to the wired communication module 370 of the electronic device 100, so that the electronic device 100 may determine whether the coupling of the accessory device 110 is performed through the wired communication module 370 at the time of the connection.

The memory 540 may store, for example, unique information of the accessory device 110 or information stored by the electronic device 100. For example, the memory 540 may store accessory IDs for accessory authentication and identification, and may store key values or accessory IDs for performing authentication that is encrypted by the authentication module 520. In addition, the memory 540 may store key values for encryption/decryption. According to one embodiment, the memory 540 may be included in one or more of the authentication module 520 and the communication module 510. The memory 540 may include image or text data, and the stored data may be configured to provide contents associated with accessories even before/after an operation in which the electronic device 100 downloads or deletes the contents through a communication module (e.g., wireless communication module 320) is completed.

The function driving unit 550 may include, for example, a component for detecting a user input for control associated with a function to be performed in the electronic device 100 or a content to be displayed. The function driving unit 550 may include a hardware button or a software virtual button, and a user may input commands through the hardware button or the software virtual button. When a specific state is turned on by the function driving unit 550, the accessory device 110 may perform a first operation. When the specific state is turned off by the function driving unit 550, the accessory device 110 may perform a second operation. For example, the function driving unit 550 may be a hardware or a software component for selecting the accessory ID to be received at the electronic device 100, controlling the electronic device 100 to receive the accessory ID, or controlling the electronic device 100 to perform a predetermined operation (e.g., configuring an NFC operation mode, controlling an application processor operation, or controlling a sensor hub operation). According to various embodiments, the function driving unit 550 may be implemented in one or more forms of a button (e.g., a dome button, a toggle button, or a push switch), a switch (e.g., a slide switch, a hook switch, a multi-way switch, or a rotary switch), and a touch sensor. The function driving unit 550 may be controlled as software in association with the memory or the sensor association unit 530 of the accessory device 110. For example, the function driving unit 550 may be implemented as a rotary type switch to select one of a plurality of accessory IDs included in the accessory device 110. The function driving unit 550 may determine whether contents such as images, texts, moving images, etc., stored in the memory 540 are provided to the electronic device 100. For example, when it is determined to be before the content associated with the accessory device 110 is downloaded to the electronic device 100, the accessory device 110 may transfer the content stored in the memory 540 to the electronic device 100. Alternatively, when the content associated with the accessory device 110 receives an instruction to be deleted from the electronic device 100, the accessory device 110 may transfer the stored content to the electronic device 100 so that the stored content may be displayed while the content is being deleted.

The accessory coupling unit 560 may include, for example, a component for coupling the accessory device 110 and the electronic device 100 or another accessory device. For example, the accessory coupling unit 560 may include a fastening device or a member having an adhesive force configured to be coupled to the electronic device 100 or another accessory device. As another example, the accessory coupling unit 560 may include various devices such as a slot, a connector, a hook, a hole, an adhesive tape, a pen holder, a card receiver, etc., in which another accessory device may be mounted. Also, the accessory coupling unit 560 may include a plurality of fastening devices or members having an adhesive force, and may be coupled to each of another accessory device and the electronic device 100 or may be used to be mounted to a plurality of other accessory devices.

According to various embodiments, the electronic device 100 may transmit/receive data required for authentication or operation from the accessory device 110 via communication with the accessory device 110. In such an operation, the electronic device 100 may discern one or more of the type of the accessory device 110, the operation of the electronic device 100 associated with the accessory device 110, and a unique number of the accessory device 110 through the accessory information (e.g., accessory ID), and may recognize or command to perform a new function. The accessory ID may include one or more of data fields described below. At least some of the data fields described below may be created when a content provider writes accessory-related information to order the accessory device 110 to the server (e.g., server 120 or 130).

According to one embodiment, the data structure of the accessory ID may be defined as shown in Table 1 below.

TABLE 1

| Length | Authentication module type | Data (up to 126 bytes) | | | |
|---|---|---|---|---|---|
| 1 byte | 1 byte | ID based on service type or service ID (e.g., friends service type: 24 bytes) | | | |
| | Authentication module version | Service type | Service ID | Serial number | Client code |
| | 1 byte | 2 bytes | 4 bytes | 14 bytes | 3 bytes |

Referring to Table 1, the accessory ID may include one or more of a length field, an authentication module type field, an authentication module version field, a service type field of an accessory device, a service ID field, a serial number field, and a client code field.

The contents of each field according to one embodiment may be defined as shown in Table 2 below.

TABLE 2

| Field name | Size (byte) | Explanation | Value type | |
|---|---|---|---|---|
| Length | 1 | Length of data area e.g.) ID based on authentication module type length + service type | 8 bits (e.g., 0x19) | |
| Authentication module version | 1 | Authentication algorithm identification (e.g., ECC) May vary depending on service type or service ID | 8 bits | |
| Authentication module type | 1 | Revision field for checking the compatibility of authentication chip Since authentication chip may be different for each accessory, information for determining whether electronic device supports this | 8 bits | |
| Service type | 2 | Service classification type provided by accessory device e.g.) Theme service: service/group type such as lock screen, always on display (AOD), theme, game, SNS, etc. e.g.) Cover authentication: cover capable of providing authentication and AOD, and lock screen service e.g.) Game accessory: game, SNS e.g.) Friends accessory: accessory device (cover, ear cap, charger, battery, figure, etc.) capable of providing theme service or game service Designate whether to determine white list check | 0x000x: white list uncheck 0x001x: white list check 0xF00x: forced progress (magic code) | 0x0000: reserved 0x0001: friends service 0x0002: authentic cover 0x0003: for testing |
| Service ID | 4 | Random value to be issued to portal Function-specific value provided by connected accessory device Accessory type information: accessory type and detailed type (model/product name) information according to accessory type e.g.) Accessory type: in the case of cover, including detailed type (flip cover/back cover/fingering cover) or model ID Used to determine association relationship between various accessory devices (discrimination through calculation based on relation DB or two service IDs in server or terminal) Parent or child association information Accessory group information consisting of information about associated accessory devices Content or function-related information corresponding to combination of associated accessory devices | 1 byte Accessory type information range: 0x01-0xFF (1-255) Information corresponding to cover, charger, earphone, external battery, external memory, etc. | 3 bytes Serial number range: 0x000001-0FFFFFF (1-16777215) |

TABLE 2-continued

| Field name | Size (byte) | Explanation | Value type |
|---|---|---|---|
| | | e.g.) Dedicated phone cover or the like to be connected to a certain cradle accessory device e.g. When supportable external device identification information (e.g., external device model) stored on cover and second device identification information received via USB are corresponding external device (e.g., vehicle) model information, provide function Determine device providing service (e.g., parent terminal, accessory device, other devices, etc.) e.g.) In the case of cradle accessory product in which smartphone is mounted, output corresponding information to another device connected to cradle through mirroring e.g.) Output corresponding information on cover in which flexible display is mounted Configure type of content to be output and details | |
| Serial number | 14 | Unique values assigned to distinguish accessory devices from each other Created when content provider orders accessory device in server 0: No need to operate while limited to terminal with active accessory-related service (e.g., authentic theme cover including sensor association unit) 1 or greater: When it needs to operate while limited to terminal with active accessory-related service (e.g., operation such as waking-up AP through user input to provide service, read-write mode conversion, or the like is required) Information generated by authentication chip may be included. For example, based on random number received from electronic device, it is encrypted or new random number is created in real time | Constituted of one or more of service item, service detailed item, production/manufacture date, random number, and checksum field | Length assignment for each field |
| Client code (option) | 3 | Determine whether specific provider is provided/may be registered only in server Marking only providers (common carriers, content providers, device providers) | e.g.) It is also possible to register a variety of provider information by allocating association information per provider for each bit |

According to one embodiment, the length may indicate the length of a data area. The length may indicate the length including a redundancy code for encrypting at least one of the length of the accessory ID and the accessory ID or for error correction.

According to one embodiment, the authentication module type may include information for identifying an authentication algorithm or an authentication technique applied to at least a portion of an accessory ID (e.g., an authentication chip). For example, the authentication module type may indicate one or more of the authentication algorithm and authentication chip information. According to another embodiment, when security is not required, the authentication module type may be excluded. According to one embodiment, the processor 310 of the electronic device 100 may not perform the authentication operation using the information indicated by the authentication module type included in the accessory ID. According to one embodiment, the accessory ID may indicate non-security data using information included in the authentication module type. According to one embodiment, the authentication module type may include version information of an encryption scheme (e.g., an elliptic curve cryptography (ECC)).

According to one embodiment, the authentication module version may include a value for checking the compatibility of the authentication chip or the authentication algorithm. For example, the authentication module version may be a revision field that includes base information for compatibility checking, and the like.

According to one embodiment, the service type may indicate the type of service classification provided by the corresponding accessory device. Depending on the service type, the types of contents or functions provided by the accessory device may be determined. That is, even the accessory devices of the same type may provide different contents or functions according to service type information. For example, when the accessory device is a cover, the accessory devices may be classified into "cover authentication", "third content provider's theme accessory", or "game cover" depending on the service type included in the accessory ID, so that different services may be provided. According to one embodiment, when the service type is "cover authentication", it may be determined that the provided service is an accessory device that provides the electronic device 100 with a predetermined content (e.g., AOD image (e.g., display a predetermined image or animation on a display using a small memory resource in a low power mode using a sensor hub in a processor slip state, predetermined lock screen image) on the display when an authentication function and the cover on which authentication has been performed are maintained. According to one embodiment, when the service type is "third content provider's theme accessory service", it may be determined that the electronic device 100 or the server 120 or 130 is an accessory device associated with a predetermined service and content including one or more of a lock screen image corresponding to the theme, an AOD, a theme, a game, and an SNS using a DB (e.g., the accessory information DB 126 or 106). According to one embodiment, when the service type is a cover that is "B game service of A game company", it may be determined that a DB in the electronic device 100 or the server 120 or 130 is a B game application or a B game-related accessory device. According to various embodiments, the utilization of the service type may be extended to various types of accessories other than the cover authentication, the theme accessory, and the game cover which are described above.

According to one embodiment, the service type may further include a value capable of determining whether the white list is verified. When the white list is required to be verified, the electronic device 100 or the server 120 or 130 may determine whether a predetermined field of the corresponding accessory ID is registered in the electronic device 100 or the server 120 or 130 and may perform validity check only when the predetermined field is registered. For example, when the service type includes a value corresponding to the white list verification requirement and the service type of the accessory device is for testing, only access to the accessory authentication module 102, the content/function/policy information DB 104, the accessory information DB 106, and the content DB 108 of the electronic device 100 may be allowed and the electronic device 100 may be operate to deny access to the server 120 or 130. For example, when the service type does not include the value corresponding to the white list verification requirement and the service type of the accessory device is for testing, access to the server 120 or 130 as well as the electronic device 100 may be allowed.

According to one embodiment, the service ID is a function unique value provided by the corresponding accessory device, and may further include information associated with the accessory type. The accessory type may be included in the accessory information and may be used to determine an association relationship between services or accessory devices associated with the accessory device. The accessory type may be information corresponding to one or more of a cover (e.g., foldable cover, back cover, removable cover, attachable cover, or fingering cover), a case, an NFC dongle, a BT/Wi-Fi dongle, a wired charger, an external battery, a car charger, a wireless charger, a quick charger, an earphone, an ear cap, a thermometer, a wired and wireless earphone, a wired or wireless speaker, a smart home hub device, an electronic pen, and other electronic devices, and may be a basis for determining services provided by an electronic device or an external device in association with contents or functions.

According to one embodiment, the service ID may further include information associated with the accessory type and one or more pieces of detailed information (e.g., model/product name) associated with the accessory type. For example, when the accessory type is a cover, the service ID may further include detailed information such as a flip cover, a back cover, a fingering cover, a cover model name, which are detailed types of the cover. According to another embodiment, the service ID may be used to determine an association relationship between the various accessory devices. For example, in the case of a dedicated phone cover that is connected to a cradle accessory device (C model), the accessory type may be configured as an identifier corresponding to "cover for C model cradle cover connection", or the accessory type may be configured as "cover" and detailed information may be configured as information corresponding to "C model". As another example, service IDs of the associated accessory devices may be used to determine the corresponding association relationship through a predetermined operation in the electronic device 100 or the server 120 or 130, or may be used to determine to be an associated group through a predetermined DB. According to one embodiment, associated two service IDs may be referred to as a parent ID and a child ID. For example, the electronic device 100 or the server 120 or 130 may verify whether the same accessory model information is included in the service IDs received from two functionally connected accessory devices, and may provide a predetermined content or function based on the verification result. According to another embodiment, when the accessory device itself is capable of displaying the function or content, a device providing services through a service ID may be determined (e.g., the electronic device 100, the accessory device 110, or other device model information). For example, in the case of an accessory device having the capability to provide a mirroring function, the content may be output to another device (e.g., a monitor) other than the accessory device itself. By way of another example, in the case of a cover in which a flexible display is mounted, information received from the electronic device 100 may be output to the flexible display mounted to the cover.

According to one embodiment, the electronic device 100 may identify the type of the content to be output and may perform detailed configuration, using the service ID. For example, the electronic device 100 may identify video/audio as a content type or may assign properties such as resolution, image quality, and the like using the service ID. For example, the electronic device 100 may use association information (e.g., model name or hardware/software specification information) of the electronic device 100 or the accessory device 110 capable of providing the content included in the service ID. The association information may include information for identifying another device to be paired or information about characteristics (e.g., display resolution or supportable video codec) of another device to be paired. According to one embodiment, the service ID may be used to determine whether the electronic device 100 or the accessory device 110 is serviceable based on the corresponding association information, or may be used to select or change the content.

According to one embodiment, the serial number may be a unique value of the accessory device 110 and may include information for identifying the accessory device 110. According to various embodiments, the serial number may include one or more of items described below.

According to one embodiment, the serial number may include one or more of a unique serial number for distinguishing each accessory or a randomly generated unique value.

According to one embodiment, the serial number may be security information and may include information for authentication (e.g., one or more of a public key, an authentication key, and a unique key value generated by a predetermined rule).

According to one embodiment, the serial number may include control-related information of the electronic device 100 upon the mounting of the accessory device 110. For example, a value recorded in a specific field may be used (e.g., 0, 1). When the value of the specific field is "0", it means that the electronic device 100 can automatically recognize the accessory device 110 or provide services even in a sleep mode or a low power mode upon the mounting of the accessory device 110. For example, the specific field that is configured as "0" means that the electronic device 100 can automatically detect the mounting of the corresponding cover through a Hall sensor (e.g., 340O) of the electronic device 100 upon the mounting of the cover because the magnet of the cover is embedded in a position corresponding to the Hall sensor (for example, 340O). When the value of the specific field is equal to or greater than "1", it means that an operation such as read-write mode conversion or the like after an AP is powered on is required because the electronic device 100 cannot automatically recognize the accessory device 110 or provide services in the sleep mode or the low power mode upon the mounting of the accessory device.

According to one embodiment, the serial number may include one or more of service items and detailed items of the corresponding service. For example, the serial number may include one or more of items of the content and function associated with the service and each detailed item information. According to one embodiment, when the accessory type included in the service ID is the theme cover, service items included in the serial number may include the theme type, and detailed items included in the serial number may include theme detailed items corresponding to the theme type. For example, when the theme item is an entertainment theme of a particular entertainer, the detailed item may include information associated with contents (e.g., one or more of music player, video player, scheduler, lock screen, wallpaper image, and audio) and functions (e.g., one or more of push service, app control, related information update, content/module installation and removal, and streaming control) for controlling the corresponding content. According to one embodiment, the electronic device 100 may identify information associated with the accessory device 110 based on the service ID and may accordingly determine the quality (e.g., one or more of video resolution, content quantity, and content type) of the identified content using the service items and the detailed items.

According to one embodiment, the serial number may include direct or indirect information about a content for the recognized accessory device and a content including one or more of application installation file (APK), theme file, wallpaper, sound source, map data, and URL.

According to one embodiment, the serial number may include service policy information. For example, the serial number may include one or more of accessory validity period-related information, position/time-related motion control information, content display control, and user authority information.

According to one embodiment, the serial number may include checksum information. The serial number may further include redundancy code information of checksum data or error correction code for security of data of the serial number or the accessory ID or for error correction. The checksum code may be used to enable whether the corresponding serial number or accessory ID is generated according to a predetermined rule to be checked and to enable the electronic device 100 to perform an error correction operation (e.g., Reed-Solomon code) for correcting an error when the error occurs.

According to one embodiment, the serial number may include one or more of a user ID, user information, and user group information. In this case, the serial number may be used to determine whether the corresponding content and function are used, after the electronic device 100 or the server 120 or 130 ascertains whether the serial number corresponds to the user of the accessory device 110.

According to one embodiment, the client code may include identification information for the corresponding provider. For example, the client code may be configured as an identifier of a specific provider, or may be configured as information indicating one or more of a common carrier, a content provider, and a device provider.

Figure 6:
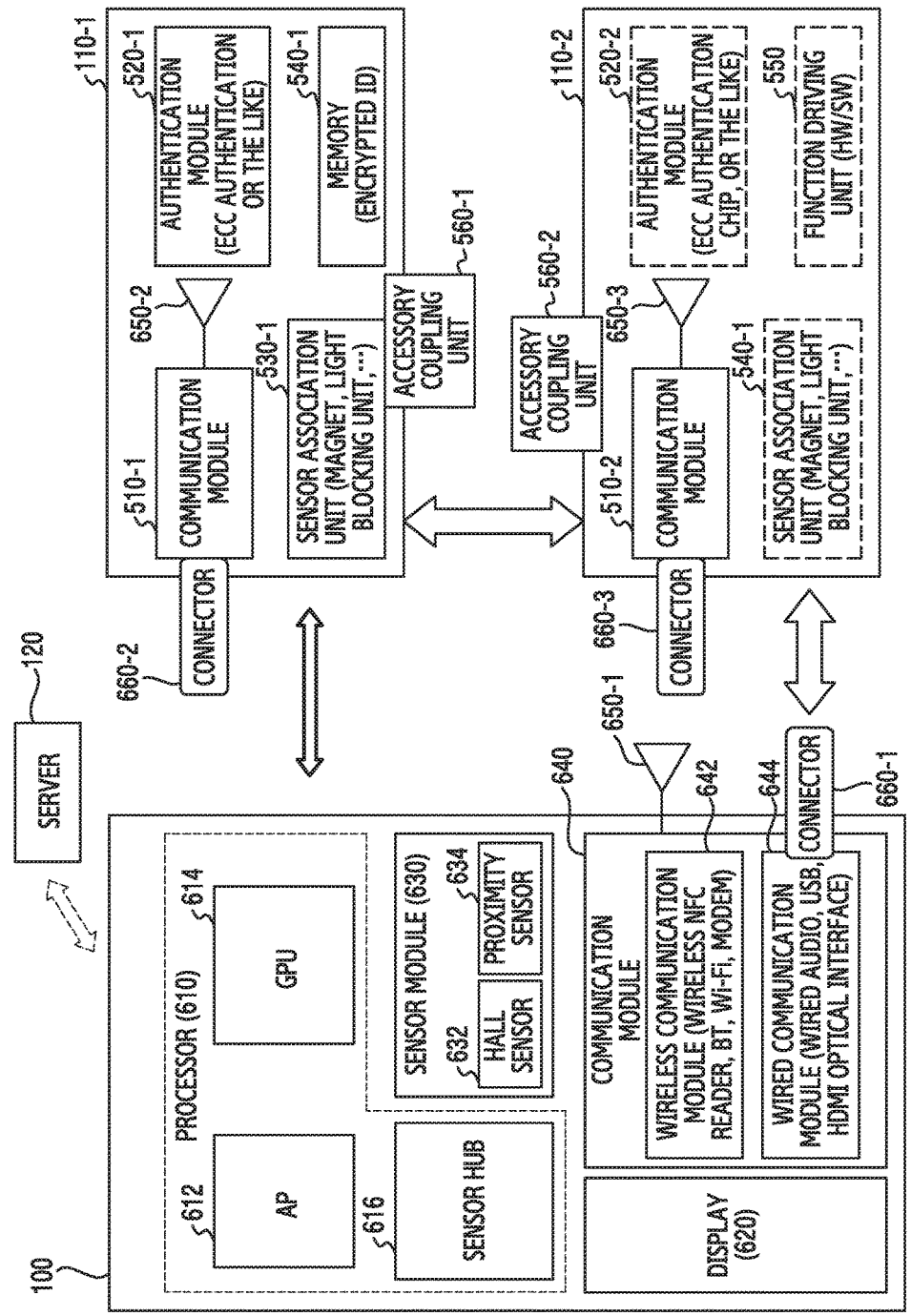
FIG. 6 illustrates the functional configuration of an electronic device and accessory devices mountable to the electronic device according to various embodiments of the disclosure.

FIG. 6 illustrates the functional configuration of an electronic device and accessory devices mountable to the electronic device according to various embodiments of the disclosure. FIG. 6 illustrates the configuration of the electronic device 100 and a plurality of accessory devices 110-1 and 110-2.

Referring to FIG. 6, the electronic device 100 may include a processor 610, a display 620, a sensor module 630, and a communication module 640. For example, the processor 610 may include one or more of an application processor 612, a GPU 614, and a sensor hub 616. For example, the sensor module 630 may include one or more of a Hall sensor 632 and a proximity sensor 634. For example, the communication module 640 may include one or more of a wireless communication module 642, a wired communication module 644, an antenna 650-1, and a connector 660-1.

The processor 610 may control, for example, the overall operations of the electronic device 100. For example, the processor 610 may control a screen display of the display 620, may control a measurement operation of the sensor module 630, and may control a signal transmission/reception operation of the communication module 640. The processor 610 may include the processor 220 of FIG. 2 and the processor 310 of FIG. 3.

The application processor 612 may control, for example, operations of other components in the electronic device 100. The application processor 612 may have at least two operation modes. For example, the application processor 612 may operate in a normal mode and a sleep mode. When the application processor 612 is operating in the sleep mode, the application processor 612 may perform at least some limited functions. The application processor 612 operating in the sleep mode may wake up by an interruption from another component (e.g., an interruption from the sensor hub 616). The GPU 614 may perform operations associated with, for example, graphics processing.

The sensor hub 616 may ascertain measurement values obtained by, for example, the sensor module 630 and may transfer the ascertained measurement values to the application processor 612. According to one embodiment, the sensor hub 616 may be a processor operating at low power. The sensor hub 616 may maintain a wake-up state with low power even if the application processor 612 is operating in the sleep mode. When a measurement value is generated by the sensor module 630 while the application processor 612 is operating in the sleep mode, the sensor hub 616 may generate an interruption to the application processor 612 and may transfer the measurement value.

The display 620 may be, for example, a device for the screen display of the electronic device 100. For example, the display 620 may include at least one of an OLED, a quantum-dot light emitting diode (QLED), and an LCD. The display 620 may be a component corresponding to the display 260 of FIG. 2 or the display 360 of FIG. 3. In addition, although not shown in FIG. 6, the display 620 may include a touch sensor and a touch IC. The touch sensor may detect a change in the measurement value according to a touch input of a user, and the touch IC may provide the measurement value to the processor 610.

The sensor module 630 may include, for example, at least one sensor (e.g., the Hall sensor 632 or the proximity sensor 634) for recognizing whether the accessory device 110-1 or 110-2 is accessed, isolated, or mounted. The Hall sensor 632 may sense a magnetic field, and may include the Hall sensor 340O of FIG. 3. The proximity sensor 634 may sense proximity of an object and may include the proximity sensor 340G of FIG. 3.

The communication module 640 may perform functions for transmitting and receiving signals through, for example, a wireless channel or a wired channel. For communication in the wireless channel, the communication module 640 may include a wireless communication module 642 (e.g., the wireless communication module 320 and an antenna 650-1 (e.g., the antenna of the RF module 329). For communication in the wired channel, the communication module 640 may include a wired communication module 644 (e.g., the wired communication module 370) and a connector 660-1 (e.g., the HDMI 372, the USB 374, the optical interface 376, or the D-sub 378, or the connector/port 379 of audio device or pen). When wireless communication is performed, the communication module 640 may perform, for example, conversion between a baseband signal and a bit stream according to a physical layer specification of the system. For example, at the time of data transmission, the communication module 640 may generate complex symbols by encoding and modulating a transmission bit stream. In addition, at the time of data reception, the communication module 640 may recover the received bit stream through demodulation and decoding of the baseband signal. In addition, the communication module 640 may up-convert the baseband signal into an RF band signal, may transmit the converted result through an antenna, and may down-convert the RF band signal received through the antenna into a baseband signal. To this end, the communication module 640 may include a transmission filter, a reception filter, an amplifier, a mixer, an oscillator, a digital to analog converter (DAC), an analog to digital converter (ADC), and the like. The communication module 640 may transmit and receive signals as described above. Accordingly, the communication module 640 may be referred to as a "transmission unit", a "reception unit", or a "transmission/reception unit".

Referring to FIG. 6, the first accessory device 110-1 may include one or more of a communication module 510-1, an authentication module 520-1, a sensor association unit 530-1, a memory 540-1, an accessory coupling unit 560-1, an antenna 650-2, and a connector 660-2. The second accessory device 110-2 may include a communication module 510-2, an authentication module 520-2, a memory 540-2, a function driving unit 550, an antenna 650-3, and a connector 660-3.

According to one embodiment, the communication module 510-1 and the communication module 510-2 may perform the function corresponding to the communication module 510 of FIG. 5, the authentication module 520-1 and the authentication module 520-2 may perform the function corresponding to the authentication module 520 of FIG. 5, and the sensor association unit 530-1 may perform the function corresponding to the sensor association unit 530 of FIG. 5. Also, the memory 540-1 and the memory 540-1 may perform the function corresponding to the memory 540 of FIG. 5, the function driving unit 550 may perform the function corresponding to the function driving unit 550 of FIG. 5, and the accessory coupling unit 560-1 and the accessory coupling unit 560-2 may perform the function corresponding to the accessory coupling unit 560 of FIG. 5. The antenna 650-2 and the antenna 650-3 may be components for emitting or detecting signals for the purpose of wireless communication of the communication module 510-1 and the communication module 510-2. The connector 660-2 and the connector 660-3 may be components for physically connecting to the electronic device 100 for the purpose of wired communication of the communication module 510-1 and the communication module 510-2.

In the structure shown in FIG. 6, the electronic device 100 (e.g., the processor 610) may receive one or more accessory IDs from the accessory devices 110-1 and 110-2 using the communication module 640, and may select or determine one or more of contents and functions associated with the accessory ID using an external device (e.g., server 120 or 130 or external device) connected through the communication module 640. At this time, the processor 610 may download the content from the server 120 or 130, and then may store or install the content.

The electronic device 100 according to various embodiments may include the communication module 640, at least one sensor, at least one processor 610 connected to the communication module 640, and the memory connected to the at least one processor 610. The memory 330 may store instructions, when executed, to cause the at least one processor 610, to perform validity check on the first accessory device 110-1 in response to detection of the mounting of the first accessory device 110-1, to determine a first content corresponding to the first accessory device 110-1, and to provide a second content corresponding to a combination of the first accessory device 110-1 and the second accessory device 110-2 in response to detection of the mounting of the second accessory device 110-2 associated with the first accessory device 110-1.

According to one embodiment, the electronic device 100 may further include at least one sensor connected to the at least one processor 610. The above-described instructions may store instructions that cause the at least one processor 610 to wake up in response to an interruption caused by detecting a predefined signal by the at least one sensor during the operation of the at least one processor 610 in the sleep mode and to recognize whether the first accessory device 110-1 or the second accessory device 110-2 is mounted by receiving a signal from the first accessory device 110-1 or the second accessory device 110-2 through the communication module 640.

According to one embodiment, the instructions may store instructions that cause the at least one processor 610 to control the communication module 640 so as to receive signals of different types in a plurality of time intervals, to recognize the first accessory device 110-1 based on a first signal of a first type received in a first time interval of the plurality of time intervals, and to recognize the second accessory device 110-2 based on a second signal of a second type received in a second time interval of the plurality of time intervals.

According to one embodiment, the instructions may store instructions that cause the at least one processor 610 to transmit at least a part of accessory-related information received from the second accessory device 110-2 to a server, to ascertain whether the second accessory device 110-2 is registered by receiving a response, to ascertain whether an association relationship between the second accessory device 110-2 and the first accessory device 110-1 is present or absent based on the accessory-related information, and to download a content corresponding to a combination of the first accessory device 110-1 and the second accessory device 110-2 when the association relationship is present.

According to one embodiment, the instructions may store instructions that cause the at least one processor 610 to ascertain the presence or absence of the association relationship based on at least one of service IDs (identifiers) indicating the accessory types of the first accessory device 110-1 and the second accessory device 110-2, service classification types corresponding to the first accessory device 110-1 and the second accessory device 110-2, and client codes of the first accessory device 110-1 and the second accessory device 110-2.

According to one embodiment, the memory 330 may store information about the association relationship between the first accessory device 110-1 and the second accessory device 110-2.

According to one embodiment, the at least one sensor may include one or more of a first sensor for detecting access of the first accessory device 110-1 and a second sensor for detecting access of the second accessory device 110-2, and the second sensor may be installed at a different position from the first sensor.

According to one embodiment, the first accessory device 110-1 may be a cover mountable to the electronic device 100, the second accessory device 110-2 may have a structure detachable to the first accessory device 110-1, and the second content may include one or more of contents dependent on the first content.

According to one embodiment, the first accessory device 110-1 may be a cover mountable to the electronic device 100, the second accessory device 110-2 may have a figure form that can be tagged to the first accessory device 110-1, and the second content may have one or more of contents dependent on the first content.

According to one embodiment, the first accessory device 110-1 may be a cover mountable to the electronic device 100 or a cable connectable to the electronic device 100, the second accessory device 110-2 may be a head unit of a vehicle connectable to the electronic device 100 via a wireless channel or the cable, the first content may include a content associated with the model of the vehicle, and the second content may change an interface displayed on a display provided in the head unit.

The accessory device 110 according to various embodiments may include the sensor association unit 530 for stimulating the sensor provided in the electronic device 100, the communication module 510 for transmitting accessory-related information to the electronic device 100, and the function driving unit 550 for controlling the connection state of the communication module 510 and the antenna.

According to one embodiment, when the communication module 510 is connected to the antenna through the function driving unit 550, the communication module 510 may receive a polling signal from the electronic device 100 and may transmit a response signal to the polling signal. According to one embodiment, the accessory device 110 may further include the accessory coupling unit 560 for coupling with other accessory devices 110. According to one embodiment, the accessory device 110 may further include the authentication module 520 that transmits accessory-related information to the electronic device 100 using the communication module 510.

Figure 7:
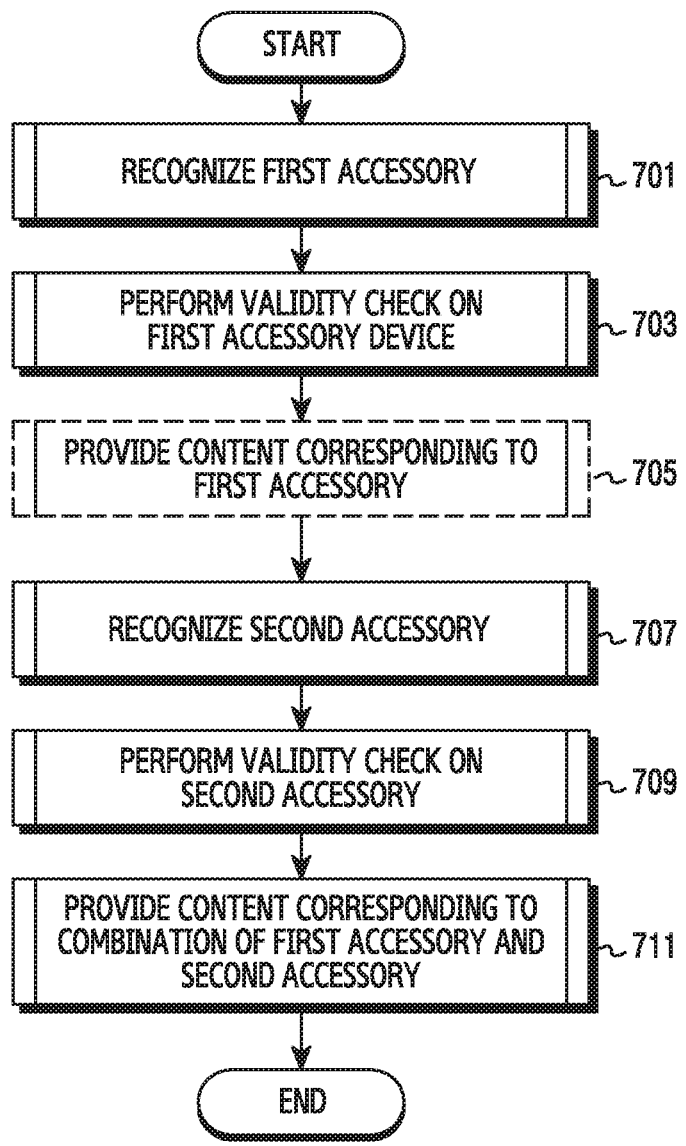
FIG. 7 is a flowchart for providing contents corresponding to a plurality of accessory devices in an electronic device according to various embodiments of the disclosure.

FIG. 7 is a flowchart for providing contents corresponding to a plurality of accessory devices in an electronic device according to various embodiments of the disclosure.

Referring to FIG. 7, in operation 701, the electronic device 100 (e.g., the processor 610) according to one embodiment may recognize the mounting or dismounting of the first accessory device (e.g., the first accessory device 110-1). The mounting or dismounting of the first accessory device may be determined according to detection of a predefined signal at a predefined position and reception of identification information (e.g., accessory ID) of the first accessory device. For example, the predefined signal may be defined in various forms, such as an electrical signal, a magnetic signal, a sound signal, a light signal, and the like.

In operation 703, the electronic device 100 (e.g., the processor 610) according to one embodiment may perform validity check on the first accessory device. For example, the validity check may include at least one of authentication for determining whether the first accessory device is authentic, ascertaining of whether the information of the first accessory device is registered in the electronic device 100 or the server 120 or 130, and ascertaining of registration information for ascertaining a content provided in this regard. According to one embodiment, the authentication may be an operation of determining whether the accessory device is a normal product, and may include an operation of ascertaining whether the first accessory device and the electronic device 100 use the same authentication rule or method or whether they have a predetermined key value. When the first accessory device is valid based on the validity check result with respect to the first accessory device, operation 705 may be performed prior to performing operation 707. The electronic device 100 may display information associated with the state of the accessory via the display 360 or the like according to the authentication result of the accessory. For example, when the accessory device is not authentic, the electronic device 100 may display a message such as "the accessory device cannot be operated because it is not authentic" or the like. In addition, when the reception of the content is not smoothly performed due to a malfunction or the like of the accessory device although the accessory device is authentic, the electronic device may display a message such as "the accessory device is abnormal and cannot be operated" or the like.

In operation 705, the electronic device 100 (e.g., the processor 610) according to one embodiment may provide a content or a function corresponding to the first accessory device. For example, the processor 610 may use the communication module 640 to download a content from a server (e.g., the server 120 or 130) and to execute the content. According to one embodiment, the content may include an application or media data (e.g., one or more of image, sound, sound source, and video), and the function may be a play-related function of the content. According to another embodiment, operation 705 may be omitted. According to still another embodiment, operation 705 may be replaced with an operation of ascertaining or determining the first content.

In operation 707, the electronic device 100 (e.g., the processor 610) according to one embodiment may recognize the mounting or dismounting of the second accessory device (e.g., the second accessory device 110-2). According to one embodiment, the processor 610 may recognize whether the second accessory device is further mounted in a state in which the first accessory device is mounted. The mounting or dismounting of the second accessory device may be determined according to at least one of detection of a predefined signal at a predefined position and reception of identification information (e.g., accessory ID) of the second accessory device. For example, the predefined signal may be defined in various forms, such as an electrical signal, a magnetic signal, a sound signal, a light signal, and the like. According to one embodiment, the second accessory device may be mounted to the electronic device 100 by being physically brought into contact with the first accessory device.

In operation 709, the electronic device 100 (e.g., the processor 610) according to one embodiment may perform validity check on the second accessory device. For example, the validity check may include at least one of authentication for determining whether the first accessory device is authentic and ascertaining of registration information for ascertaining a content provided by the first accessory device. According to one embodiment, the authentication may be an operation of determining whether the accessory device is a normal product, and may include an operation of ascertaining whether the second accessory device and the electronic device 100 use the same authentication rule or method or whether they have a predetermined key value. For example, the processor 610 may perform at least one of ascertaining of whether the information of the second accessory device is registered in the electronic device 100 and the server 120 or 130, ascertaining of whether the information of the second accessory device is associated with the information of the first accessory device, or ascertaining of registration information for ascertaining a content provided in association with the second accessory device.

In operation 711, the electronic device 100 (e.g., the processor 610) according to one embodiment may provide a content corresponding to a combination of the first accessory device and the second accessory device. The content provided in operation 711 may be different from the content provided in operation 705. In addition, even though a content corresponding to the second accessory device is separately present, the content corresponding to the combination of the first accessory device and the second accessory device may be different from the content corresponding to the second accessory device. To this end, the processor 610 may download a content from a server (e.g., the server 120 or 130) using the communication module 640 and may execute the content.

An operation method of the electronic device 100 according to various embodiments may include performing validity check on the first accessory device 110-1 in response to detection of the mounting of the first accessory device 110-1, determining a first content corresponding to the first accessory device 110-1, performing validity check on the second accessory device 110-2 having an association relationship with the first accessory device 110-1 in response to detection of the mounting of the second accessory device 110-2, and providing a second content corresponding to a combination of the first accessory device 110-1 and the second accessory device 110-2.

According to one embodiment, the operation method of the electronic device 100 may further include waking up the processor of the electronic device 100 in response to an interruption caused by detection of a predefined signal by a sensor during the operation of the electronic device 100 in a sleep mode, and recognizing the connection of the first accessory device 110-1 or the second accessory device 110-2 by receiving a signal from the first accessory device 110-1 or the second accessory device 110-2.

According to one embodiment, the operation method of the electronic device 100 may include transmitting at least a part of accessory-related information received from the second accessory device 110-2 to a server, ascertaining whether the second accessory device 110-2 is registered based on a response from the server, ascertaining the presence or absence of an association relationship between the second accessory device 110-2 and the first accessory device 110-1 based on the accessory-related information, and downloading a content corresponding to a combination of the first accessory device 110-1 and the second accessory device 110-2 when the association relationship is present. For example, the presence or absence of the association relationship may be determined based on at least one of service IDs (identifiers) indicating the accessory types of the first accessory device 110-1 and the second accessory device 110-2, service classification types corresponding to the first accessory device 110-1 and the second accessory device 110-2, and client codes of the first accessory device 110-1 and the second accessory device 110-2.

As in the embodiment shown in FIG. 7, the electronic device 100 (e.g., the processor 610) according to various embodiments of the disclosure may be functionally connected to two or more accessory devices to provide a third content different from the first content corresponding to the first accessory device and the second content corresponding to the second accessory device. That is, in various embodiments of the disclosure, a wider variety of services depending on a combination of a plurality of accessory devices may be provided. Accordingly, a new experience according to the combination of the plurality of accessory devices may be provided to a user.

In the operation of FIG. 7, the electronic device 100 (e.g., the processor 610) according to one embodiment may first detect access of the accessory device to recognize the mounting or dismounting of the accessory device. At this time, the access of the accessory device may be detected by one or more of the communication module 640, the connector 660-1, and the sensor module 630, or by a user input.

For example, the electronic device 100 (e.g., the processor 610) may detect a physical change by a sensor association unit (e.g., the sensor association unit 530) of the accessory device via the sensor, and may control a predetermined function of the electronic device 100. The application processor 612 may be driven by a magnetic field of the accessory device corresponding to the Hall sensor 632 provided in a specific position, and may control the NFC module of the wireless communication module 642 to be operated in a read mode for a specific NFC type. According to another embodiment, the processor 610 may detect the mounting of the accessory device by detecting the mounting by the communication module such as an audio connector, terminal detection when a pen or the like is inserted, or a wireless connection including BT.

According to one embodiment, the electronic device 100 (e.g., the processor 610) may detect signal reception by a circuit selected by the function driving unit of the accessory device. The signal reception may be detected based on the connection of an NFC chip and an antenna by switch control and communication signal reception by the connection of a surface acoustic wave (SAW) sensor circuit. As another example, the processor 610 may detect information selected by an input device (e.g., a touch screen panel) in the accessory device through the communication module.

According to one embodiment, the access of the accessory device may be detected by a user input. Upon application selection by a user input or wake-up of the processor 610 (e.g., the application processor 612), the processor 610 may detect the access or connection (e.g., connection via NFC, BT or Wi-Fi connection) of the accessory device. For example, when a user inputs a key (e.g., the touch panel 352, the (digital) pen sensor 354, or the ultrasonic input device 358 included in the input device 350) of the electronic device 100 in the sleep mode, the processor 610 (e.g., the application processor 612) may wake up to operate an NFC reader of the wireless communication module 642 or drive a specific application (e.g., entering a reader mode for reading a credit card, a point card, etc.).

According to the described embodiment, the electronic device 100 (e.g., the processor 610) may receive accessory information (e.g., accessory ID) from the plurality of accessory devices. The plurality of accessory devices functionally connected to the electronic device 100 may have different accessory types or have the same accessory type.

According to one embodiment, a plurality of accessory IDs may be received sequentially or simultaneously from one or more accessory devices. The plurality of accessory IDs may be received directly from each accessory device, or at least one accessory ID may be received via another device. For example, the accessory IDs of different types of accessory devices may be received via different modules. For example, when an NFC cover and an ear jack accessory device are mounted, the electronic device 100 (e.g., the processor 610) may receive one accessory ID via the wireless communication module 642 (e.g., the NFC reader) and may receive the remaining accessory IDs via the wired communication module 644 (e.g., an audio communication module (e.g., ear jack connector or audio module)).

According to one embodiment, the plurality of accessory IDs may be received via the communication module 510 of one accessory device. For example, when the accessory devices are connected via a USB, the electronic device 100 (e.g., the processor 610) may receive the accessory ID of the second accessory device 110-2 (e.g., battery, charger, external memory device, vehicle device, speaker, or smart home hub) from the communication module 510-1 (e.g., a USB Type-C cable in which an authentication chip is embedded) of the directly connected first accessory device 110-1. For example, the electronic device 100 or the first accessory device 110-1 may record the accessory ID of the second accessory device 110-2 in the memory 540-1 of the first accessory device 110-1, and the processor 610 may receive two accessory IDs from the first accessory device 110-1. Alternatively, one accessory device 110-1 or 110-2 may store a plurality of accessory IDs, and the processor 610 may receive at least one accessory ID selected by the function driving unit 550 of the accessory device 110-1 or 110-2.

By way of another example, when the access state of the corresponding accessory device is maintained after receiving the accessory ID, the electronic device 100 (e.g., the processor 610) may determine that the accessory device is in a mounted state and may control not to re-receive the accessory ID.

Figure 8A:
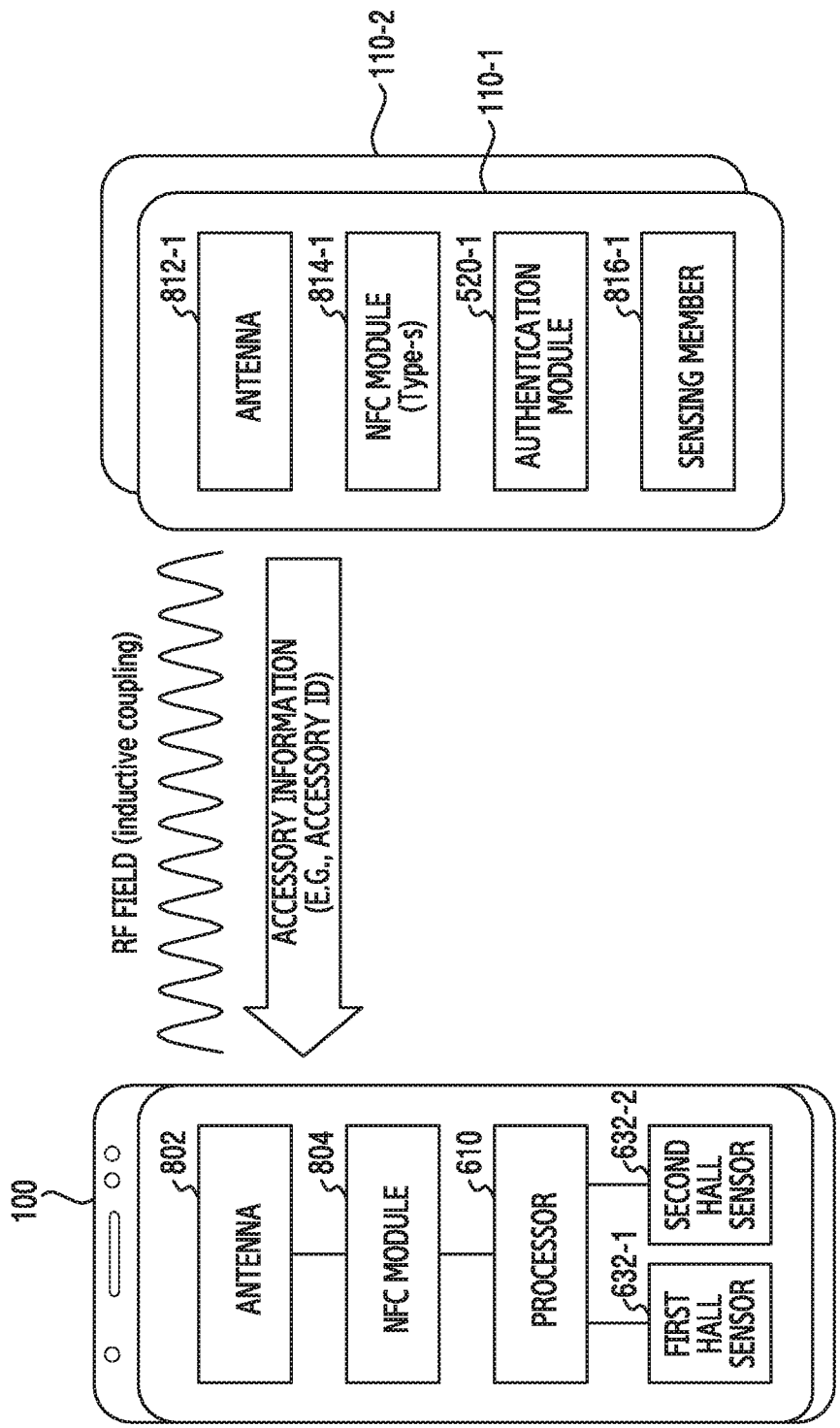
FIGS. 8A and 8B illustrate functional configurations for recognition and information exchange between an electronic device and accessory devices according to various embodiments of the disclosure.
Figure 8B:
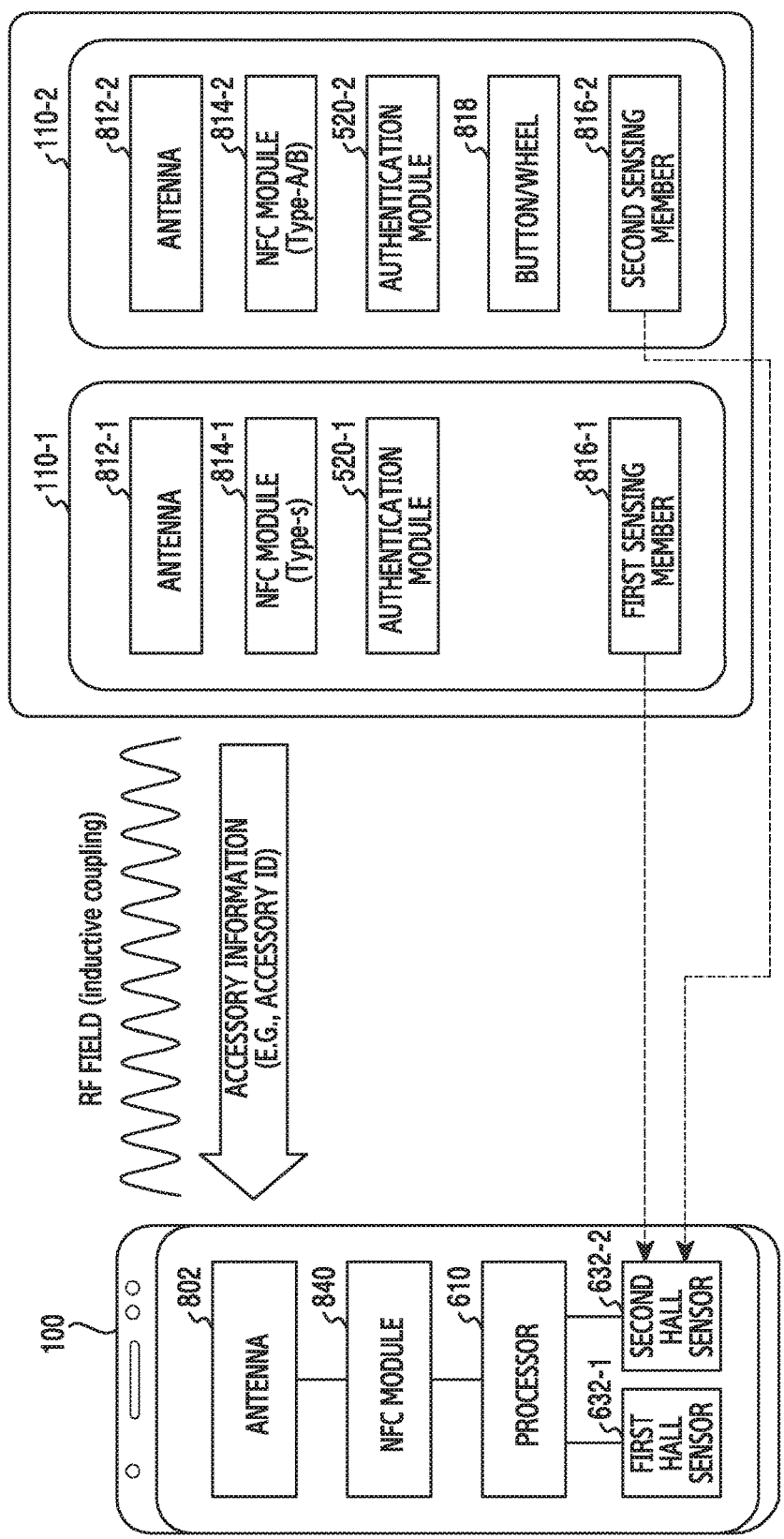

FIGS. 8A and 8B illustrate functional configurations for recognition and information exchange between an electronic device and accessory devices according to various embodiments of the disclosure. FIGS. 8A and 8B illustrate a case in which information is exchanged according to NFC technology.

Referring to FIG. 8A, the electronic device 100 may include an NFC module 804 for performing NFC communication and an antenna 802 (e.g., a loop antenna), and may include a first Hall sensor 632-1 or a second Hall sensor 632-2 functionally connected to a sensor hub 616 for detecting the attachment/detachment of the NFC type accessory device 110-1 or 110-2, a specific function operation (e.g., opening or closing of the accessory cover) of the accessory device 110-1 or 110-2, or the like. In addition, the electronic device 100 may include the processor 610 for controlling the operation (including NFC operation) of all functional modules within the electronic device 100. The first accessory device 110-1 may include an NFC module 814-1 for performing NFC communication and an antenna 812-1 (e.g., a loop antenna), and may also include an authentication module 520-1 for authentication of the first accessory device 110-1. In addition, the first accessory device 110-1 may also include a sensing member 816-1 (e.g., the sensor association unit 530-1) to allow the electronic device 100 to sense whether the first accessory device 110-1 is connected to the electronic device 100. For example, the sensing member 816-1 may include a magnet. The second accessory device 110-2 may include components that perform a similar function to one or more of the components of the first accessory device 110-1. The configuration of the second accessory device 110-2 will be described again with reference to FIG. 8B.

According to one embodiment, when the first accessory device 110-1 is mounted to the electronic device 100, a magnetic field from a magnet (e.g., the sensing member 816-1) may be sensed by the first Hall sensor 632-1. When the magnetic field is sensed by the first Hall sensor 632-1 while the application processor 612 of the electronic device 100 is in the sleep mode, the sensor hub 616 of the electronic device 100 may generate a wake-up interruption, and may allow the application processor 612 to control the NFC module 804 to be operated in a reader mode. Here, the reader mode may be referred to as an "initiator mode".

Referring to FIG. 8B, the second accessory device 110-2 may include an NFC module 814-2 for performing NFC communication and an antenna 812-2 (e.g., a loop antenna), and may also include an authentication module 520-2 for authentication of the accessory device. The second accessory device 110-2 may also include a second sensing member 816-2 (e.g., a sensor association portion 530-2) to sense whether the second accessory device 110-2 is connected to the electronic device 100. The second sensing member 816-2 may include a magnet for stimulating the second Hall sensor 632-2 of the electronic device 100. In one embodiment, the second accessory device 110-2 may further include a button/wheel 818 (e.g., the function driving unit 550).

As illustrated in FIGS. 8A and 8B, the first accessory device 110-1 and the second accessory device 110-2 may include the NFC module 814-1 or 814-2. In one embodiment, when the processor 610 of the electronic device 100 recognizes several NFC signals of the same type, the NFC signals may be unrecognizable or an error may occur. According to one embodiment, based on the location of the NFC reader that receives the NFC signal, the NFC signals may be distinguished through a plurality of reader structures in which NFC readers are located at various locations of the electronic device 100. According to another embodiment, the first accessory device 110-1 and the second accessory device 110-2 may transmit the same type of NFC signals through different frequency bands in order to distinguish the corresponding signals, so that the processor 610 may operate to distinguish the NFC signals. According to still another embodiment, the first accessory device 110-1 and the second accessory device 110-2 may employ different NFC types so that the processor 610 may operate to distinguish the NFC signals. For example, the NFC module 814-2 may support A-type or B-type NFC technology, and the NFC module 814-1 may support NFC type (e.g., dedicated NFC applied to genuine cover of Samsung Galaxy smartphone) technology other than A-type and B-type. In the following description, the other NFC type may be referred to as "S-type". The B-type NFC may be provided in a form extended from the A-type NFC. According to one embodiment, when the NFC module 804 is controlled in a p2p mode or the reader mode by the processor 610 in the electronic device 100, the NFC module 804 may periodically emit an RF signal for NFC, and when the NFC module 814-1 or 814-2 of the accessory device 110-1 or 110-2 senses the RF signal, the NFC module 804 and the NFC module 814-1 or 814-2 may perform communication. Since the RF signal of the S-type NFC is different from the RF signal of the A-type or B-type NFC, the processor 610 may distinguish between them. According to one embodiment, the processor 610 may distinguish the NFC A and the NFC B from each other by analyzing the RF signal of the NFC received through the NFC module.

Based on the structure as shown in FIGS. 8A and 8B, the mounting of the accessory devices 110-1 and 110-2 may be recognized according to operations shown in FIGS. 9A to 10C.

Figure 9A:
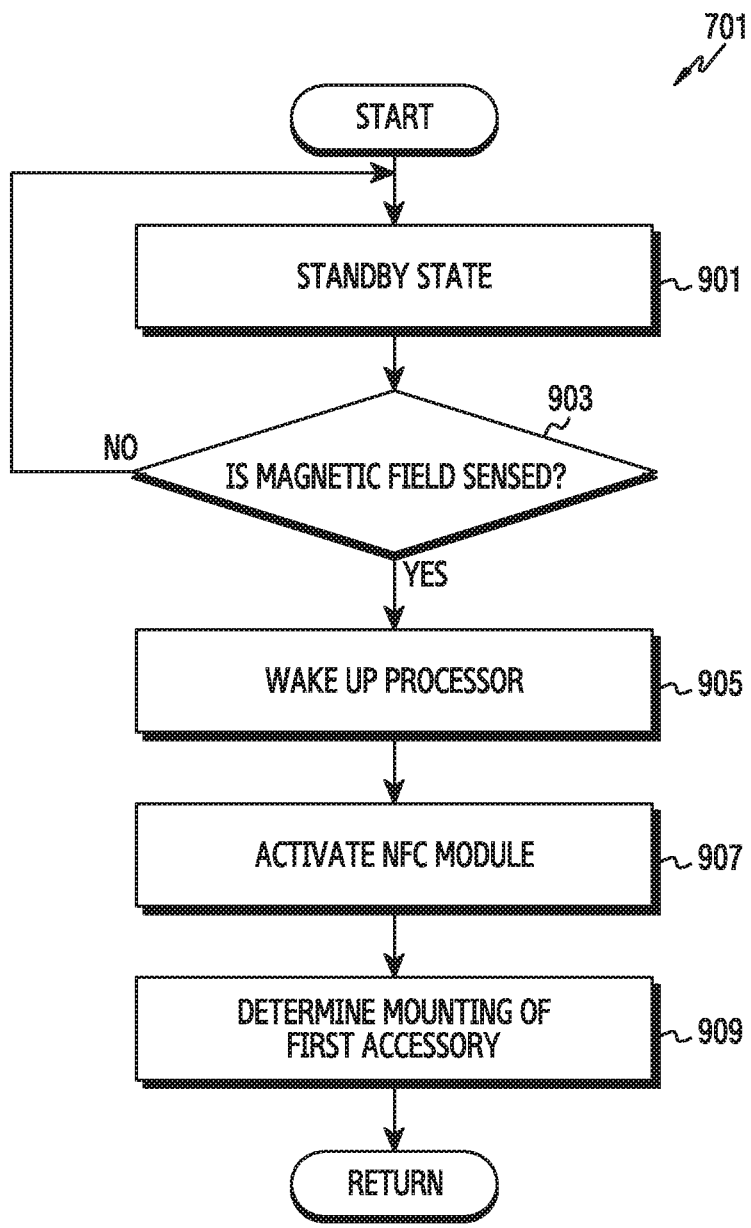
FIG. 9A is a flowchart for determining the mounting of a first accessory device in an electronic device according to various embodiments of the disclosure.
Figure 9B:
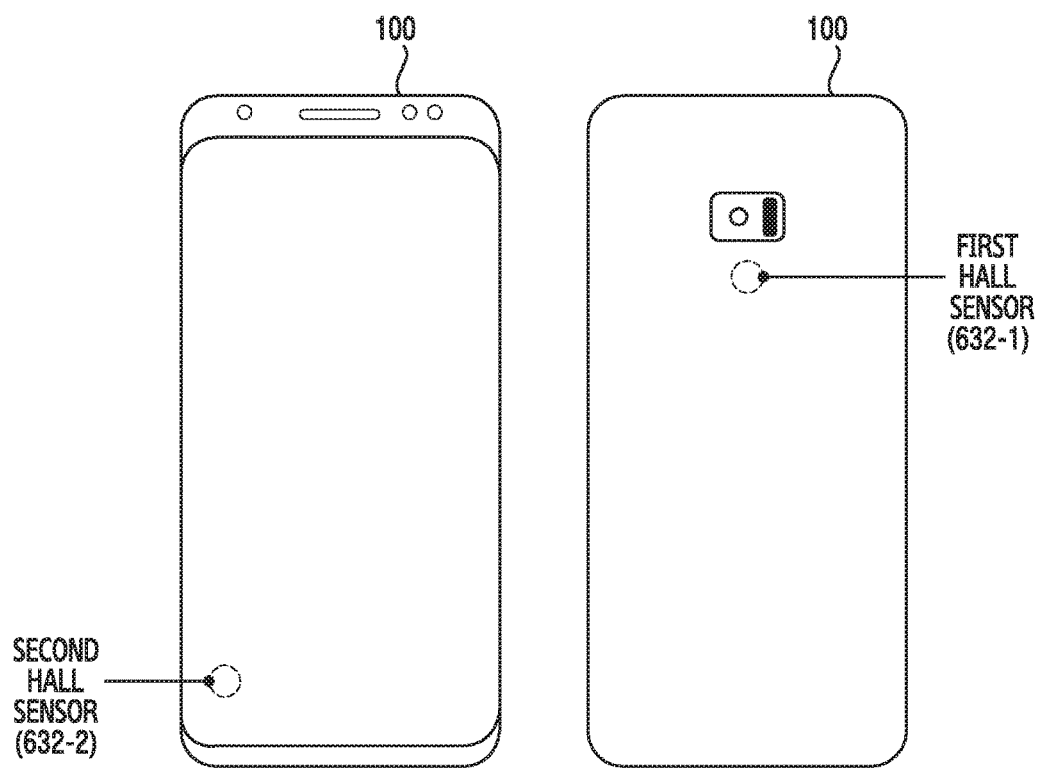
FIG. 9B illustrates an example of the installation location of Hall sensors in an electronic device according to various embodiments of the disclosure.

FIG. 9A is a flowchart for determining the mounting of a first accessory device in an electronic device according to various embodiments of the disclosure. FIG. 9B shows an example of the installation position of Hall sensors (e.g., the Hall sensor 632-1, the Hall sensor 632-2, etc.) in the electronic device according to various embodiments of the disclosure.

Referring to FIG. 9A, in operation 901, the electronic device 100 (e.g., the processor 610) according to one embodiment may operate in an initial standby state. For example, the processor 610 (e.g., the application processor 612) may be operating in a sleep mode. FIG. 9A illustrates more specific operations of operation 701 of FIG. 7.

In operation 903, the electronic device 100 (e.g., the processor 610) according to one embodiment may determine whether a magnetic field is sensed. The magnetic field may be established in a sensor association unit (e.g., the sensor association unit 530-1 or the sensing member 816-1) of a first accessory device (e.g., the first accessory device 110-1). According to various embodiments, the electronic device 100 may include at least two Hall sensors 632-1 and 632-2. The first Hall sensor 632-1 and the second Hall sensor 632-2 may be disposed with an appropriate distance therebetween to distinguish the magnetic field of the magnet included in at least two different accessory devices. For example, as illustrated in 9B, the first Hall sensor 632-1 may be mounted in the vicinity of a rear camera of the electronic device 100, and the second Hall sensor 632-2 may be mounted on a lower left side of the electronic device 100, which is spaced apart from the electronic device 100 by a predetermined distance. According to one embodiment, the sensor hub 616 of the processor 610 may maintain its operation during the sleep mode of the application processor 612 and may ascertain the detection of the magnetic field by the first Hall sensor 632-1.

In operation 905, the electronic device 100 (e.g., the processor 610) according to one embodiment may control the processor 610 to wake up. That is, the sensor hub 616 may wake up the application processor 612 by generating a wake-up interruption signal. According to another embodiment, the sensor hub 616 may display information to a user to wake up the application processor 612 via a display or audio. For example, the sensor hub 616 may press a key on the electronic device 100 or may output a guide message to perform user authentication. When the user presses the key or user authentication is performed through the input device, the application processor 612 may wake up.

In operation 907, the electronic device 100 (e.g., the processor 610) according to one embodiment may activate the NFC module 804. The processor 610 that wakes up in the sleep mode may control the NFC module 804 to enter a state capable of reading the NFC signal.

In operation 909, the electronic device 100 (e.g., the processor 610) according to one embodiment may determine the mounting of the first accessory device. For example, the electronic device 100 may receive an NFC signal transmitted from the first accessory device through the NFC module 804, and may transmit the received NFC signal to the processor 610. Accordingly, the processor 610 may determine that the first accessory device has been mounted. According to one embodiment, the NFC signal may be an S-type, an A-type, or a B-type NFC signal.

As in the embodiment illustrated in FIG. 9A, when the first accessory device 110-1 is mounted to the electronic device 100 (e.g., the processor 610) in which no accessory device is mounted, the magnetic field may be detected through the first Hall sensor 632-1, so that the first Hall sensor 632-1 may notify the sensor hub 616 of the detection of the magnetic field and the sensor hub 616 may wake up the application processor 612 by generating an interruption. The application processor 612 may transition the NFC module 804 into a reader mode or an initiator mode so that the NFC module 804 may emit magnetic flux through the antenna 802. The first accessory device 110-1 may activate the NFC module 814-1 through a current induced by the corresponding magnetic, and the NFC module 814-1 may transmit accessory-related information to the electronic device 100. The processor 610 that has received the accessory-related information may finally recognize the attachment of the accessory device through an additional authentication operation. Thereafter, as described with reference to FIG. 7, operations of recognizing the second accessory device 110-2 may be performed. Embodiments for recognizing the second accessory device 110-2 will be described below with reference to FIGS. 10A to 10C.

Figure 10A:
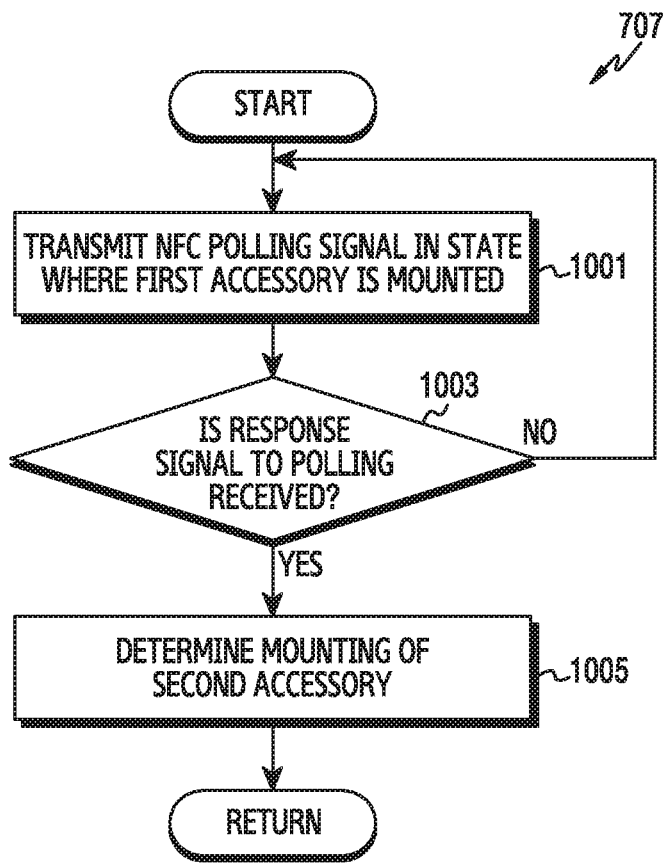
FIG. 10A is a flowchart for determining the mounting of a second accessory device in an electronic device according to various embodiments of the disclosure.
Figure 10B:
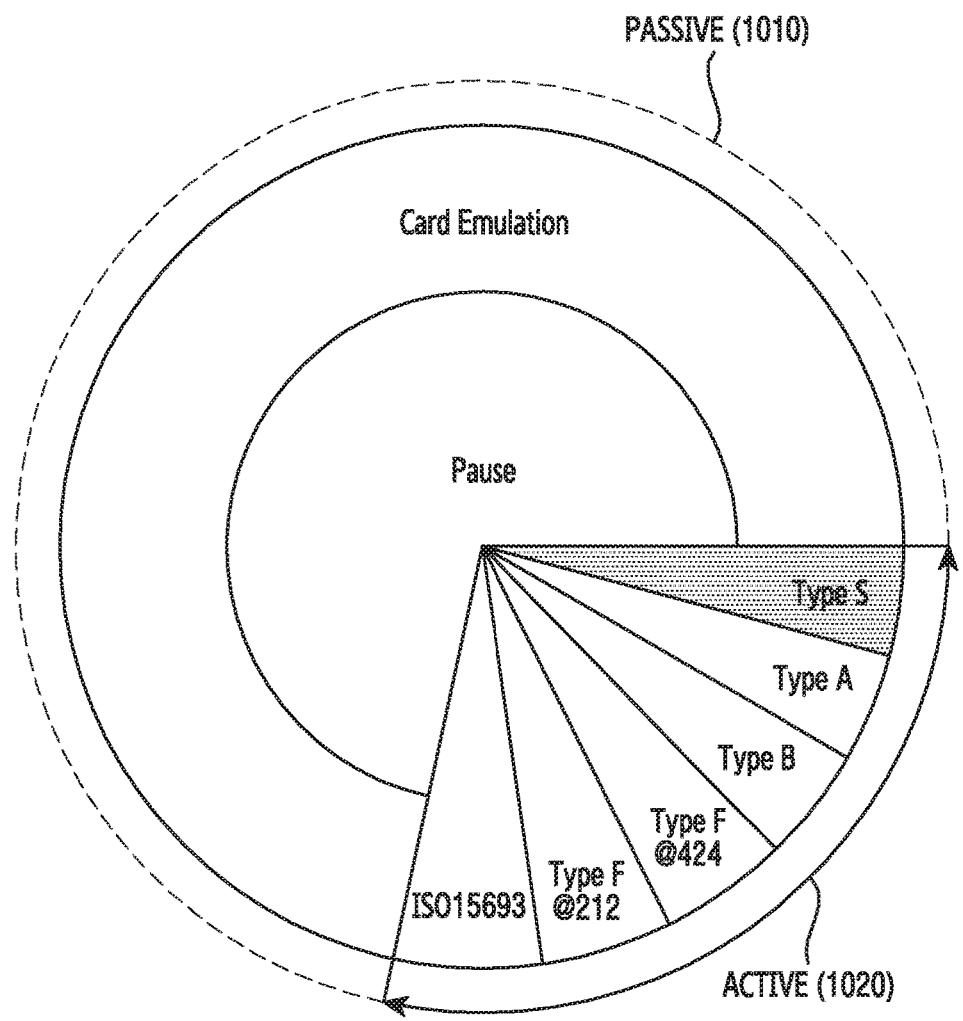
FIG. 10B illustrates the operation of a near field communication (NFC) standby mode of an electronic device according to various embodiments of the disclosure.

FIG. 10A is a flowchart for determining the mounting of a second accessory device in an electronic device according to various embodiments of the disclosure. FIG. 10B illustrates the operation of an NFC standby mode of an electronic device according to various embodiments of the disclosure. FIG. 10B illustrates more specific operations of operation 707 of FIG. 7.

Referring to FIG. 10A, in operation 1001, the electronic device 100 (e.g., the processor 610) according to one embodiment may transmit an NFC polling signal in a state in which a first accessory device (e.g., the first accessory device 110-1) is mounted. For example, the processor 610 may control the NFC module 804 to operate in a reader mode and may transmit the NFC polling signal according to a cycle shown in FIG. 10B. Referring to FIG. 10B, while the NFC module 804 is operating in an NFC reader mode, the NFC module 804 may divide a search period (NFC polling period) time into a plurality of time intervals according to NFC types, and may search for an external device (e.g., an NFC accessory device) corresponding to the NFC type corresponding to each time interval. The search period may be roughly classified into a passive interval 1010 and an active interval 1020. The passive interval 1010 may be an interval in which the transmission of the polling signal is paused and may operate in a manner that is induced through a magnetic field provided by an external reader. The active interval 1020 may be divided into a plurality of time intervals, i.e., slots, according to the NFC external device support type. The NFC module 804 may search for the corresponding type of NFC accessory device during each slot.

In operation 1001, the electronic device 100 according to one embodiment may transmit an NFC polling signal of a different type from the NFC type used by the first accessory device (e.g., the first accessory device 110-1), which is supported by a second accessory device (e.g., the second accessory device 110-2) through the NFC module 804. That is, when the first accessory device is mounted, since the NFC type of the first accessory device has already been determined, the NFC module 804 may configure only the search period corresponding to a different NFC type other than the corresponding NFC type. For example, when the NFC type supported by the first accessory device is an S-type, the NFC module 804 may not perform an operation of transmitting the NFC polling signal for the S-type in the active interval 1020. According to one embodiment, when the NFC module 804 is required to perform an operation of transmitting an NFC signal embedded in the electronic device 100 by an external reader, the NFC module 804 may operate a card emulation mode during the passive interval 1010. The card emulation may refer to a function that allows an external reader to recognize the electronic device 100 as a card using the NFC module 804.

In operation 1003, the electronic device 100 (e.g., the processor 610) according to one embodiment may determine whether a response signal to the polling signal is received. According to one embodiment, the processor 610 may use the NFC module 804 to determine whether a response signal of an NFC type that is different from the NFC type used by the first accessory device is received. For example, when the first accessory device supports an S-type NFC, the processor 610 may determine whether a response signal of an A-type or B-type NFC supported by the second accessory device is received.

In operation 1005, when the response signal to the polling signal is received, the electronic device 100 (e.g., the processor 610) according to one embodiment may determine that the second accessory device is mounted. Here, the response signal may include a response signal of the NFC type supported by the second accessory device. Here, when the response signal includes a response signal of the NFC type supported by the first accessory device, the response signal may not be used as a basis for determining whether the second accessory device is mounted.

As in the embodiment illustrated in FIG. 10A, the electronic device 100 may recognize the second accessory device 110-2 through the response to the polling signal. At this time, the second accessory device 110-2 may not always be kept in a state capable of receiving the polling signal. In this case, a user may change the state of the second accessory device 110-2 into the state capable of receiving the polling signal through the function driving unit (e.g., the function driving unit 550). An embodiment related to this will be described with reference to FIG. 10C.

Figure 10C:
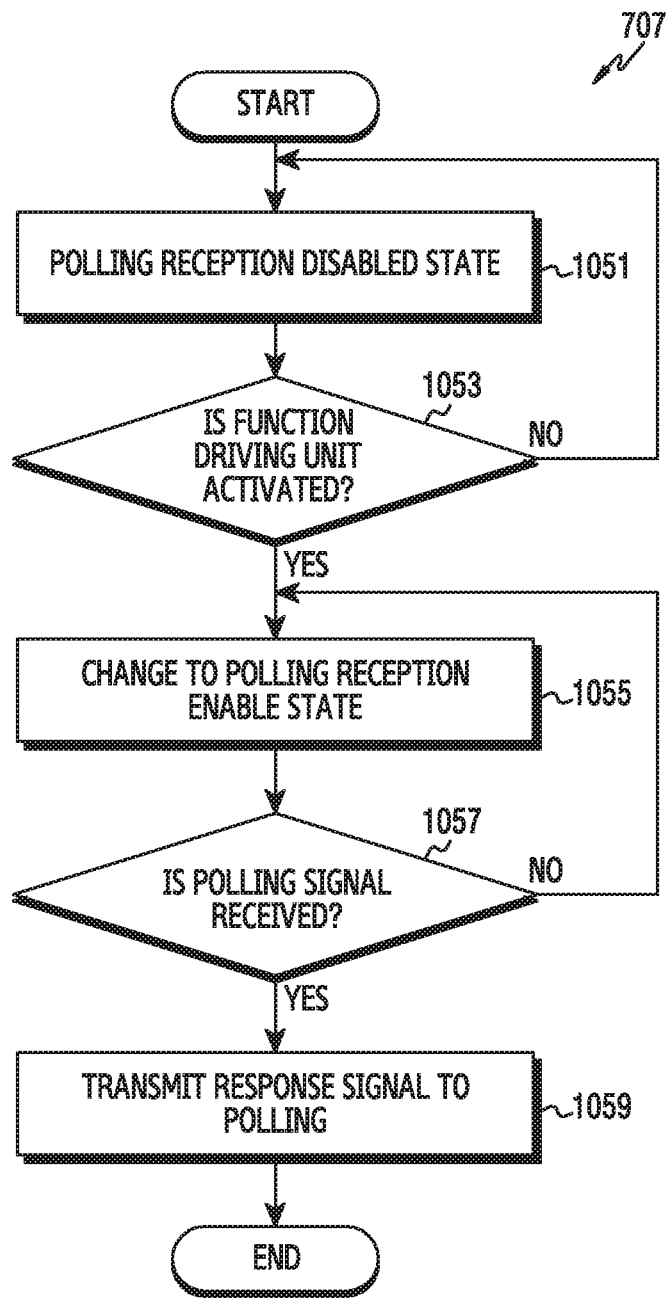
FIG. 10C is a flowchart for responding to NFC signal polling in a second accessory device according to various embodiments of the disclosure.

FIG. 10C is a flowchart for responding to NFC signal polling in a second accessory device according to various embodiments of the disclosure. FIG. 10C illustrates more specific operations of operation 707 of FIG. 7.

Referring to FIG. 10C, in operation 1051, the second accessory device 110-2 (e.g., the NFC module 814-2) according to one embodiment may operate in a polling reception disabled state. For example, the polling reception disabled state may be a state in which the antenna 812-2 and the NFC module 814-2 are functionally separated.

In operation 1053, the second accessory device 110-2 according to one embodiment may receive a user input via a function driving unit (e.g., the function driving unit 550 or a switch/button/wheel 818). According to one embodiment, the function driving unit (e.g., a toggle switch) is pressed by a user to be activated (e.g., different terminals are changed to be in a contact state with each other), and then is pressed once more to be disabled (e.g., the terminals are changed to be in a separated state from each other). According to one embodiment, whether the function driving unit is activated may be determined through the processor included in the second accessory device 110-2. According to one embodiment, the processor 610 of the electronic device 100 may determine whether the function driving unit is activated in the second accessory device 110-2 through the sensor module 630. For example, when a part of the function driving unit stimulates the Hall sensor 632-1 or the proximity sensor 634 of the electronic device 100 corresponding to the part thereof while being pressed or opened or closed, the processor 610 of the electronic device 100 may detect this and may determine whether the function driving unit of the second accessory device 110-2 is activated.

In operation 1055, when the function driving unit is activated, the second accessory device 110-2 (e.g., NFC module 814-2) according to one embodiment may be changed to be in a polling reception enabled state. For example, due to the activation of the function driving unit, the antenna 812-2 and the NFC module 814-2 may be functionally connected. According to one embodiment, the antenna 812-2 and the NFC module 814-2 may be functionally connected according to a change in the mechanical structure depending on the activation of the function driving unit. According to another embodiment, the antenna 812-2 and the NFC module 814-2 may be functionally connected according to the electronic control depending on the activation of the function driving unit.

In operation 1057, the second accessory device 110-2 (e.g., the NFC module 814-2) according to one embodiment may receive a polling signal. Here, the polling signal may include an NFC-type polling signal supported by the second accessory device 110-2. The NFC type supported by the second accessory device 110-2 may be different from the NFC type used by the first accessory device (e.g., the first accessory device 110-1). According to one embodiment, the second accessory device 110-2 (e.g., the NFC module 814-2) may determine whether the polling signal is received.

In operation 1059, when the polling signal is received, the second accessory device 110-2 (e.g., the NFC module 814-2) according to one embodiment may transmit a response signal to the polling signal. Accordingly, the processor 610 of the electronic device (e.g., the electronic device 100) may recognize the second accessory device 110-2.

According to various embodiments, the electronic device 100 (e.g., the processor 610) may recognize a plurality of accessory devices 110-1 and 110-2. For example, when the NFC accessory device is mounted to the electronic device 100, the Hall sensor 632-1 or 632-2 of the electronic device 100 may be stimulated by a magnet member included in the NFC accessory, and the NFC module 804 of the electronic device 100 may be switched to the reader mode by an interruption triggered by the Hall sensor 632-1 or 632-2 and may search for the NFC accessory device according to the cycle as shown in FIG. 10B. When the accessory device supports an S-type NFC, the accessory device (e.g., the first accessory device 110-1) may respond to the corresponding search interval, and the processor 610 may communicate with the corresponding accessory device. At this time, when the processor 610 detects a magnetic field through the Hall sensor 632-1 or 632-2 at the position corresponding to a specific NFC type and receives the accessory ID from the accessory device that supports the specific NFC type through the NFC module 804, an operation for recognizing the specific NFC type may not be performed while the magnetic field is maintained thereafter.

According to various embodiments, when the magnetic field is detected by the first Hall sensor 632-1 of the electronic device 100, the sensor hub 616 may transmit an interruption to the application processor 612, and the application processor 612 may control the NFC module 804 to read a first NFC type (e.g., S-type NFC). After the NFC module 804 of the electronic device 100 has read the first type NFC signal, the NFC module 804 may determine that the first accessory device 110-1 is mounted while the magnetic field is continuously detected by the first Hall sensor 632-1, and the NFC module 804 may omit an operation of detecting and reading the first type NFC in the cycle as shown in FIG. 10B. As a result, an operation of selecting the related content or function is not performed, so that the power consumption may be reduced. Next, whether the second accessory device 110-2 is mounted may be determined when the application processor 612 is woken up by the user input or when a predetermined application is started.

According to various embodiments, when the magnetic field is detected by the first Hall sensor 632-1 of the electronic device 100, the sensor hub 616 may transmit an interruption to the application processor 612 and the application processor 612 may control the NFC module 804 to read the first type NFC (e.g., S-type NFC). Thereafter, when the second accessory device 110-2 is mounted, the application processor 612 may control the NFC module 804 to read a second Type NFC (e.g., Type-A or Type-B NFC) depending on whether the magnetic field is detected by the second Hall sensor 632-2. At this time, when the magnetic field is detected by the first Hall sensor 632-1, the NFC module 804 may receive the second type NFC depending on whether the magnetic field is detected by the second sensor hall 632-1, without detecting the first type NFC.

According to various embodiments, when the magnetic field is detected by the first Hall sensor 632-1 of the electronic device 100, the sensor hub 616 may transmit an interruption to the application processor 612, and the application processor 612 may control the NFC module 804 to read all types of NFCs. Based on the first NFC signal received through this, the processor 610 may determine the type of the first type NFC. Next, when the second accessory device 110-2 is mounted, the application processor 612 may control the NFC module 804 to read a different type NFC other than the first type depending on whether the magnetic field is detected by the second Hall sensor 632-1. Based on the second NFC signal received through this, the processor 610 may determine and read the type of the second type NFC. At this time, when the magnetic field is detected by the first Hall sensor 632-2, the NFC module 804 may receive the second type NFC depending on whether the magnetic field is detected by the second Hall sensor 632-1 without detecting the first type NFC.

According to one embodiment, when the magnetic field disappears while it is detected by the second Hall sensor 632-2 of the electronic device 100, the sensor hub 616 may transmit an interruption to the application processor 612, the application processor 612 may convert the NFC module 804 into the reader mode, and the NFC module 804 may receive an NFC signal. For example, when the magnetic field is not detected while a front protection portion of a foldable cover providing magnetism to the second Hall sensor 632-2 opens, the processor 610 may determine that a user opens the front protection portion to use the electronic device 100. Accordingly, power may be supplied to the application processor 612 and the application processor 612 may control the NFC module 840 to receive the NFC signal from the NFC chip provided at a rear surface portion of the cover. According to another embodiment, when the magnetic field is not detected by the second Hall sensor 632-2 and any sensing state is changed (for example, changed from a non-sensing state to a sensing state), the processor 610 of the electronic device 100 may control the NFC module 804 to be operated in the reader mode, so that the NFC module 804 may receive the NFC signal.

According to one embodiment, the electronic device 100 (e.g., the processor 610) may wake up the application processor 612 of the electronic device 100 to perform communication with the NFC module 814-2 of the second accessory device 110-2, and may control the NFC module 804 by changing the NFC module 804 to be in the NFC reader mode or driving a specific application. For example, when the processor 610 of the electronic device 100 executes an application requiring high security such as a payment application (e.g., payment 485) to correspond to the second accessory device 110-2, the processor 610 may request application driving and payment operations by a user input to block unintentional information exchange.

According to one embodiment, when the second accessory device 110-2 is mounted to the electronic device 100, the electronic device 100 (e.g., the processor 610) may automatically recognize the mounting or dismounting of the accessory and may receive information about the second accessory device 110-2 from the NFC module 814-2 to the second accessory device 110-2. For example, when the second Hall sensor 632-2 of the electronic device 100 detects the magnetic field from the sensing member 816-2 of the second accessory device 110-2, the detection of the magnetic field may be made know to the sensor hub 616, the sensor hub 616 may transmit an interruption to the application processor 612, and the application processor 612 may control the NFC module 804 to read a signal from the NFC module 814-2 of the second accessory device 110-2.

In various embodiments described above, the recognition of the accessory device may be initiated from the detection of the magnetic field by the Hall sensor (e.g., the first Hall sensor 632-1 or the second Hall sensor 632-2). However, the Hall sensor is an example of a sensor for convenience of description, detection by another sensor (e.g., proximity sensor, touch sensor, light sensor, illuminance sensor, UV sensor, IR sensor, or ultrasonic sensor) may cause the recognition of the accessory device, and a combination of sensors may be used. Alternatively, a communication module (e.g., the communication module 640) may be used to detect the connection of the accessory device. For example, when an ear jack of an earphone-type accessory device is mounted to an earphone connector, the mounting of the ear jack may be detected through the electrodes of the earphone connector. For example, when an electronic pen-type accessory device is mounted to an electronic pen holder (e.g., a storage portion), the mounting of the electronic pen may be detected by contact between the electrode of the electronic pen and the electrode of the electronic pen holder. For example, when the electronic device 100 is placed on a wireless charger, a signal may be transmitted to a wireless charging module via a wireless charging coil antenna of the electronic device 100, so that proximity to the wireless charger may be sensed.

When the mounting of the accessory device is recognized as described above, an operation of performing validity check on the accessory device may be performed. The validity check on the accessory device may include authentication and ascertaining of registration information. The validity check on the accessory device may also be performed by the electronic device 100 or by the server 120 or 130, or may be performed by interworking of the electronic device 100 and the server 120 or 130. Hereinafter, various embodiments for the validity check will be described.

Figure 11A:
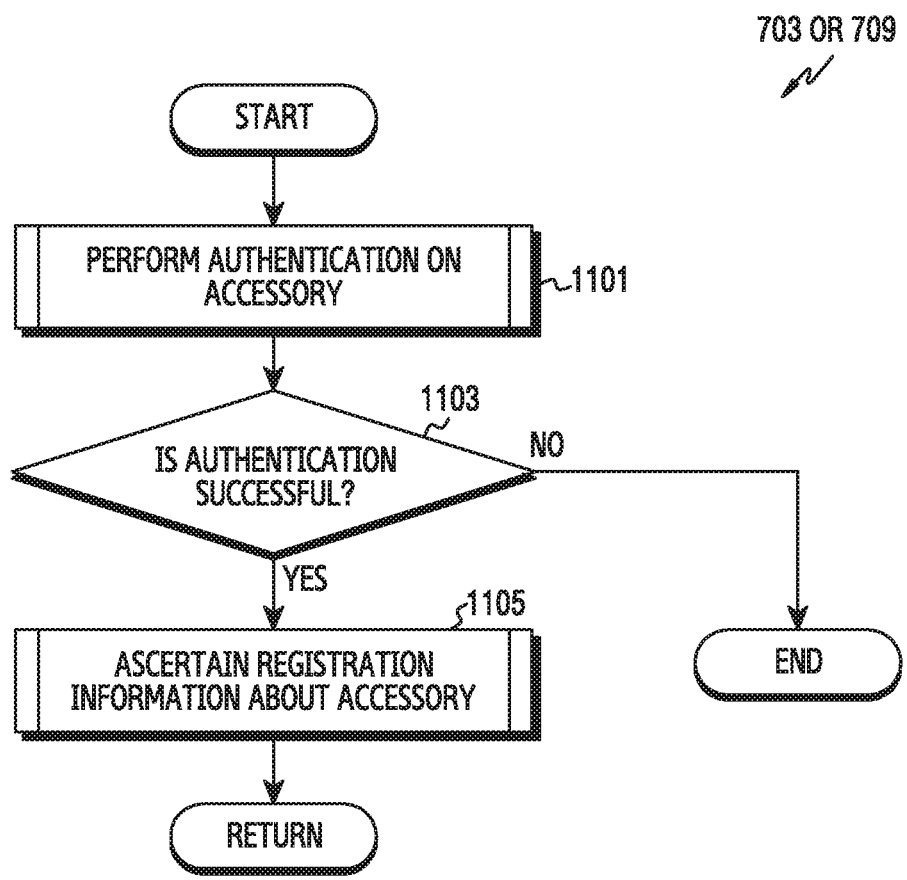
FIG. 11A is a flowchart for performing validity check on an accessory device in an electronic device according to various embodiments of the disclosure.

FIG. 11A is a flowchart for performing validity check on an accessory device in an electronic device according to various embodiments of the disclosure. FIG. 11A illustrates more specific operations of operation 703 or 709 of FIG. 7.

Referring to FIG. 11A, in operation 1101, the electronic device 100 (e.g., the processor 610) according to one embodiment may perform authentication on an accessory device (e.g., the first accessory device 110-1 or the second accessory device 110-2). Authentication may be performed based on accessory information (e.g., accessory ID) or any data (e.g., a random number) that is exchanged between the accessory device and the electronic device 100. Although not shown in FIG. 11A, prior to operation 1101, the processor 610 may determine whether authentication is required and an authentication method (e.g., authentication algorithm, authentication chip module, etc.) based on one or more of authentication module type information and authentication module version information. When authentication is not required, operation 1101 may be omitted.

In operation 1103, the electronic device 100 (e.g., the processor 610) according to one embodiment may determine whether authentication is successful. The processor 610 may determine whether authentication is successful based on data exchanged between the electronic device 100 and the accessory device, or based on a result determined by an external device (e.g., the server 120 or 130). For example, when encrypted data (e.g., encrypted accessory ID or encrypted random number) received from the accessory device is successfully decrypted, the processor 610 may determine the success of authentication.

In operation 1105, when authentication is successful, the electronic device 100 (e.g., the processor 610) according to one embodiment may ascertain registration information for the accessory device. The processor 610 may ascertain the registration information using the accessory ID. Through the registration information ascertainment, the processor 610 may determine whether a content associated with the mounted accessory device is registered, and may determine the type and contents of the registered content.

As described above, the validity check may include authentication performed based on the accessory ID and ascertaining of the registration information. According to various embodiments, the validity check may be performed by one of the electronic device 100 (e.g., the processor 610) and the server 120 or 130. Here, primary check may be performed by the electronic device 100 (e.g., the processor 610), and then secondary check may be performed by the server 120 or 130. The validity check may include one or more of authentication, generation rule verification, registration or non-registration determination, association relationship verification, and policy based availability determination. For example, the processor 610 may perform validity check using local DBs (e.g., the content/function/policy information DB 104 or the accessory information DB 106). As another example, the processor 610 may transmit at least a part of information included in the accessory ID to the server 120 or 130, and then may receive the result of the validity check performed using a DB (e.g., content/function/policy information DB 124 or accessory information DB 126) in the server 120 or 130.

According to various embodiments, the server 120 or 130 may perform authentication on the accessory ID received from the electronic device 100 (e.g., the processor 610) using the authentication module 122 or 138, and may determine the service type corresponding to the corresponding accessory device using one or more of the accessory information DB 126, the content/function/policy information DB 124, and the electronic device/user DB 128, when the accessory ID is valid based on the authentication result. According to one embodiment, the second server 130 may include the content DB 132, the accessory specification information DB 134, or the like, and may transmit information included in the content DB 132 or the accessory specification information DB 134 to the electronic device 100 through the first server 120.

According to various embodiments, when the validity check (e.g., accessory authentication and service type ascertainment) is performed in the electronic device 100, the local accessory authentication module 102 of the electronic device 100 (e.g., the processor 610) may compare the accessory ID received from the accessory device with information included in at least a part of the local accessory information DB 106 and the local content/function/policy information DB 104 and may perform authentication on the corresponding accessory device. According to one embodiment, when the electronic device 100 further includes a local device/user DB, the processor 610 may utilize the local device/user DB together. According to various embodiments, after performing authentication, the processor 610 may determine the service type. Also, the electronic device 100 may download or update at least one of a content, a function, and a policy in conjunction with the server 120 or 130 by a specific event (e.g., a predetermined period, detecting the mounting of the accessory, or receiving a synchronization command from the server).

According to various embodiments, the authentication module may be included in at least one of the electronic device 100, and the accessory device 110-1 or 110-2 in association with accessory authentication. The authentication module may be implemented in a chip or a program form, and may perform an operation of encrypting or decrypting the accessory ID, verifying whether the accessory ID complies with a predetermined generation rule, or restoring the damaged accessory ID.

According to various embodiments, a symmetric key scheme and an asymmetric key scheme may be used as the encryption/decryption technique. The symmetric key scheme may be a scheme capable of encrypting and decrypting plain text using the same key. The asymmetric key scheme may be a scheme in which data encrypted using a public key of a reception side device in a transmission side device is decrypted with a private key of the reception side device.

According to various embodiments, encryption/decryption may use the symmetric key scheme. For example, when the accessory device 110-1 or 110-2 records the encrypted accessory ID in the memory 540-1 or 540-2 of the accessory device 110-1 or 110-2, the authentication module 520-1 or 520-2 of the accessory device 110-1 or 110-2 that has received a plain text accessory ID may encrypt the accessory ID using the key and then may store the encrypted accessory ID in the memory 540-1 or 540-2. As another example, when an NFC writer writes the accessory ID through the NFC modules 814-1 to 714-2 included in the accessory device 110-1 or 110-2, the accessory ID may be encrypted through the authentication module 520-1 or 520-2 and then may be recorded.

According to various embodiments, the accessory device 110-1 or 110-2 may store a plurality of accessory IDs. For example, the accessory IDs may be stored in each of various NFC modules (e.g., the NFC module 814-1 and the NFC module 814-2) embedded in the plurality of accessory devices 110-1 and 110-2, one or more accessory IDs to be transmitted may be selected by the function driving unit (e.g., the function driving unit 550) of any one accessory device 110-1 or 110-2. In this case, the electronic device 100 (e.g., the processor 610) may receive the accessory IDs of the plurality of accessory devices 110-1 and 110-2 from one accessory device 110-1 or 110-2.

According to various embodiments, the accessory ID may be stored in each of the accessory devices 110-1 and 110-2 that can be combined with each other. When the accessory devices 110-1 and 110-2 combined using the accessory coupling unit (e.g., the accessory coupling unit 560-1 or 560-2) are mounted to the electronic device 100, the electronic device 100 (e.g., the processor 610) may receive the accessory IDs from the two accessory devices 110-1 and 110-2. To this end, one or more accessory devices 110-1 or 110-2 may include the function driving unit 550 and one or more accessory IDs to be transmitted may be selected by the function driving unit 550.

According to various embodiments, the accessory devices 110-1 and 110-2 may be connected using communication modules (e.g., the communication module 510-1 and the communication module 510-2), and the electronic device 100 (e.g., the processor 610) may receive an accessory ID of another accessory device 110-1 or 110-2 via one accessory device 110-1 or 110-2 connected to the electronic device 100.

Figure 11B:
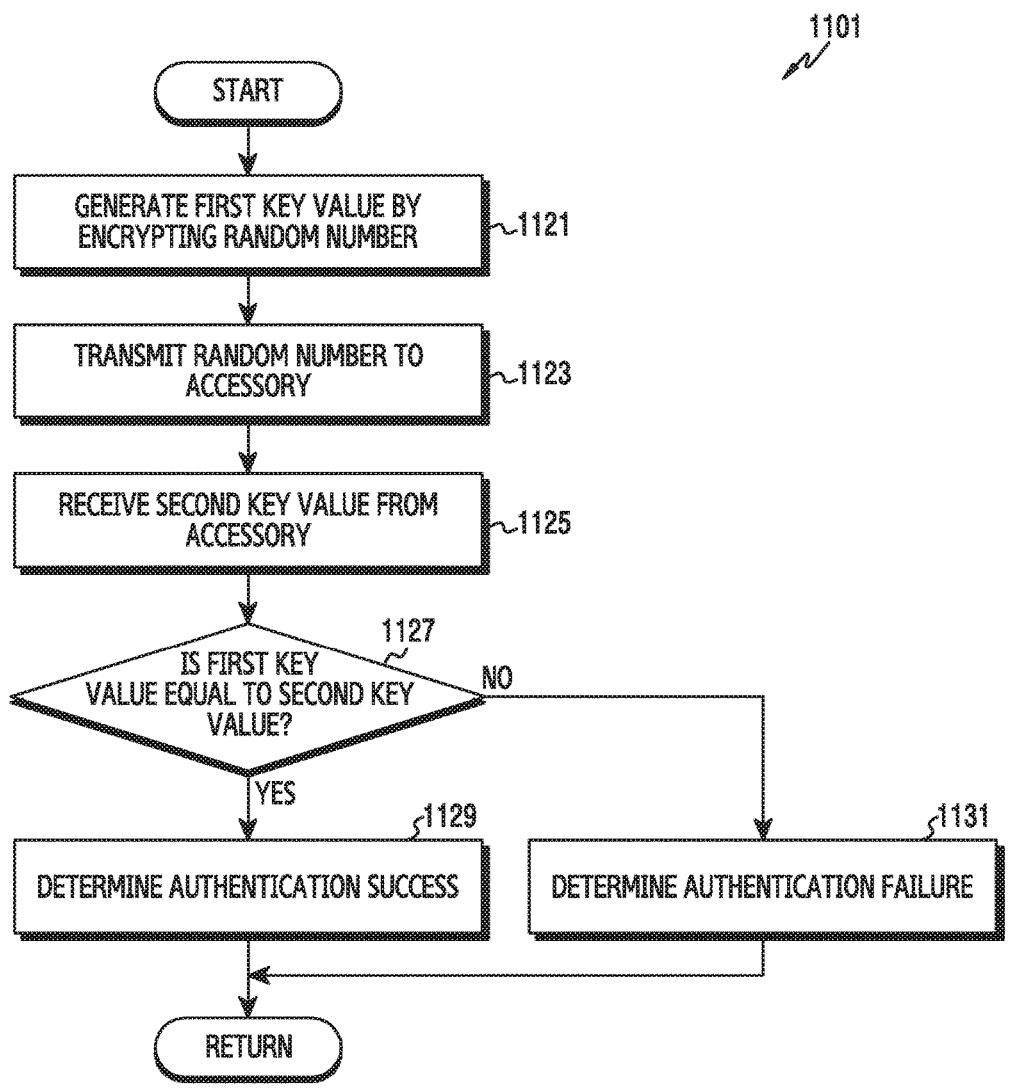
FIG. 11B is a flowchart for performing authentication on an accessory device using a random number in an electronic device according to various embodiments of the disclosure.

FIG. 11B is a flowchart for performing authentication on an accessory device using a random number in an electronic device according to various embodiments of the disclosure. FIG. 11B illustrates more specific operations of operation 1101 of FIG. 11A.

Referring to FIG. 11B, in operation 1121, the electronic device 100 (e.g., the processor 610) according to one embodiment may generate a first key value by encrypting a random number. For example, the processor 610 may generate a random number using the authentication module 102, and may generate the first key value obtained by encrypting the generated random number.

In operation 1123, the electronic device 100 (e.g., the processor 610) according to one embodiment may transmit the random number to the accessory device 110-1 or 110-2. For authentication of the accessory device 110-1 or 110-2, the processor 610 may use the communication module 640 to transmit information indicating a random number to the accessory device 110-1 or 110-2.

In operation 1125, the electronic device 100 (e.g., the processor 610) according to one embodiment may receive a second key value from the accessory device 110-1 or 110-2. The authentication module 520-1 or 520-2 of the accessory device 110-1 or 110-2 that has received the information indicating the random number from the electronic device 100 may transmit the second key value generated by encrypting the random number to the electronic device 100. That is, the processor 610 may receive the second key value corresponding to the random number encrypted by the accessory device 110-1 or 110-2.

In operation 1127, the electronic device 100 (e.g., the processor 610) according to one embodiment may determine whether the first key value is equal to the second key value. When the same encryption scheme and key are used, the first key value and the second key value generated by encrypting the same random number may be the same.

In operation 1129, when the first key value and the second key value are the same, the electronic device 100 (e.g., the processor 610) may determine that the authentication has succeeded. In operation 1131, when the first key value and the second key value are not the same, the electronic device 100 (e.g., the processor 610) may determine that authentication has failed.

Figure 11C:
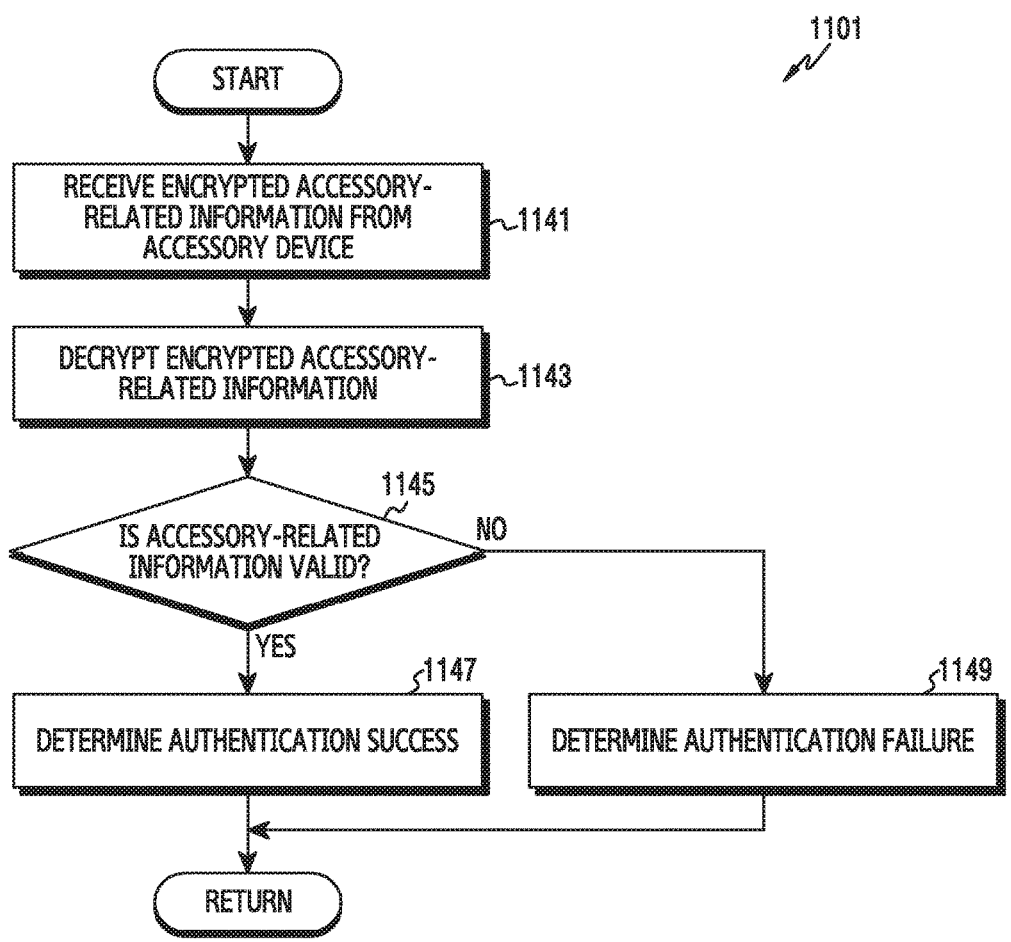
FIG. 11C is a flowchart for performing authentication on an accessory device using accessory-related information in an electronic device according to various embodiments of the disclosure.

FIG. 11C is a flowchart for performing authentication on an accessory device using accessory-related information in an electronic device according to various embodiments of the disclosure. FIG. 11C illustrates more specific operations of operation 1101 of FIG. 11A.

Referring to FIG. 11C, in operation 1141, the electronic device 100 (e.g., the processor 610) according to one embodiment may receive encrypted accessory-related information from the accessory device. For example, the accessory-related information may include all or a part of the accessory ID. When using the symmetric key scheme, the authentication module 520-1 or 520-2 of the accessory device 110-1 or 110-2 may encrypt the accessory ID using a shared key, and may transmit the encrypted accessory ID to the electronic device 100. When using the asymmetric key scheme, the authentication module 520-1 or 520-2 of the accessory device 110-1 or 110-2 that has acquired the public key of the electronic device 100 may encrypt the accessory ID using the public key of the electronic device 100 and may transmit the encrypted accessory ID to the electronic device 100.

In operation 1143, the electronic device 100 (e.g., the processor 610) according to one embodiment may decrypt the encrypted accessory-related information. For example, the processor 610 may use the authentication module 102 to decrypt the accessory ID that has been encrypted into a key by the accessory device 110-1 or 110-2 and then has been transmitted to the electronic device 100. When using the symmetric key scheme, the processor 610 may acquire a plain text accessory ID by decrypting the encrypted accessory ID into the private key of the electronic device 100. According to the asymmetric key scheme, the processor 610 may decrypt the encrypted accessory ID into the private key of the electronic device 100, thereby obtaining a plane text accessory ID.

In operation 1145, the electronic device 100 (e.g., processor 610) according to one embodiment may determine whether the accessory-related information is valid. For example, the processor 610 may use the authentication module 102 to inspect whether the decrypted accessory ID satisfies an accessory ID generation rule through checksum or the like, thereby determining whether the decrypted accessory ID is valid. By way of another example, the processor 610 may use the authentication module 102 to decrypt a minimum portion of the accessory ID, or may verify whether values included in the accessory ID are values generated by a predetermined rule using security information included in the accessory ID. By way of still another example, the processor 610 may verify whether the values included in the accessory ID are generated by the predetermined rule based on at least one of information length, checksum, parity, error correction code, field configuration, and each field value range.

In operation 1147, when the accessory-related information is valid, the electronic device 100 (e.g., the processor 610) according to one embodiment may determine that corresponding authentication has succeed. In operation 1149, when the accessory-related information is not valid, the electronic device 100 (e.g., the processor 610) according to one embodiment may determine that the corresponding authentication has failed.

As in the embodiment shown in FIG. 11C, the electronic device 100 (e.g., the processor 610) may perform authentication on the accessory device 110-1 or 110-2 using the accessory information (e.g., accessory ID). According to another embodiment, the authentication may be performed by the server 120 or 130. In this case, according to the asymmetric key scheme, the electronic device 100 may transmit the public key of the server 120 or 130 to the accessory device 110-1 or 110-2 and the accessory device 110-1 or 110-2 may encrypt the accessory ID using the received public key. At this time, the encrypted accessory ID may be passed through the electronic device 100 or may be directly transmitted to the server 120 or 130, and the server 120 or 130 may decrypt the encrypted accessory ID using its private key.

The keys according to the above-described symmetric key and asymmetric key may be used for encrypting the corresponding content. According to the symmetric key scheme, when character or animation is displayed through an output device (e.g., a display or a speaker) included in the accessory device 110-1 or 110-2, the electronic device 100 may transmit the encrypted signal, and the authentication module 520-1 or 520-2 of the accessory device 110-1 or 110-2 may decrypt the encrypted signal received from the electronic device 100 and display the decrypted signal. According to the asymmetric key scheme, when the content transmitted by the electronic device 100 to the accessory device 110-1 or 110-2 is displayed by the accessory device 110-1 or 110-2 (e.g., a cover with a flexible display mounted therein), the electronic device 100 may transmit the encrypted signal using the public key of the accessory device 110-1 or 110-2, and the authentication module 520-1 or 520-2 of the accessory device 110-1 or 110-2 may decrypt the encrypted signal received from the electronic device 100 using the private key of the accessory device 110-1 or 110-2 and then may display a content obtained from the decrypted signal.

After the authentication is performed as shown in FIG. 11B or FIG. 11C, an operation of ascertaining registration information about the accessory device may be performed. Various embodiments of the operation of ascertaining the registration information will be described below.

Figure 11D:
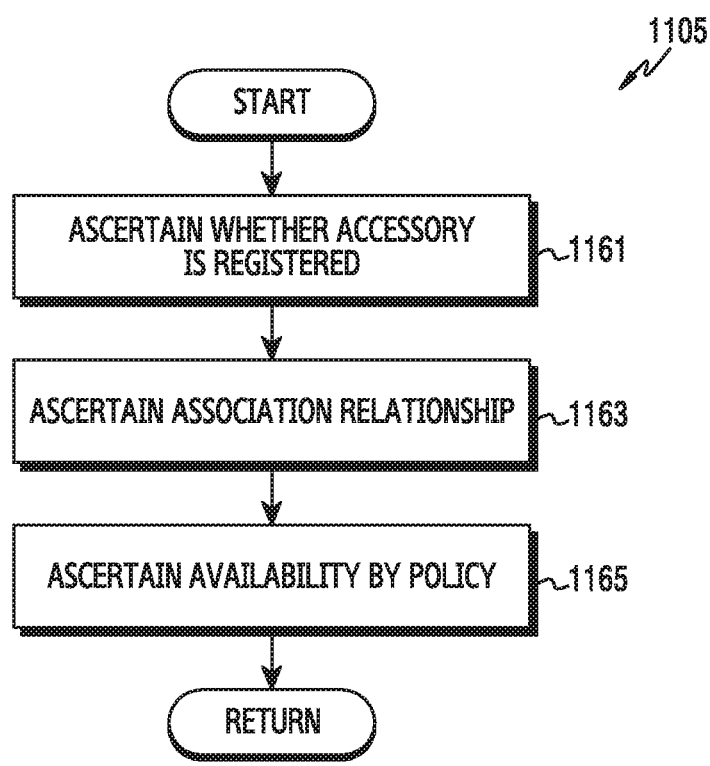
FIG. 11D is a flowchart for ascertaining registration information in an electronic device according to various embodiments of the disclosure.

FIG. 11D is a flowchart for ascertaining registration information in an electronic device according to various embodiments of the disclosure. FIG. 11D illustrates more specific operations of operation 1105 of FIG. 11A.

Referring to FIG. 11D, in operation 1161, the electronic device 100 (e.g., the processor 610) according to one embodiment may determine whether an accessory device (e.g., the first accessory device 110-1 or the second accessory device 110-2) is registered. The processor 610 may verify that the accessory ID of the authorized accessory device (e.g., the accessory device 110-1 or 110-2) is a registered accessory ID. For example, the processor 610 may use one or more of field values included in the accessory ID to ascertain whether the accessory ID is a value registered in the electronic device 100 or the server 120 or 130. For example, the processor 610 may determine whether the accessory device is registered based on whether the accessory ID is included in the accessory information DB.

In operation 1163, the electronic device 100 (e.g., the processor 610) according to one embodiment may verify an association relationship between a plurality of accessory devices (e.g., the first accessory device 110-1 and the second accessory device 110-2). For example, the processor 610 may verify an association relationship between the accessory IDs using the accessory information DB of the electronic device 100 or the server 120 or 130. For example, the processor 610 may identify the accessory ID of the first accessory device and the accessory ID of the second accessory device that are connected to the electronic device 100, and may determine whether the first accessory device and the second accessory device have the association relationship therebetween based on a service type, a service ID, or a client code included in each accessory ID. For example, the association relationship may include one or more of whether the related content is provided by the same content provider, whether a parent-child relationship is established, whether compatibility of authentication modules (e.g., the authentication module 520-1 and the authentication module 520-2) is established, whether the electronic device 100 is supportable (e.g., whether the accessory device is connectable, whether the accessory device is mountable, whether the accessory device is compatible with the connector, whether the communication module is supportable, whether the content and function according to specification such as resolution is supportable, etc.).

According to various embodiments, an accessory group may be formed by whether a plurality of accessory devices provides the related contents by the same content provider. For example, a specific game producer may sell a variety of accessory devices associated with a particular mobile game. At this time, the accessory devices may commonly include a client code or a service ID (Table 1), which refers to the same content provider or the same game content.

According to various embodiments, a parent-child relationship may include a case in which contents or functions provided by each accessory device when it is solely connected to the electronic device 100 are different from contents or functions provided when the accessory devices are connected thereto together.

According to various embodiments, accessory group identity may be information for discriminating whether a plurality of accessory devices are accessory devices corresponding to one group when they are connected to one electronic device. For example, a plurality of accessory devices such as a dedicated cover, a dedicated earphone, a dedicated USB type C cable, and a dedicated figure (e.g., NFC built-in character goods) as a package added when a smartphone is released may be included in one group. For example, a plurality of accessory devices such as a parent cover, a child cover, a dedicated figure, a dedicated holder, and an electronic pen mounted on the holder may be included in one group in a game package for a mobile phone. Accessory IDs embedded in the accessory devices included in such a package may include identifiers indicating that they are the same accessory group, or may be managed as being included in the accessory information DB as elements of one accessory group.

In operation 1165, the electronic device 100 (e.g., the processor 610) according to one embodiment may ascertain its availability by policy. The processor 610 may determine whether the corresponding content or function can be used based on the policy information included in the accessory ID. For example, the processor 610 may determine whether the corresponding content or function can be used based on at least one of validity period information of the accessory device, information on the remaining frequency of available contents, available location, user's age, and usage condition (e.g., the use of accessory-related content by association relationship) included in the policy information. According to one embodiment, when the usage is limited by a use period or use frequency information, the processor 610 may perform initialization on the extension of the use period or the cumulative use frequency through the server 120 or 130. For example, to perform initialization on the extension of the use period or the cumulative use frequency, the processor 610 may perform payment for the corresponding content using the payment application 485. According to one embodiment, the validity check may further include an operation of determining whether the content or function information associated with the accessory ID is registered in the electronic device 100 or the server.

As in the embodiment shown in FIG. 11D, registration information may be ascertained. At this time, in the case of the embodiment of FIG. 11D, the electronic device 100 (e.g., the processor 610) or the server 120 or 130 may ascertain the registration information using the accessory ID. According to another embodiment, validity check by user information or information stored in the electronic device 100 may be performed. The processor 610 may verify the association relationship by associating the user information input via the input device 350 or stored in the memory 330 or the information of the electronic device 100 with the accessory ID. For example, when the user information or the information of the electronic device 100 is included in the accessory ID, the processor 610 may determine whether the user information stored in the memory 330 or the information of the electronic device 100 is the same as or similar to the user information included in the accessory ID or the information of the electronic device 100. For example, when the user information or the information of the electronic device 100 is stored in a local DB (e.g., the accessory information DB 106) in association with the accessory ID or the accessory ID group, the electronic device 100 (e.g., the processor 610) or the server 120 or 130 may perform association check.

According to the various embodiments described above, the electronic device 100 may recognize whether the accessory device 110-1 or 110-2 is mounted, and may perform the validity check. When the validity check is completed, the electronic device 100 may provide a content corresponding to at least one mounted accessory device. Hereinafter, various embodiments for providing contents will be described.

Figure 12:
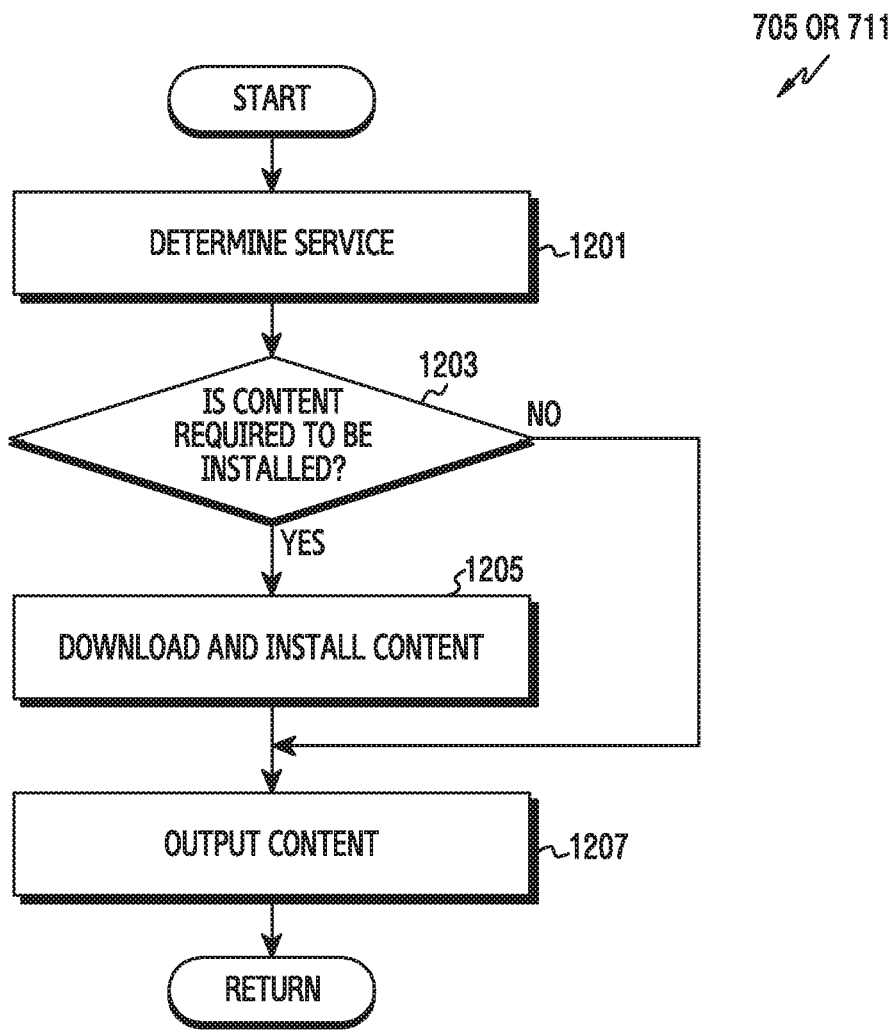
FIG. 12 is a flowchart for providing a content in an electronic device according to various embodiments of the disclosure.

FIG. 12 is a flowchart for providing a content in an electronic device according to various embodiments of the disclosure. FIG. 12 illustrates more specific operations of operation 705 or operation 711 of FIG. 7.

Referring to FIG. 12, in operation 1201, the electronic device 100 (e.g., the processor 610) according to one embodiment may determine a service. When it is determined that the service is available or the accessory device (e.g., the first accessory device 110-1 or the second accessory device 110-2) is valid (e.g., a case in which corresponding authentication is successful and registration information is ascertained) based on the validity check result, the processor 610 may determine one or more of content, function, and policy associated with the service. The processor 610 may determine one or more of the content, function, and policy registered in the DB or included in the accessory ID, based on the plurality of accessory IDs determined to be valid. For example, the processor 610 may determine one or more of the content, function, and policy associated with the service using the local DB (e.g., the content/function/policy information DB 104) of the electronic device 100, or using the DB of the server 120 or 130. The processor 610 may discern the service associated with the accessory ID based on the local DB (e.g., content/function/policy information DB 104). Alternatively, the processor 610 may transmit the accessory ID to the server 120 or 130 and may receive the result obtained by determining the service. In the case of the accessory device including a mass storage device, the accessory device may store a content corresponding to the accessory ID, so that the processor 610 may use information associated with the content, function, or policy stored in the storage device of the accessory device. For example, the information associated with the content, function or policy stored in the accessory device may include the content itself or metadata about the content. Additionally, the processor 610 may update or synchronize the content, function, or policy information associated with the discerned service to the local DB (e.g., the content/function/policy information DB 104).

In operation 1203, the electronic device 100 (e.g., the processor 610) according to one embodiment may determine whether the installation of the content is required. When the service is determined, the processor 610 may control the content and the function according to the policy. At this time, the processor 610 may determine whether the installation of a new content is required. For example, when a content to be provided is not installed, the processor 610 may determine that the installation of the content is required. As another example, when a creation date of a content file of the local content DB of the electronic device 100 has elapsed for a predetermined period or more or a predetermined update time has elapsed, the processor 610 may determine that the installation of the content is required in order to obtain version-up information.

In operation 1205, when the installation of the content is required, the electronic device 100 (e.g., the processor 610) according to one embodiment may download and install the content. On the other hand, when the installation of the content is not required, operation 1205 may be omitted. In operation 1207, the electronic device 100 (e.g., the processor 610) may output the content.

According to various embodiments, when the connection of the accessory device is detected through the accessory manager 455 of the electronic device 100 and authentication is performed based on an authentication chip (e.g., the authentication module 520), the accessory management application 486 may determine validity based on the accessory ID and may control downloading and updating operations of the corresponding app and the corresponding content. The accessory management application 486 may control the installation, upgrade, download, etc. of other apps or contents related to the service. Other service-related applications other than the accessory management application 486 may be installed or managed, and the installation and management may be performed under the control of the accessory management application 486.

According to various embodiments, when the content or the function is provided, the electronic device 100 (e.g., the processor 610) may consider a situation in which the plurality of accessory devices (e.g., the first accessory device 110-1 and the second accessory device 110-2) is mounted. When the plurality of accessory devices is mounted, the processor 610 may determine the contents or the like based on the plurality of accessory IDs. According to one embodiment, when the electronic device 100 receives information of the second accessory device 110-2 associated with the first accessory device 110-1 after the content and function associated with the first accessory device 110-1 are activated, the processor 610 may activate the content or the function associated with the second accessory device 110-2. According to another embodiment, when it is determined that the first accessory device 110-1 providing a first content and the second accessory devices 110-2 providing a second content are connected to the electronic device 100, the processor 610 may provide a third content. According to still another embodiment, when there is no association relationship between the plurality of mounted accessory devices, the processor 610 may provide a unique content to each accessory device.

According to various embodiments, the provided content may be determined based on the mounting state of the plurality of accessory devices (e.g., the first accessory device 110-1 and the second accessory device 110-2). The electronic device 100 (e.g., the processor 610) may sense that the corresponding accessory device is in a mounted state by periodically receiving the accessory ID while the accessory device is mounted. The processor 610 may sense whether the accessory device is mounted through the sensor, and may determine a change in the mounted state based on the sensor module 630 after receiving the accessory ID through the communication module 640. For example, when the processor 610 senses the mounting of the accessory device by the sensor module 630 and receives a valid accessory ID through the first one time-communication module 640, the processor 610 may determine that the accessory device is in the mounted state even though the accessory ID is not received through the communication module 640 until the sensor module 630 detects detachment/attachment of the accessory device. In addition, the connection and disconnection may be controlled through the functional driving unit (e.g., the functional or function driving unit 550) of the accessory device. For example, a sensor association unit (e.g., the sensor association unit 530) or a communication module (e.g., the communication module 510) of the accessory device may be controlled by one or more of a user input and the connection of another accessory device so as to correspond to the sensor module 630 or the communication module 640 of the electronic device 100 through the function driving unit.

According to various embodiments, the provided content may be controlled by policy information. Activation and deactivation policies may be defined based on one or more of use period information, use frequency information, available location, user's age, and usage condition of the accessory device (e.g., the first accessory device 110-1 or the second accessory device 110-2) for activating the content associated with the plurality of accessory IDs. For example, when the validity periods of the plurality of accessory devices are different from each other, whether the content is provided may be changed after the earliest expiration date. Whether the content is provided may be changed depending on a combination of the accessory devices to which other policies are applied. The content provided based on one or more of group information associated with the accessory ID and the identity of the client code may be changed. For example, the provided content or function may be changed depending on the number of the accessory devices having the same client code. For example, the processor 610 of the electronic device 100 in which various accessory devices of a particular game company (e.g., a case in which the same client code is included in the accessory ID, or the client code associated with the accessory ID is the same on the electronic device 100 or on the DB of the server 120 or 130) are mounted may add a content depending on the number of accessories of the same game equipped with a game-related content (e.g., scenario, avatar, or buff effect) provided by each accessory device, or may provide a higher level of content. Accordingly, the processor 610 may transmit one or more of the number of the accessory devices of the same company connected to the electronic device 100 and the use history thereof to a server (e.g., the server 130) of the content provider (e.g., server 130), and the server may map the received information to the corresponding user information.

The validity check operations on the described-above accessory devices (e.g., the first accessory device 110-1 or the second accessory device 110-2) may be performed by the accessory manager 455 and the accessory management application 486 of electronic device 100.

Figure 13:
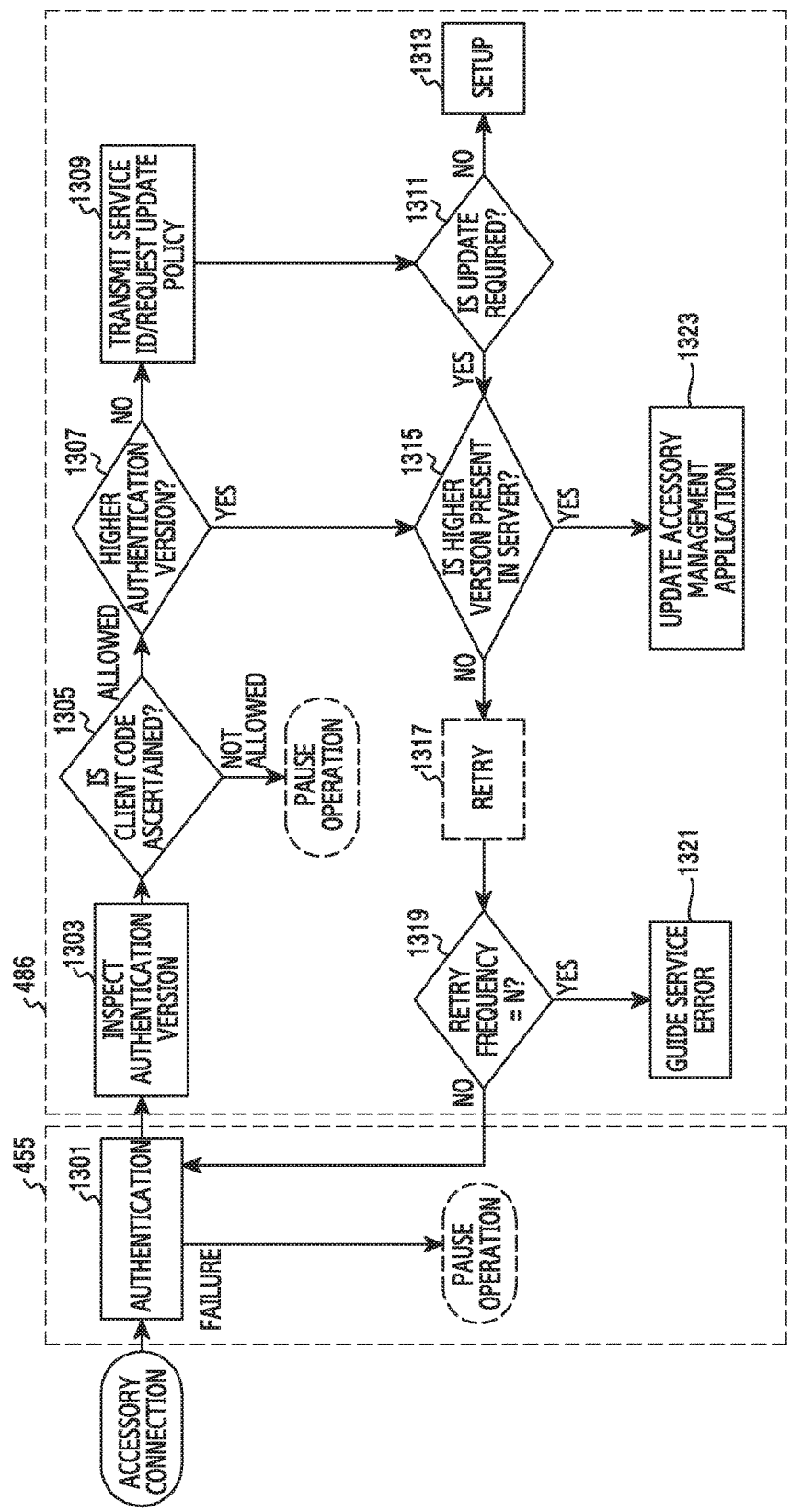
FIG. 13 is a flowchart of operations by an accessory manager and an accessory management application in an electronic device according to various embodiments of the disclosure.

FIG. 13 is a flowchart of operations by an accessory manager and an accessory management application in an electronic device according to various embodiments of the disclosure.

Referring to FIG. 13, as the accessory device (e.g., the first accessory device 110-1 or the second accessory device 110-2) is connected, in operation 1301, the accessory manager 455 according to one embodiment may perform authentication. At this time, when the authentication fails, the validity check operation may be stopped. When the authentication is successful, the accessory management application 486 is executed. In operation 1303, the management application 486 according to one embodiment may inspect the corresponding authentication version. Next, in operation 1305, the accessory management application 486 according to one embodiment may ascertain the client code.

In operation 1307, when the client code is an acceptable code, the accessory management application 486 according to one embodiment may determine whether a higher authentication version is present. In operation 1309, when the higher authentication version is absent, the accessory management application 486 according to one embodiment may transmit the service ID to the server and may request an update policy. Next, in operation 1311, the accessory management application 486 according to one embodiment may determine whether an update of the content or an update of an application associated with the content is required. In operation 1313, when the update is not required, the accessory management application 486 according to one embodiment may enter a setup operation.

When the update is required, or when it is determined in operation 1307 that the higher authentication version is present, in operation 1315, the accessory management application 486 according to one embodiment may determine whether the higher authentication version is present in the server. In operation 1317, when there is the higher authentication version, the accessory management application 486 according to one embodiment may be updated to a higher version. In operation 1317, when there is no higher authentication version, the accessory management application 486 according to one embodiment may proceed to a retry operation. Next, in operation 1319, the accessory management application 486 according to one embodiment may ascertain whether the number of times of the retry operations is n. In operation 1321, when the number of times of the retry operations is n, the accessory management application 486 according to one embodiment may output a service error notification. When the number of times of the retry operations is not n, the authentication of operation 1301 may be performed.

Figure 14A:
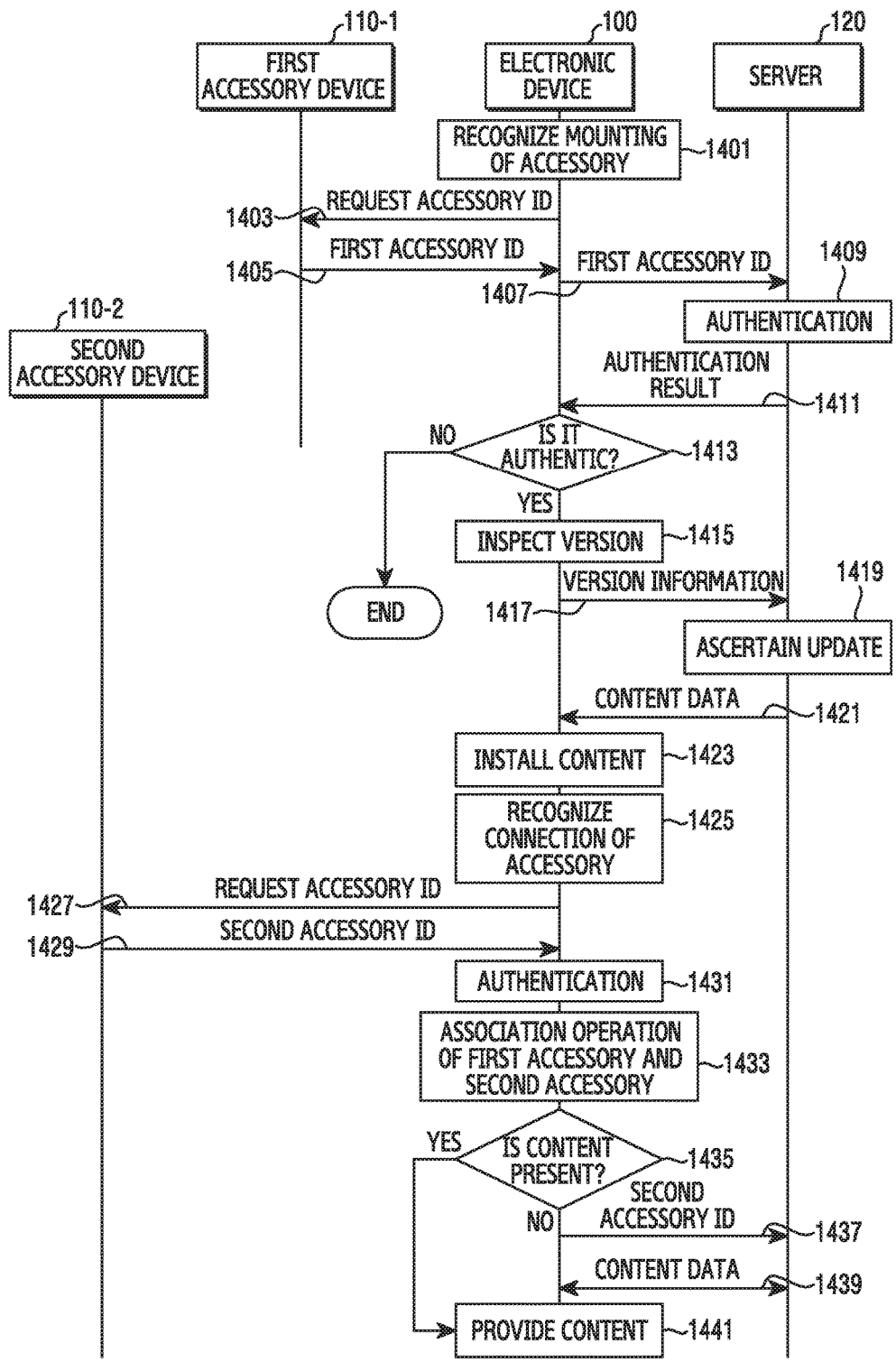
FIG. 14A illustrates an example of signal exchange for providing contents corresponding to a plurality of accessory devices according to various embodiments of the disclosure.

FIG. 14A illustrates an example of signal exchange for providing contents corresponding to a plurality of accessory devices according to various embodiments of the disclosure. FIG. 14A illustrates a case where contents corresponding to two accessory devices 110-1 and 110-2 having a parent and child relationship are provided.

Referring to FIG. 14A, in operation 1401, the electronic device 100 (e.g., the processor 610) according to one embodiment may recognize whether the first accessory device 110-1 is mounted. For example, the processor 610 may recognize the mounting of the first accessory device by detecting a predefined type of signal at a predefined location. For example, the predefined type of signal at the predefined location (e.g., a predetermined sensor located at a predetermined location) may include a magnetic field signal generated by a magnet.

In operation 1403, the electronic device 100 (e.g., the processor 610) according to one embodiment may transmit an accessory ID request to the first accessory device 110-1. For example, the processor 610 may transmit the request using a local communication technique (e.g., NFC, BT). In operation 1405, the first accessory device 110-1 according to one embodiment may transmit the first accessory ID using the communication module 510-1. According to one embodiment, the first accessory device 110-1 may transmit a first accessory ID including at least one of a service ID including a parent ID and a serial number being a unique value of the first accessory device 110-1. The parent ID may include association information associated with one or more child accessory devices (e.g., second accessory device 110-2). For example, the parent ID may be information for identifying that the first accessory device 110-1 has an association relationship with the child accessory device. For example, the parent ID may include child accessory-related information having the association relationship. For example, the parent ID may include information associated with the content or function to be provided when the associated child accessory device is mounted to the electronic device 100 together.

In operation 1407, the electronic device 100 (e.g., processor 610) according to one embodiment may transmit a first accessory ID to the server 120. In operation 1409, the server 120 according to one embodiment may perform authentication based on the first accessory ID. In operation 1411, the server 120 according to one embodiment may transmit the result of the authentication to the electronic device 100. According to another embodiment, operation 1407, operation 1409, and operation 1411 may be replaced by an operation in which the electronic device 100 performs authentication based on the first accessory ID.

In operation 1413, the electronic device 100 (e.g., the processor 610) according to one embodiment may determine whether the first accessory device 110-1 is authentic. When the first accessory device 110-1 is not authentic, the subsequent operations may not be performed. In operation 1415, when the first accessory device 110-1 is authentic, the electronic device 100 (e.g., the processor 610) according to one embodiment may inspect the corresponding authentication version. Although not shown, the processor 610 may receive the authentication version in operation 1405, or may receive the same in a separate operation. In operation 1417, the electronic device 100 (e.g., processor 610) according to one embodiment may transmit version information to the server 120. In operation 1419, the server 120 according to one embodiment may ascertain the update of the authentication version. In operation 1421, the server 120 according to one embodiment may transmit content data corresponding to the first accessory device 110-1 to the electronic device 100. In operation 1423, the electronic device 100 (e.g., the processor 610) according to one embodiment may install the corresponding content.

In operation 1425, the electronic device 100 (e.g., the processor 610) according to one embodiment may recognize whether the second accessory device 110-2 is mounted. In operation 1427, the electronic device 100 (e.g., the processor 610) according to one embodiment may transmit an accessory ID request to the second accessory device 110-2. In operation 1429, the second accessory device 110-2 according to one embodiment may transmit a second accessory ID including at least one of a child ID and a serial number. According to one embodiment, the second accessory device 110-2 may include one or more of the service ID including the child ID and the serial number that is a unique value of the second accessory device. The child ID may include association information associated with one or more parent accessory devices (e.g., the first accessory device 110-1). For example, the child ID may be information for identifying that the second accessory device 110-2 is associated with the parent accessory device. For example, the child ID may include information associated with the parent accessory having the association relationship. For example, the child ID may include information associated with the content or function to be provided when the parent accessory device having the association relationship is mounted to the electronic device 100 together.

In operation 1431, the electronic device 100 (e.g., the processor 610) according to one embodiment may perform authentication based on the second accessory ID. When the second accessory device 110-2 of the child accessory, is mounted to the first accessory device 110-1 of the parenthood accessory, the processor 610 may ascertain the ID of the child accessory device based on information associated with authentication stored in a local DB (e.g., the accessory information DB 106), and then may perform authentication on the second accessory device 110-2. According to another embodiment, the authentication of operation 1431 may be performed by the server 120. When authentication on the second accessory device 110-2 is not required, operation 1431 may be omitted.

In operation 1433, the electronic device 100 (e.g., the processor 610) according to one embodiment may determine whether the parent ID and the child ID are associated with each other. For example, the processor 610 may use the first accessory ID and the second accessory ID to determine whether the first accessory device 110-1 and the second accessory device 110-2 are associated with each other. For example, the processor 610 may determine whether the first accessory device 110-1 and the second accessory device 110-2 are included in a predetermined accessory group using the DB (e.g., the accessory information DB 106 or the accessory information DB 126) stored in the electronic device 100 or the server 120. For example, the processor 610 may determine whether the first accessory device 110-1 and the second accessory device 110-2 are associated with each other based on the first accessory ID and the service ID of the second accessory ID. According to one embodiment, the operation of determining the association relationship may be performed using the accessory information DB 126 of the server 120 by the processor 610 of the electronic device 100 or a processor (not shown) of the server 120. For example, the processor 610 may determine whether the service ID of the first accessory device 110-1 is associated with at least a part of the accessory ID of the second accessory device 110-2. According to one embodiment, in operation 1433, the processor 610 may associate the ID of the second accessory device 110-2 with the ID of the first accessory device 110-1. For example, the processor 610 may couple or combine at least a portion of the first accessory ID of the first accessory device 110-1 and at least a portion of the second accessory ID of the second accessory device 110-2 to generate a new ID, and the new ID configured to be included in one set may be used to discern the related content and whether the content is installed.

In operation 1435, the electronic device 100 (e.g., the processor 610) according to one embodiment may determine whether the content corresponding to the combination of the first accessory device 110-1 and the second accessory device 110-2 is installed. According to one embodiment, in operation 1437, when the content is not installed, the electronic device 100 (e.g., the processor 610) according to one embodiment may transmit the second accessory ID of the second accessory device 110-2 to the server 120. At this time, the processor 610 may retransmit the first accessory ID. According to various embodiments, in operation 1437, when the content is not installed, the electronic device 100 (e.g., the processor 610) according to one embodiment may transmit information generated through an association operation (e.g., operation 1433) of the first accessory ID and the second accessory ID to the server 120.

In operation 1439, the server 120 according to one embodiment may transmit content data to the electronic device 100. Next, in operation 1441, the electronic device 100 (e.g., the processor 610) according to one embodiment may provide the content or the function corresponding to the combination of the first accessory device 110-1 and the second accessory device 110-2. According to one embodiment, the first accessory ID and the second accessory ID may be managed as members of one accessory group in the DB (e.g. the accessory information DB 106 or the accessory information DB 126) of the electronic device 100 or the server 120.

Figure 14B:
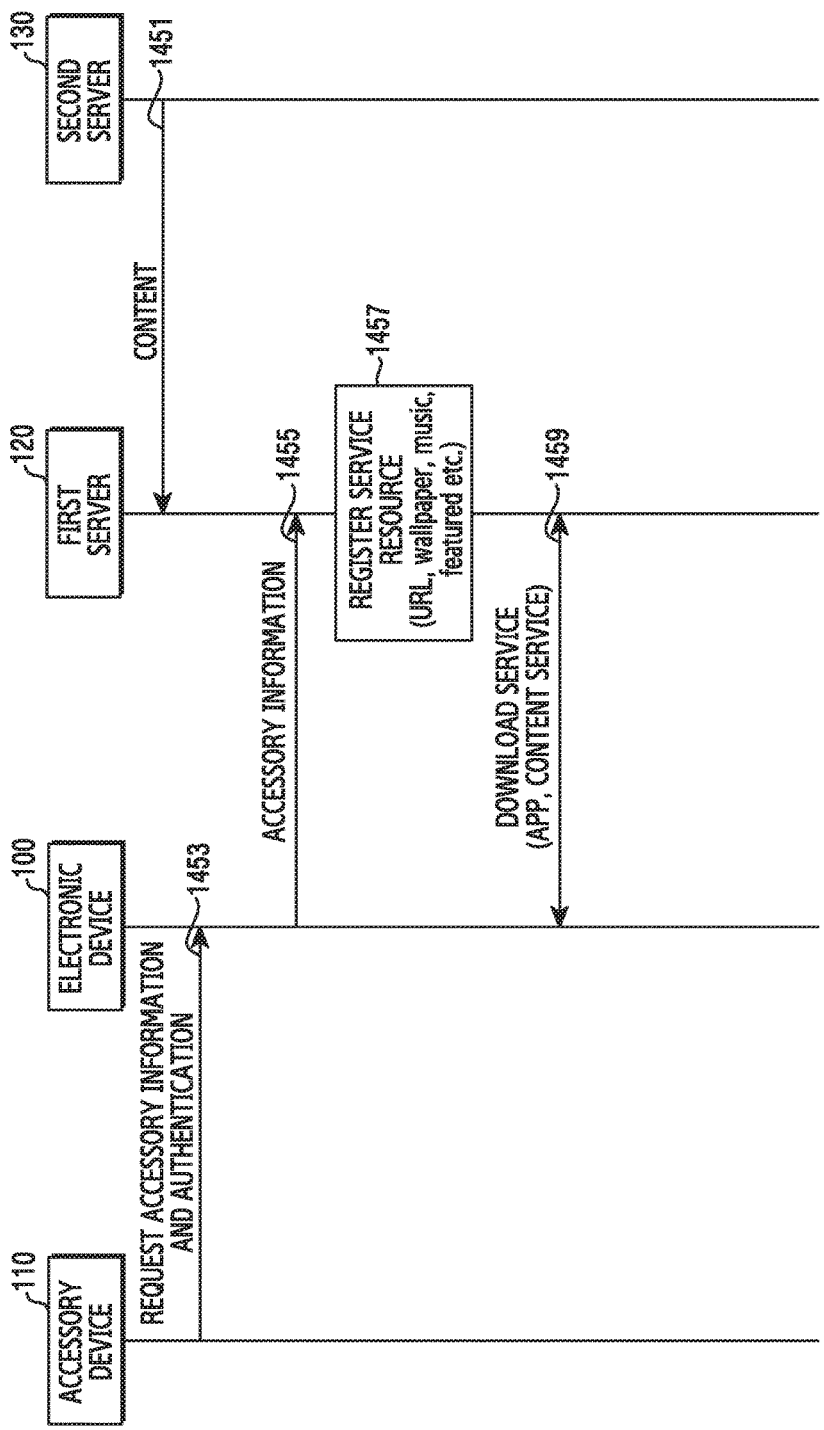
FIG. 14B illustrates another example of signal exchange for providing contents corresponding to a plurality of accessory devices according to various embodiments of the disclosure.
Figure 14C:
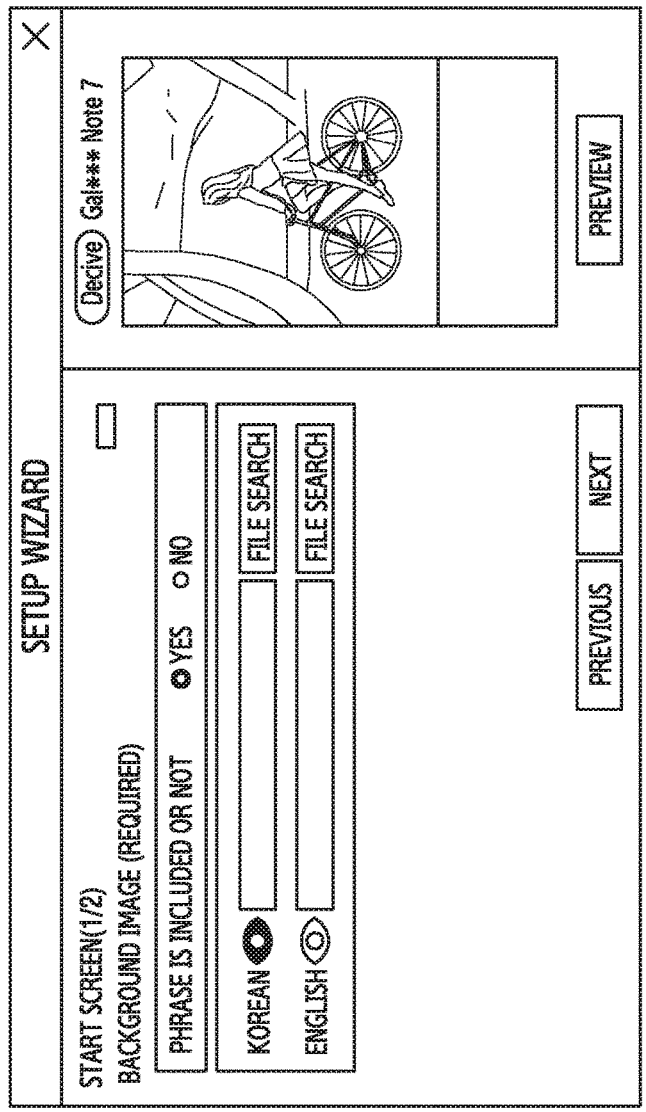
FIGS. 14C and 14D illustrate interfaces for configuring a content according to various embodiments of the disclosure.
Figure 14D:
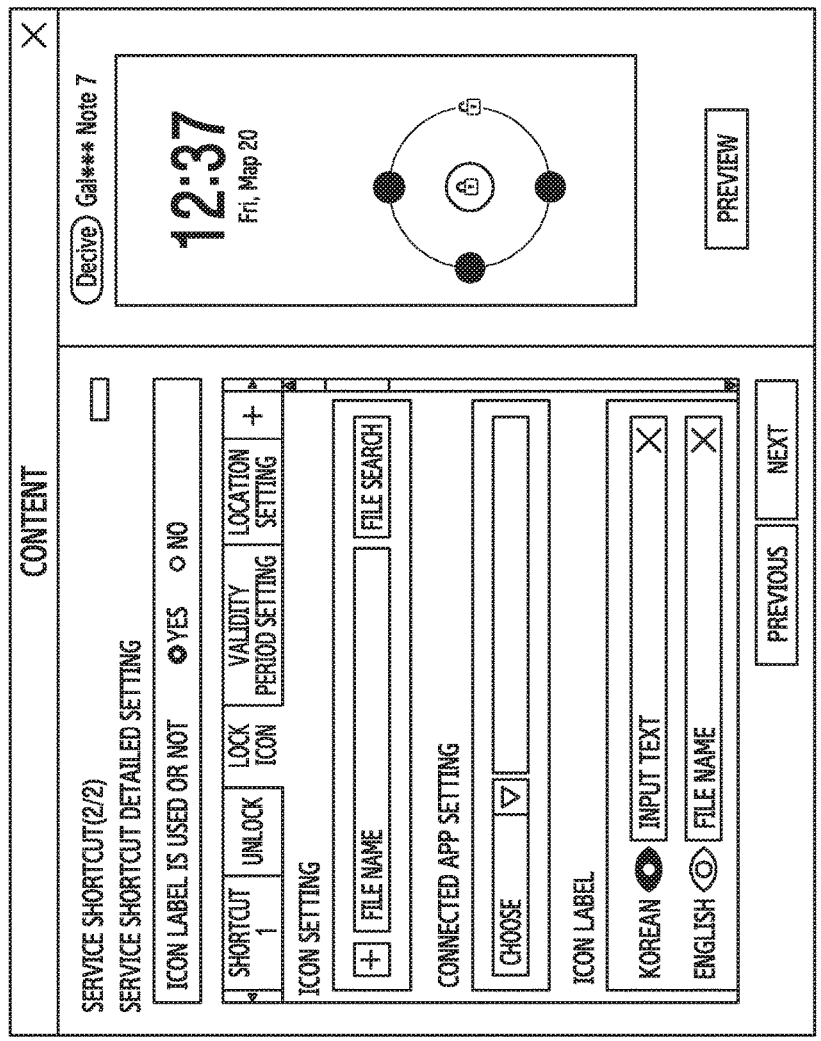

FIG. 14B illustrates another example of signal exchange for providing contents corresponding to a plurality of accessory devices according to various embodiments of the disclosure. FIGS. 14C and 14D illustrate interfaces for configuring a content according to various embodiments of the disclosure. FIG. 14B illustrates a case in which configuration for a content is performed by the first server 120.

Referring to FIG. 14A, in operation 1451, the second server 130 according to one embodiment may transmit the corresponding content to the first server 120. The second server 130 may be a server for managing the content, and may be referred to as a third party server. For example, the second server 130 may transmit registration accessory information and service resources to the first server 120.

In operation 1453, the accessory device 110 according to one embodiment may transmit one or more of accessory information (e.g., accessory ID) and an authentication request to the electronic device 100. For example, the accessory device 110 may transmit one or more of the accessory ID and the authentication request in a state in which the accessory device 110 is mounted to the electronic device 100. The electronic device 100 (e.g., the processor 610) may receive one or more of the accessory ID and the authentication request via the accessory manager 455. In operation 1455, the electronic device 100 (e.g., the processor 610) according to one embodiment may transmit the accessory ID to a first server 120.

In operation 1457, the first server 120 according to one embodiment may register a service resource. For example, the registration of the service resource may include a configuration operation associated with the corresponding content. According to one embodiment, the configuration associated with the content may be performed through an interface as shown in FIG. 14C or FIG. 14D. FIGS. 14C and 14D can be understood as examples of interfaces provided such that a manufacturer or a user configures information associated with the content. Through the interface shown in FIG. 14C or 14D, the first server 120 may configure operations at the time of the connection of the electronic device 100 and the accessory device 110, and configurable items may include one or more of items which are described in Table 3 below.

TABLE 3

| Large category | Small category | Contents |
|---|---|---|
| Content configuration | Background | Configure wallpaper of electronic device or background image of lock screen |
| | Phrase | Configure phrase to be displayed on screen or displayed phrase for each language of electronic device |

TABLE 3-continued

| Large category | Small category | Contents |
|---|---|---|
| | Icon | Configure icon image to be used for function (e.g., telephone) of electronic device |
| Function configuration | Shortcut configuration | Configure shortcut function to be provided on lock screen, and determine position where shortcut function is displayed |
| | Content configuration | Input information and content about additional functions such as SNS accounts, contacts, or music tabs to be added to application of electronic device |
| Policy configuration | Validity period | Configure content/function to be applied only for a fixed period of time |
| | Frequency | Configure content/function to be applied by fixed number of times |
| | Location | Configure content/function to be applied only in fixed location |
| | Age | Configure content/function to be applied only for user of fixed age |
| | Condition | Configure content/function to be applied only for fixed accessory association relationship |

In operation 1459, the electronic device 100 (e.g., the processor 610) according to one embodiment may receive a service-related content from the first server 120. The first server 120 may receive the corresponding content according to service resource registration (e.g., content-related configuration) performed in operation 1457.

Figure 15A:
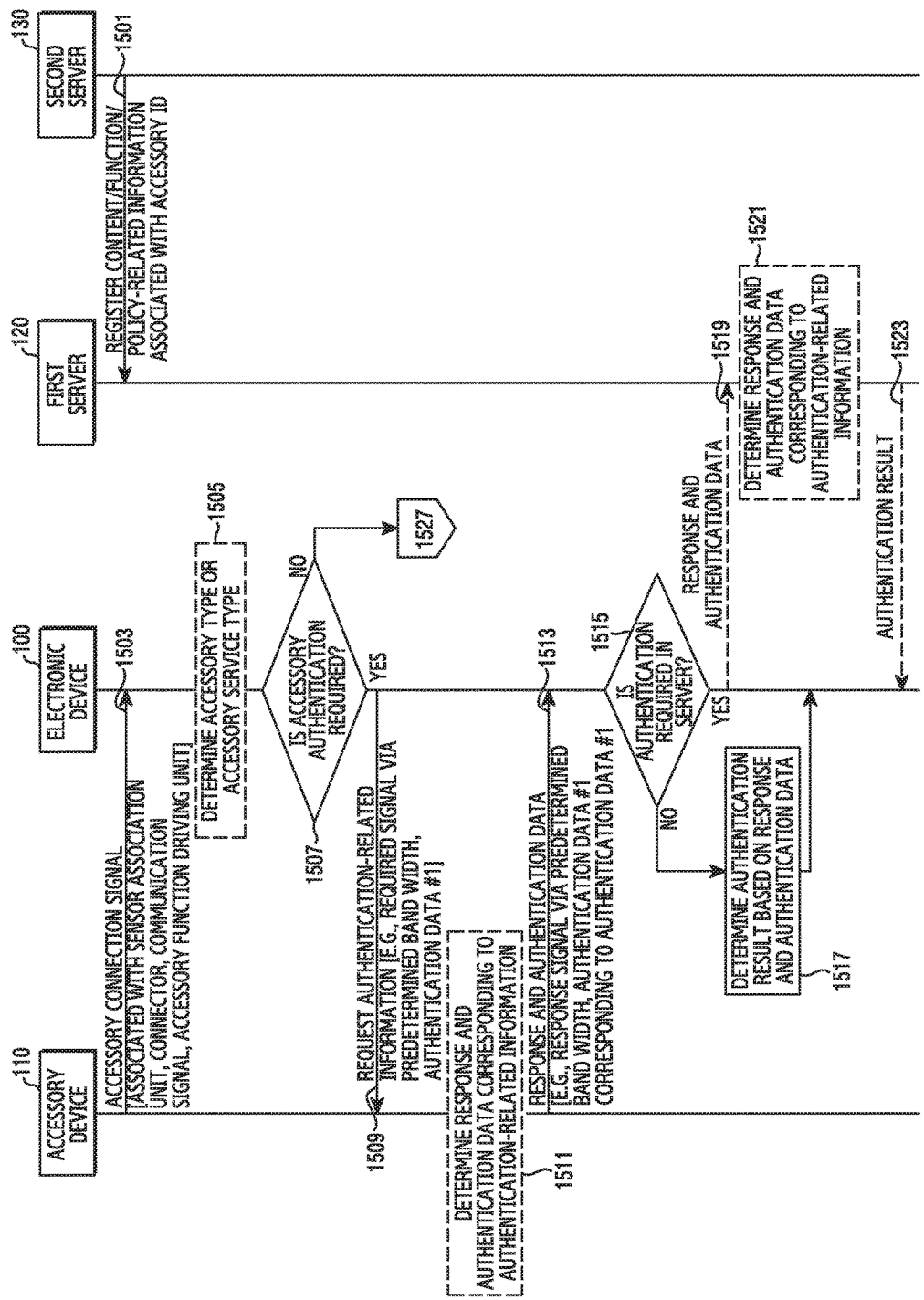
FIGS. 15A and 15B illustrate still another example of signal exchange for providing a content corresponding to an accessory device according to various embodiments of the disclosure.
Figure 15B:
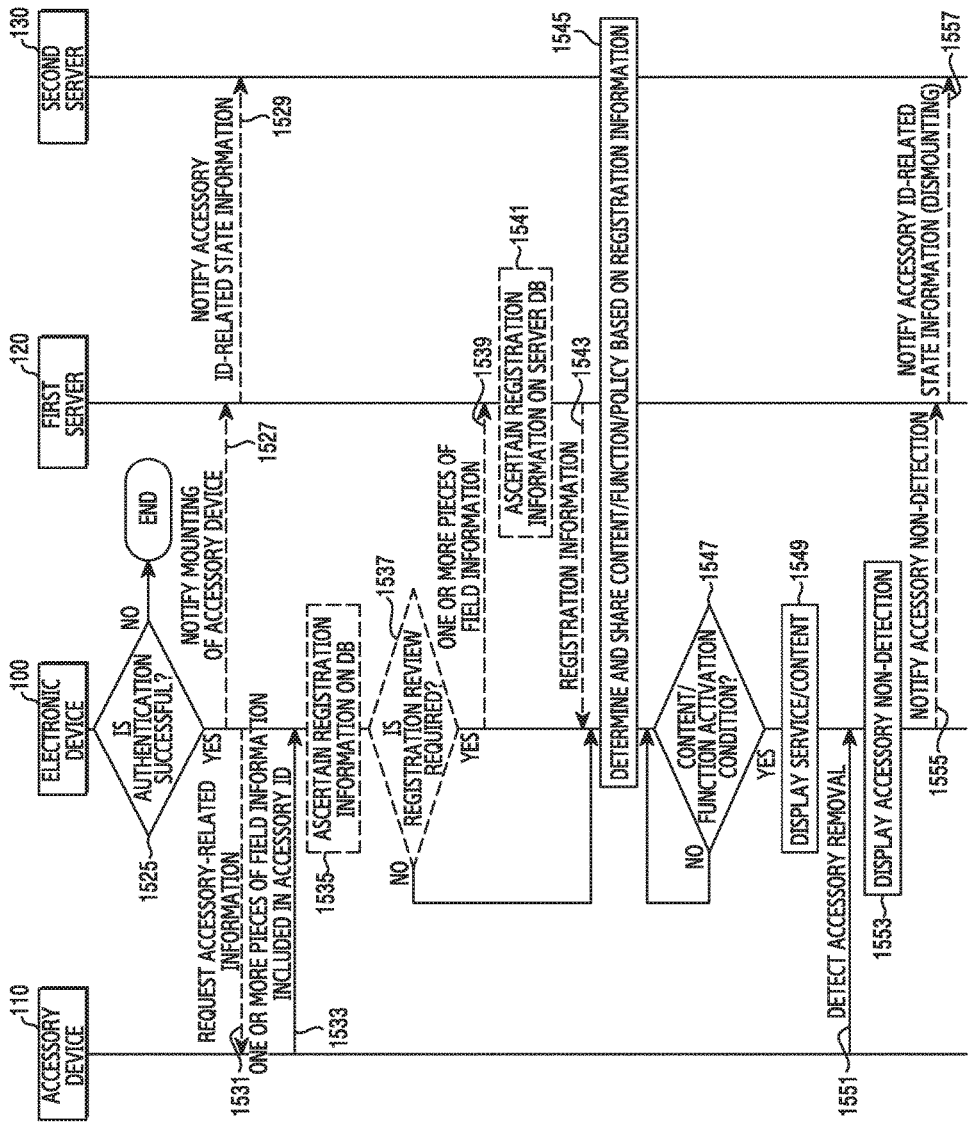

FIGS. 15A and 15B illustrate still another example of signal exchange for providing a content corresponding to an accessory device according to various embodiments of the disclosure.

Referring to FIGS. 15A and 15B, in operation 1501, the second server 130 according to one embodiment may register content/function/policy-related information associated with the accessory ID to the first server 120. Here, the first server 120 may be a server for managing accessory devices, and the second server 130 may be a server operated by a content provider. According to one embodiment, the first server 120 and the second server 130 may be implemented as a single server. According to one embodiment, the second server 130 may register the content/function/policy-related information according to the association relationship of a plurality of accessory IDs to the first server 120.

In operation 1503, the electronic device 100 (e.g., the processor 610) according to one embodiment may sense an accessory connection signal associated with the accessory device 110. For example, the accessory connection signal may be generated by a sensor association unit (e.g., the sensor association unit 530), a connector (e.g., the connector 660-2 or the connector 660-3), a communication signal, and a function driving unit (e.g., the function driving unit 550) of the electronic device 100. The accessory connection signal may be sensed when the accessory device 110 accesses or contacts the electronic device 100, or when at least one condition of wired/wireless communication connection is achieved.

In operation 1505, the electronic device 100 (e.g., the processor 610) according to one embodiment may determine the accessory type or accessory service type of the accessory device 110. For example, the processor 610 may determine the accessory type or accessory service type based on the accessory connection signal or a sensor module (e.g., the sensor module 630) from which the accessory connection signal is detected. According to another embodiment, operation 1505 may be omitted.

In operation 1507, the electronic device 100 (e.g., the processor 610) according to one embodiment may determine whether authentication on the accessory device 110 is required. Here, the authentication may refer to authenticating whether the corresponding product is authentic. For example, the processor 610 may determine whether authentication is required based on one or more of authentication module type information or authentication module version information of the accessory device 110. When authentication on the accessory device 110 is not required, the following operations 1509 to 1527 may be omitted.

In operation 1509, the electronic device 100 (e.g., the processor 610) according to one embodiment may request authentication-related information from the accessory device 110. For example, the request may be made by a request signal transmitted through a predetermined bandwidth or authentication data #1. However, according to another embodiment, operation 1509 may be omitted. In this case, without request, the following operation 1511 and operation 1513 may be performed.

In operation 1511, the accessory device 110 according to one embodiment may determine authentication data for a response corresponding to authentication-related information. For example, the accessory device 110 may extract authentication data (e.g., accessory ID) from a provided authentication chip or a communication module (e.g., an NFC module). However, according to another embodiment, operation 1511 may be omitted.

In operation 1513, the accessory device 110 according to one embodiment, may transmit response authentication data to the electronic device 100. For example, the response authentication data may be transmitted by a response signal transmitted through a predetermined bandwidth. The response authentication data may include authentication data #2 corresponding to the authentication data #1. For example, the authentication data #2 may be encrypted or decrypted data corresponding to the authentication data #1.

In operation 1515, the electronic device 100 (e.g., the processor 610) according to one embodiment may determine whether authentication at the first server 120 is required. Whether authentication is performed by the first server 120 may vary according to various embodiments. In one embodiment, whether authentication is performed by the first server 120 may depend on the type of accessory device 110. For example, when the accessory device 110 is a predefined specific type of accessory device (e.g., a demonstration product that does not communicate with a server), the electronic device 100 may determine that authentication at the first server 120 is not required. However, according to another embodiment, operation 1515 may be omitted.

In operation 1517, when the authentication at the first server 120 is not required, the electronic device 100 (e.g., the processor 610) according to one embodiment may determine the authentication result based on the response authentication data. On the other hand, in operation 1519, when authentication at the first server 120 is required, the electronic device 100 (e.g., the processor 610) may transmit the response authentication data to the first server 120. Next, in operation 1521, the first server 120 may determine the authentication result based on the response authentication data. Next, in operation 1523, the first server 120 according to one embodiment may transmit the authentication result to the electronic device 100.

Referring to FIG. 15B, in operation 1525, the electronic device 100 (e.g., the processor 610) according to one embodiment may determine whether authentication is successful. When authentication fails, the subsequent operations may not be performed. On the other hand, in operation 1527, when the authentication is successful, the electronic device 100 (e.g., the processor 610) according to one embodiment may notify the first server 120 of the mounting of the accessory device 110. Accordingly, in operation 1529, the first server 120 according to one embodiment may notify the second server 130 of the accessory ID-related state information. The state information may indicate that the accessory device 110 is mounted to the electronic device 100.

In operation 1531, the electronic device 100 (e.g., the processor 610) according to one embodiment may request the accessory-related information from the accessory device 110. In operation 1533, the accessory device 110 according to one embodiment may transmit information about at least one field included in the accessory ID to the electronic device 100. However, according to another embodiment, operations 1531 and 1533 may be omitted. For example, in operation 1531, the electronic device 100 may receive the response authentication data including the accessory-related information to the accessory device 110.

In operation 1535, the electronic device 100 (e.g., the processor 610) according to one embodiment may ascertain registration information on a DB. For example, the electronic device 100 may ascertain the registration information of the accessory device 110 using a local DB. However, according to another embodiment, operation 1535 may be omitted.

In operation 1537, the electronic device 100 (e.g., the processor 610) according to one embodiment may determine whether registration review at the first server 120 is required. In operation 1539, when the registration review at the first server 120 is required, the electronic device 100 may transmit at least one piece of field information to the first server 120. Accordingly, in operation 1541, the first server 120 according to one embodiment may ascertain the registration information on the DB of the server. Next, at operation 1543, the first server 120 according to one embodiment may transmit the registration information to the electronic device 100. However, according to another embodiment, operations 1537, 1539, 1541, and 1543 may be omitted.

In operation 1545, the electronic device 100 (e.g., the processor 610) according to one embodiment may be interlocked with at least one of the first server 120 and the second server 130 to determine content/function/policy based on the registration information, and may share the determined content/function/policy. In operation 1547, the electronic device 100 (e.g., the processor 610) according to one embodiment may determine whether an activation condition of the content/function is satisfied. However, according to various embodiments, in operation 1547, the processor 610 may determine whether a plurality of associated accessory devices is mounted, and may determine whether the activation condition of the content/function is satisfied. In operation 1549, when the activation condition is satisfied, the electronic device 100 (e.g., the processor 610) according to one embodiment may display the corresponding service/content.

Next, in operation 1551, the electronic device 100 (e.g., the processor 610) according to one embodiment may receive a removal detection signal for the accessory device 110. Here, the removal detection signal may not be an explicit signal. For example, the electronic device 100 may recognize that the signal detected in operation 1503 is removed. In operation 1553, the electronic device 100 (e.g., the processor 610) according to one embodiment may display an accessory non-detection. In operation 1555, the electronic device 100 (e.g., the processor 610) according to one embodiment may notify the first server 120 of the accessory non-detection. In operation 1557, the first server 120 according to one embodiment may notify the second server 130 of the accessory ID-related state information. Here, the state information may indicate that the accessory device 110 is not mounted to the electronic device 100.

A system for providing contents according to various embodiments may include at least one server 120 or 130 that manages the contents and information about accessory devices, a first accessory device 110-1 that is mountable to an electronic device 100 and a second accessory device 110-2 that has an association relationship with the first accessory device 110-1, and the electronic device 100 that performs validity check on the first accessory device 110-1 in conjunction with the at least one server 120 or 130 when the first accessory device 110-1 is mounted, determines a first content corresponding to the first accessory device 110-1 from the at least one server 120 or 130, performs validity check on the second accessory device 110-2 in conjunction with the at least one server 120 or 130 when the second accessory device 110-2 is mounted, and determines a second content corresponding to a combination of the first accessory device 110-1 and the second accessory device 110-2 from the at least one server 120 or 130.

According to one embodiment, the electronic device 100 may receive accessory-related information from the first accessory device 110-1 and the second accessory device 110-2, may transmit the accessory-related information to the at least one server 120 or 130, and may receive information about an association relationship between the first accessory device 110-1 and the second accessory device 110-2 from the at least one server 120 or 130.

According to one embodiment, the at least one server 120 or 130 may determine at least one of whether authentication on the first accessory device 110-1 is performed, whether authentication on the second accessory device 110-2 is performed, whether the service of the first accessory device 110-1 is registered, and whether the association relationship between the first accessory device 110-1 and the second accessory device 110-2 is present or absent based on a DB stored in the at least one server 120 or 130, and may transmit the determination result to the electronic device 100.

According to the various embodiments described above, a content corresponding to at least one accessory device (e.g., the first accessory device 110-1 or the second accessory device 110-2) mounted to electronic device 100 may be provided. A plurality of accessory devices (e.g., the first accessory device 110-1 and the second accessory device 110-2) may be mounted to the electronic device 100, whereby a wider variety of services depending on a combination of the plurality of accessory devices may be provided.

According to various embodiments, the content provided by the mounting of the at least one accessory device (e.g., the first accessory device 110-1 and the second accessory device 110-2) may be provided as follows. The corresponding content or function may be selected based on at least one of a service type, a service ID, a service item, a service detailed item, and a serial number included in the accessory ID. For example, the electronic device 100 (e.g., the processor 610) may use one or more of content information or policy information included in the accessory ID, a storage location of the content from the DB mapped on the accessory ID, link information, and a software package name to download an application associated with actual content/function or to perform streaming service or real-time inquiry. Fields that can be included in the accessory ID are as follows from the viewpoint of the content.

According to various embodiments, the service type may include information associated with the type of the service provided by the accessory device. For example, in the case of cover authentication, authentication may be performed by associating an encrypted accessory ID with the server using an authentication module of an NFC cover accessory device. When the accessory device is a theme service cover, theme-related services may be provided for various GUIs and applications. When the accessory device is an ear jack for sound source service, an audio-related sound source may be provided. When the accessory device is a dock station for providing a kid's mode, a driving mode of the electronic device 100 upon mounting to the accessory device is changed to the kid's mode so that UX/UI can be changed (e.g., simplified number of icons, large images, etc.). When the accessory device is a game cover, items associated with the game (e.g., one or more of an avatar, a weapon, a piece of equipment, and a portion) or periodic items (e.g., a periodic buff function) may be provided.

According to various embodiments, the service item may indicate the types of the contents associated with each service type. The service item may include the service detail item for identifying detailed contents constituting the corresponding content according to the type of the content.

According to various embodiments, the service ID may indicate a content and a device to be output according to the service type. As to the service ID, the type of media (e.g., video, audio, and text) of which input/output is controlled and media configuration (e.g., resolution, image quality, audio codec, etc.) may be configured based on information of the electronic device 100 or another external device capable of outputting contents. The service ID may further include policy information such as validity period, available remaining use frequency, or the like for controlling the content and the function.

According to various embodiments of the disclosure, a plurality of accessory devices (e.g., the first accessory device 110-1 and the second accessory device 110-2) may be mounted to the electronic device 100. At this time, the plurality of accessory devices that can be combined may be designed as various types of accessory devices. Hereinafter, various embodiments of types and forms of the plurality of accessory devices that can be combined will be described.

Figure 16A:
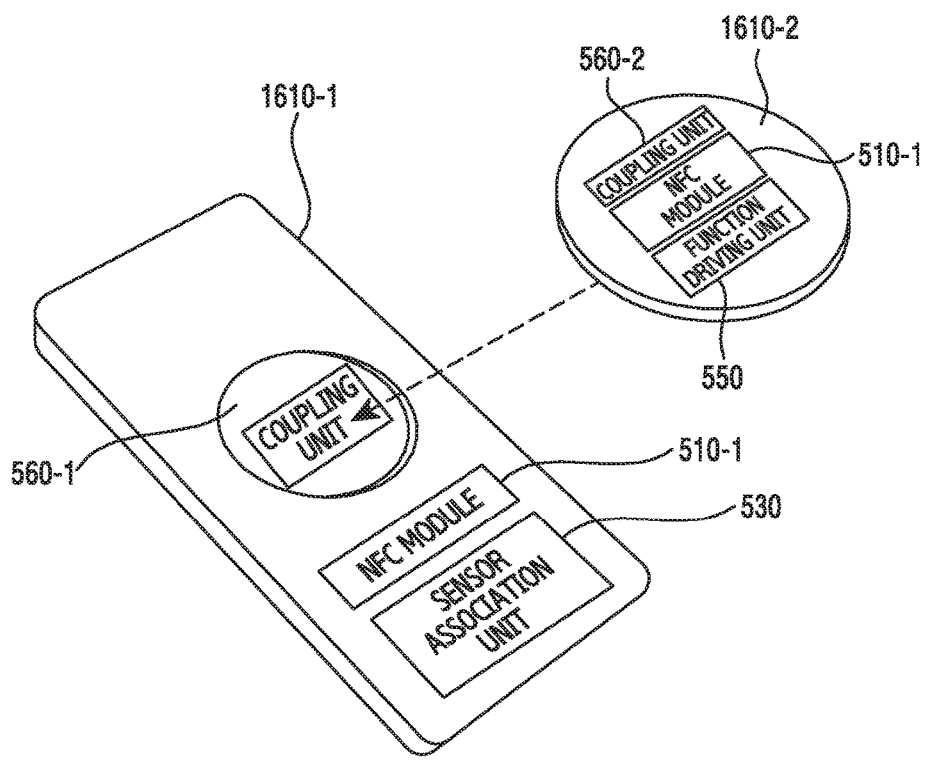
FIG. 16A illustrates a first example of a plurality of combinable accessory devices according to various embodiments of the disclosure.

FIG. 16A illustrates a first example of a plurality of combinable accessory devices according to various embodiments of the disclosure. FIG. 16A illustrates a first accessory device 1610-1 in the form of a cover and a second accessory device 1610-2 detachable therefrom, which are a plurality of accessory devices that can be combined.

Referring to FIG. 16A, the first accessory device 1610-1 of a parent accessory is primarily coupled to the electronic device 100, and in this state, the second accessory device 1610-2 of a child accessory may be additionally coupled thereto. At this time, according to one embodiment, the second accessory device 1610-2 may be designed to be functionally dependent on the first accessory device 1610-1, and may be implemented so that it cannot operate alone. For example, a sub-function or content that is dependent on the content or function of the first accessory device 1610-1 may be provided via the second accessory device 1610-2. Here, a subordinate relationship may refer to a relationship that is interrelated, such as a relationship in which the remaining one content can be provided on the assumption that one content is provided, a relationship in which the remaining one content contributes to the usability of one content or the user experience increase, and the like. According to one embodiment, at least some of the contents or functions associated with the first accessory device 1610-1 may be functionally activated when the second accessory device 1610-2 is connected to the electronic device 100 together. For example, when the first accessory device 1610-1 is mounted to the electronic device 100, at least some of the contents or functions downloaded and stored in the electronic device may be provided through the electronic device 100 only when the second accessory device 1610-2 is coupled to the electronic device 100. The first accessory device 1610-1 may be a back cover type and may include a first NFC module 510-1, a sensor association unit 530 including a first magnet corresponding to the first Hall sensor 632-1. The electronic device 100 (e.g., the processor 610) may sense a magnetic field through the first Hall sensor 632-1 at the time of the mounting of the first accessory device 1610-1, may read an accessory ID of the first accessory device 1610-1 transmitted from the first NFC module 510-1 through an NFC module (e.g., the NFC module 840) based on the sensed magnetic field, and may perform authentication. The second accessory device 1610-2 may include an accessory coupling unit 560-2 to be attachable and detachable to and from the first accessory device 1610-1, and a second NFC module 510-2 for performing communication. According to one embodiment, the second accessory device 1610-2 may be mounted to the first accessory device 1610-1 using a material such as an adhesive tape instead of the accessory coupling unit 560-1.

Figure 16B:
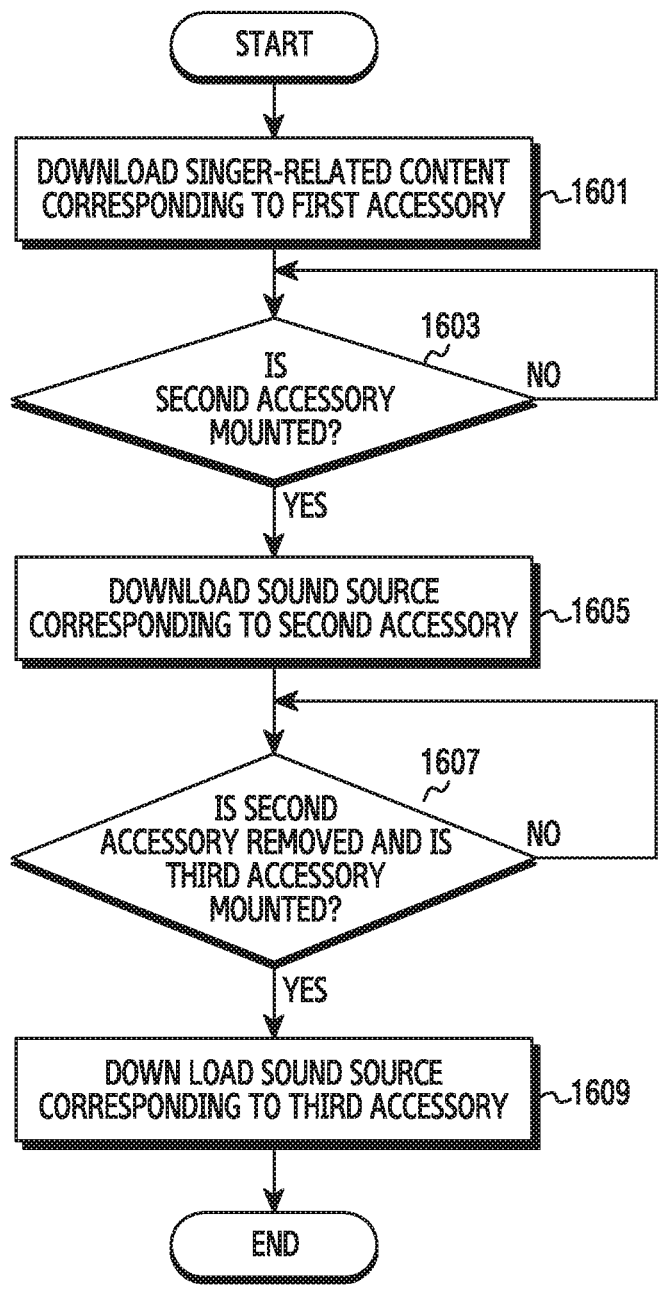
FIG. 16B is a flowchart for providing contents in accordance with a first example of a plurality of combinable accessory devices according to various embodiments of the disclosure.

One example of the operation in which the contents are provided through the first accessory device 1610-1 and the second accessory device 1610-2 is shown in FIG. 16B. FIG. 16B is a flowchart for providing contents in accordance with a first example of a plurality of combinable accessory devices according to various embodiments of the disclosure. FIG. 16B illustrates a case in which the first accessory device 1610-1 and the second accessory device 1610-2 provide entertainment-related, in particular, singer-related contents. For an illustration of each operation of FIG. 16B, FIGS. 16C, 16D, 16E, 16F, 16G, 16H, and 16J are also referenced.

Referring to FIG. 16B, in operation 1601, the electronic device 100 (e.g., the processor 610) according to one embodiment may download a singer-related content corresponding to the first accessory device 1610-1. For example, the singer-related content may be associated with UI/UX or contacts/schedules (e.g., events such as performance dates and locations, album release dates, etc.). For example, when the first accessory device 1610-1 is mounted to the electronic device 100, the accessory ID in the NFC module 510-1 may be authenticated and stored in the memory 330 of the electronic device 100, and a first content corresponding to the first accessory device 1610-1 may be downloaded. For example, the first content may include at least one of a wallpaper consisting of images of the corresponding singer and icons or widgets of a related video link, a schedule, and the like.

According to various embodiments, using the accessory ID of the first accessory device 1610-1, the electronic device 100 or the server 120 or 130 may discern service items and service detailed items associated with the theme service type among applications or functions previously installed in the electronic device 100, and may add a software module to be linked with the applications or functions so that the corresponding content can be used. For example, various service items such as a screen display, an event notification, a product sale, an information summary, etc., and contents for the service items may be linked. According to various embodiments, the first accessory device 1610-1 may provide the following contents as shown in FIGS. 16C to 16I. FIGS. 16C to 16I show examples of policy information included in the service items and service detailed items associated with an entertainment-related theme service, and the service ID according to various embodiments of the disclosures.

Figure 16C:
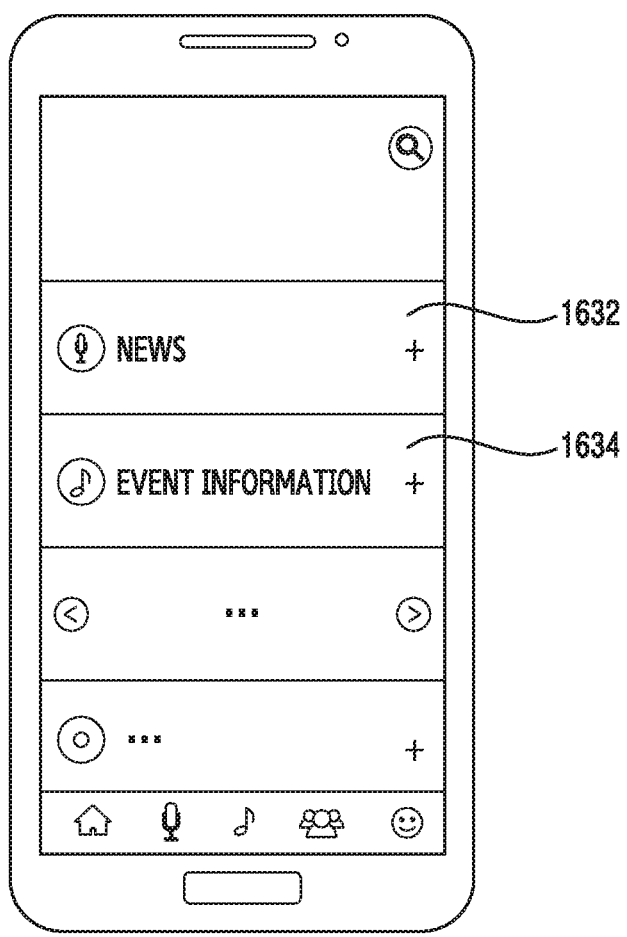
FIGS. 16C, 16D, 16E, 16F, 16G, 16H, 16I illustrate examples of content corresponding to an accessory in the form of a cover according to various embodiments of the disclosure.

According to one embodiment, as shown in FIG. 16C, a customized widget may be provided. Referring to FIG. 16C, news 1632 associated with a particular entertainer or group and information 1634 such as an event may be placed in a particular page or widget. For example, the electronic device 100 may arrange contents on an initial screen when a web browser or an application is executed or may create a tab for the corresponding content-dedicated web page, and then may periodically transmit the contents in conjunction with the server 120 or 130. Alternatively, a dedicated widget may be created on a home screen/idle screen/lock screen and may be updated in real time.

Figure 16D:
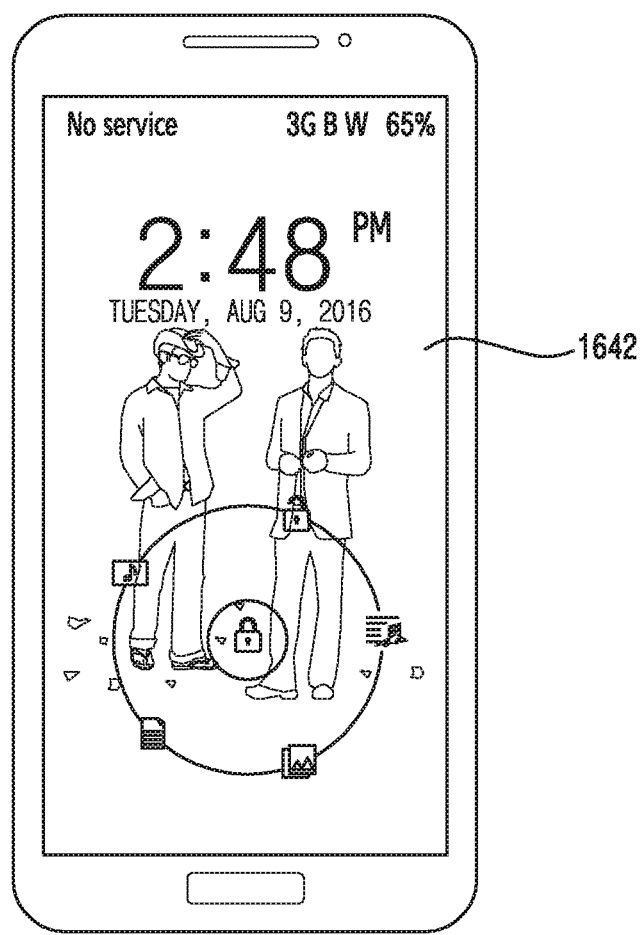
Figure 16E:
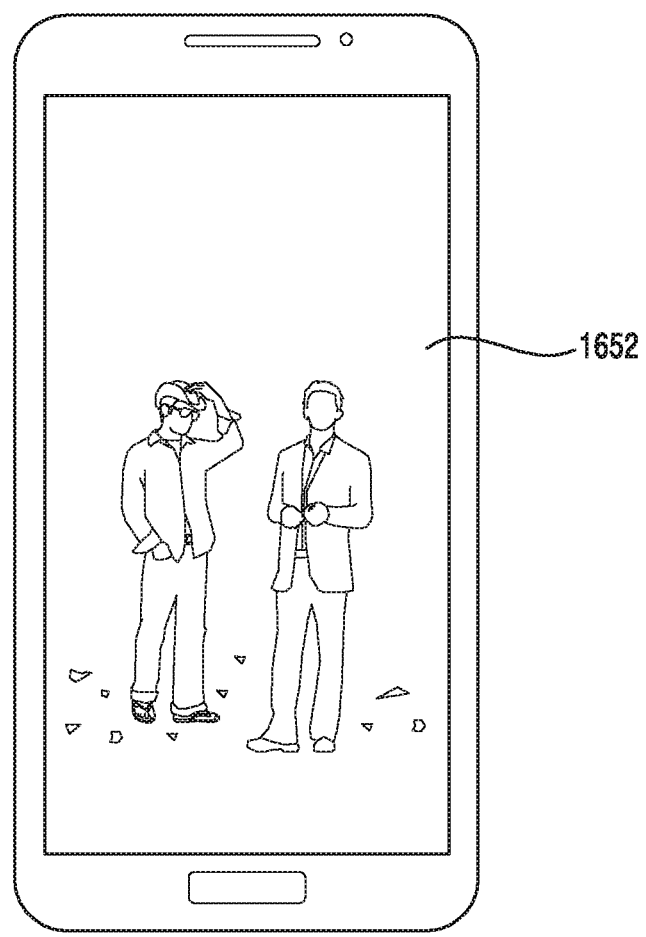

According to one embodiment, as shown in FIGS. 16D and 16E, configuration and change of image/animation associated with the lock screen service 1642 and the home screen service 1652 may be provided. The lock screen or the home screen may be periodically changed based on time. Alternatively, the electronic device 100 may download and change the corresponding content based on a location (e.g., location recognition by GPS).

Figure 16F:
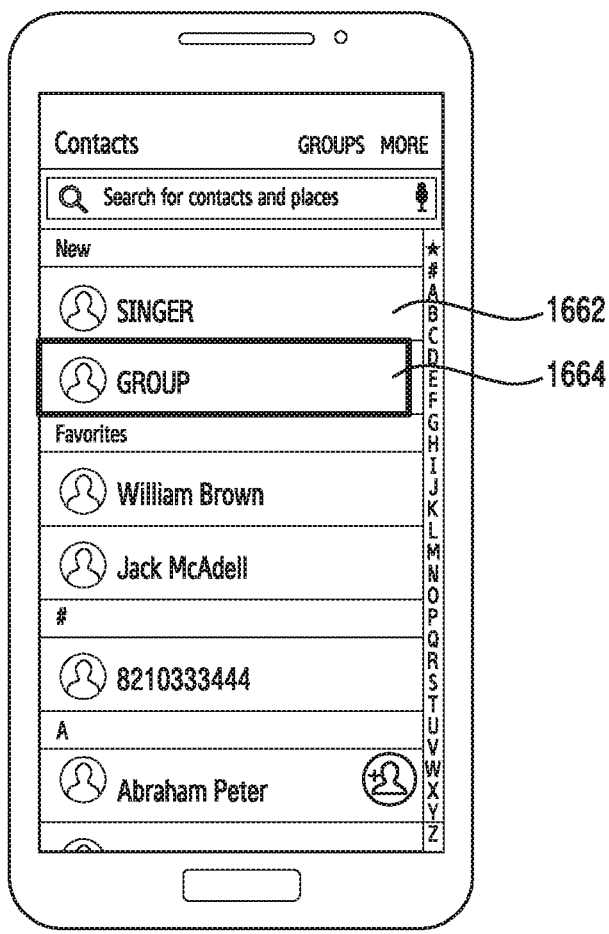

According to one embodiment, as shown in FIG. 16F, a service in which personal contact information 1662 or group contact information 1664 is added to a contact application may be provided. For example, applications such as an address book, a social network contact address, a video communication address book, and a messenger may be considered as the contact application. The added contact information may include a celebrity contact, a company representative contact, a fan club contact, a chat room creation, and the like. According to one embodiment, the corresponding service may be provided based on at least one of a telephone number, e-mail, and account information, and a real-time communication channel creation service may be added.

Figure 16G:
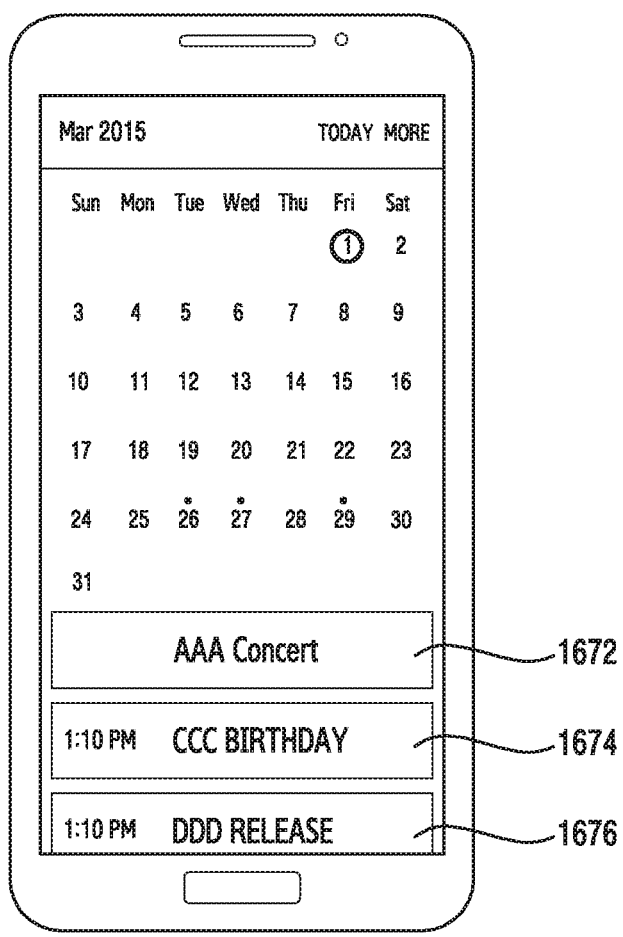

According to one embodiment, as shown in FIG. 16G, contents associated with calendars and schedule-related applications may be provided. For example, information of a particular entertainer or group may be automatically reflected in the application. For example, an event schedule date such as a performance schedule 1672 or a birthday 1674, a product release date 1676, specific place visit information, and the like may be recorded in the schedule-related application. Alternatively, a real-time event sharing service may be provided through a notification function. For example, the date of the event may be displayed in association with the calendar date or the timetable of the calendar.

Figure 16H:
Figure 16I:
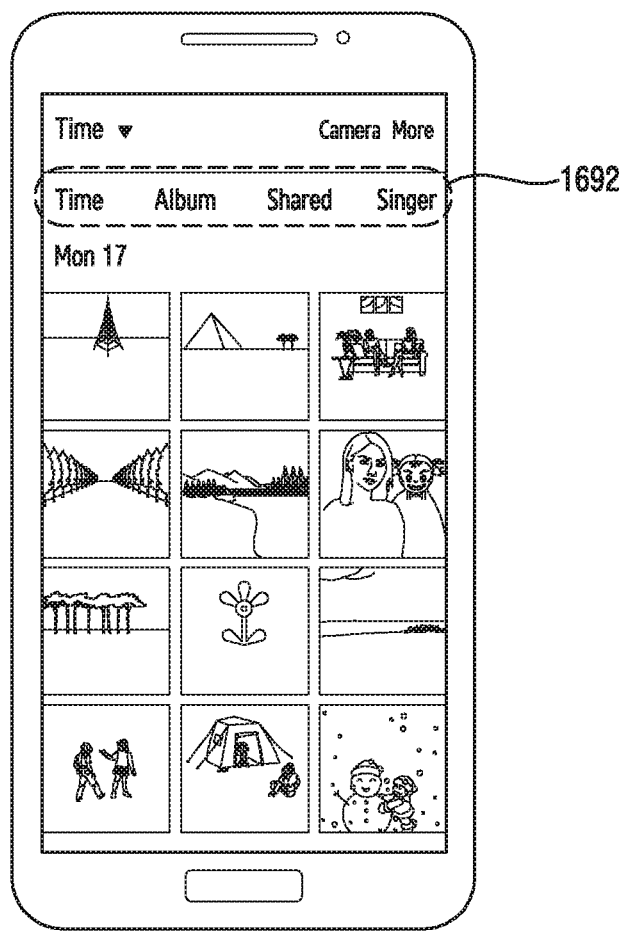

According to one embodiment, as shown in FIGS. 16H and 16I, contents associated with applications for video, audio, and images may be provided. For example, the electronic device 100 (e.g., the processor 610) may create taps for information of a particular entertainer or idol group and may manage the related contents. The processor 610 may create and manage dedicated taps or groups 1682 for managing music contents associated with corresponding topics or entertainers in a music player. The processor 610 may create and manage dedicated taps or groups for managing video contents associated with corresponding topics or entertainers in a video player. The processor 610 may create and manage dedicated taps or groups 1692 for managing video contents associated with the corresponding topics or entertainers in an image viewer app (e.g., Android gallery).

According to one embodiment, a content that is viewable only when the accessory device is mounted may be provided. For example, when the corresponding accessory device is mounted, one or more of private still shots, director's private cut videos, and private audio. According to one embodiment, premium contents (e.g., director's cut video, extension content with added private contents, etc.) differentiated from general multimedia contents may be replaced with existing contents. According to one embodiment, the corresponding content may be provided only when a plurality of accessory devices included in the accessory group are mounted to the electronic device.

According to one embodiment, as for one content, the version when the accessory device is not mounted and the version when the accessory device is mounted may be different from each other. For example, a video with a short running time may be provided when the accessory device is not mounted, and a video with a long running time may be provided when the accessory is mounted. As another example, a low resolution video may be provided when the accessory device is not mounted, and a high resolution video may be provided when the accessory device is mounted. By way of still another example, a low image quality video may be provided when the accessory device is not mounted, and a high image quality video may be provided when the accessory device is mounted. According to one embodiment, the content version when the plurality of accessory devices included in the accessory group is mounted and the content version when the plurality of accessory devices is not mounted may be different from each other.

According to one embodiment, a service that links related product (e.g., albums, tickets, character goods, clothing, etc.) inquiries and online services may be provided.

According to one embodiment, UX for providing dedicated services to a previously installed application may be provided. For example, an advertisement or event schedule may be displayed in the form of one or more of an overlay, a multi-window and a banner, and may be updated. Alternatively, the corresponding content may be displayed via a tab or a separate page. Alternatively, related content favorites, bookmarks, and the like may be displayed on a web browser or an electronic book app.

According to one embodiment, a real-time update service may be provided. When a content or service associated with the content ID is modified in the server, content update may occur in the electronic device 100. For example, whether each of one or more apps or services is changed may be determined according to the configuration of the content manager of the electronic device 100 or the server 120 or 130, and then each of one or more apps or services may be changed. Alternatively, the overall screen (e.g., home, lock, theme, etc.) of the electronic device 100 that is not an application unit may be changed.

In operation 1603, the electronic device 100 (e.g., the processor 610) according to one embodiment may determine whether the second accessory device 1610-2 is mounted. For example, the mounting or dismounting of the second accessory device 1610-2 may be determined by reception or the like of an NFC signal based on the sensing result of a Hall sensor (e.g., the Hall sensor 632).

In operation 1605, when the second accessory device 1610-2 is mounted, the electronic device 100 (e.g., the processor 610) according to one embodiment may download a sound source corresponding to the second accessory device 1610-2. When the second accessory device 1610-2 of the child accessory is additionally mounted in a state in which the first accessory device 1610-1 is mounted, the processor 610 may ascertain the accessory ID of the second accessory device 1610-2, and then may perform validity check on the second accessory device 1610-2. For example, when the second accessory device 1610-2 including the second NFC module 510-2 is mounted to the first accessory device 1610-1, the processor 610 may play a content (e.g., audio, music video, or streaming service corresponding to a first regular album of a specific singer) using the accessory ID of the second accessory device 1610-2 read from the second NFC module 510-2 of the second accessory device 1610-2. When the second accessory device 1610-2 is connected to the first accessory device 1610-1 and authentication is completely performed, the content mapped on the second accessory device 1610-2 may be installed in the electronic device 100. For example, the second accessory device 1610-2 in the form of a record plate may be mapped on a first album, a second album, or a single album of a specific singer. After the authentication operation, the processor 610 may download and play the corresponding sound source data from the server 120 or 130.

In operation 1607, the electronic device 100 (e.g., the processor 610) according to one embodiment may determine whether the second accessory device 1610-2 is removed and a third accessory device (not shown) is mounted. In operation 1609, when the third accessory device (not shown) is mounted, the electronic device 100 (e.g., the processor 610) according to one embodiment may download a sound source corresponding to the third accessory device (not shown). When the second accessory device 1610-2 is replaced with the third accessory device (not shown), the electronic device 100 may play another content (e.g., audio, music video, or streaming service corresponding to a second regular album of a specific singer) using the accessory ID read from a third NFC module (not shown) included in the third accessory device (not shown).

Figure 16J:
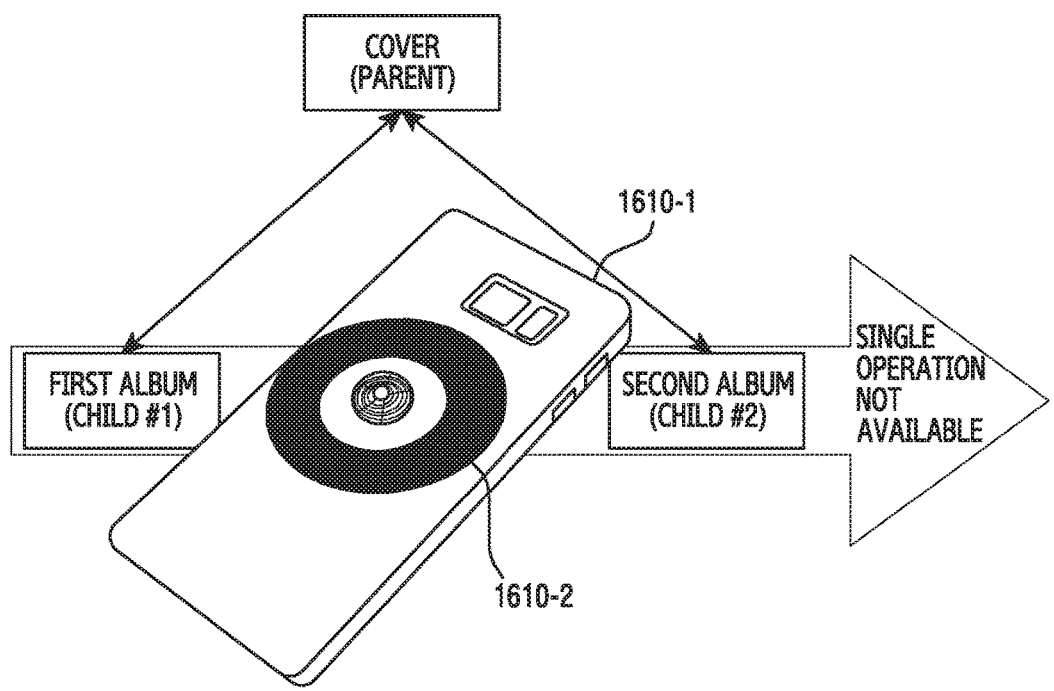
FIG. 16J illustrates an example of a content change in accordance with replacement of a second accessory according to various embodiments of the disclosure.

FIG. 16J illustrates an example of a content change in accordance with replacement of a second accessory according to various embodiments of the disclosure.

As shown in FIG. 16J, the sound source provided by the change of the child accessory device may be changed.

According to one embodiment, the accessory device (e.g., the second accessory device 1610-2) may further include a button for changing a coupling state of a built-in NFC module and an antenna. For example, the second accessory device 1610-2 may further include the function driving unit 550 (e.g., a push button or a toggle button) for connecting or disconnecting the NFC module 510-2 and an NFC antenna, and a user may control whether the content is provided or the corresponding function using the function driving unit 550.

According to one embodiment, the accessory device (e.g., the second accessory device 1610-2) may include a plurality of NFC modules and one or more antennas, and may also include the function driving unit 550 (e.g., button, switch, rotary, dial, or wheel structure) capable of changing the coupling state between each NFC module and the antenna. For example, the second accessory device 1610-2 may include a plurality of NFC modules and an antenna that can be connected to each NFC module, and a plurality of buttons or rotary circuits capable of controlling connection and disconnection between each of the NFC modules and the antenna may exist. In this case, a user may select the connection between any one NFC module and the antenna by operating the buttons or the rotary circuit. Accordingly, when a specific NFC module is connected to the antenna by the selected button, the electronic device 100 may receive the accessory ID corresponding to the corresponding NFC module and may select the content or function corresponding to the received accessory ID. For example, when a multimedia content selected by the accessory ID of the first accessory device 1610-1 that has been subjected to authentication of the parent cover is displayed, a plurality of buttons provided in the child cover may transmit the accessory IDs mapped on a function such as play, pause, or sound source selection to the electronic device 100.

According to one embodiment, the electronic device 100 (e.g., the processor 610) may control the content or function corresponding to the first accessory device 1610-1 by the mounting state of the second accessory device 1610-2 or the accessory ID recognition of the second accessory device 1610-2 by the function driving unit 550. For example, the electronic device 100 cannot provide the content or function only using the first accessory device 1610-1, and the content usage and function may be activated by receiving the accessory ID of the second accessory device 1610-2.

According to one embodiment, based on the accessory ID recognition of the second accessory device 1610-2, the content or function may be driven depending on the authentication result, content, and function corresponding to the first accessory device 1610-1. For example, the accessory ID of the second accessory device 1610-2 may be configured to provide the content corresponding to the accessory ID of the first accessory device 1610-1, the content associated with the function, or only the function. For example, when the accessory ID of the first accessory device 1610-1 coincides with content provider information included in the accessory ID of the second accessory device 1610-2, functions such as play, pause, etc., of the content corresponding to the first accessory device 1610-1 may be performed through the buttons of the second accessory device 1610-2.

Figure 17A:
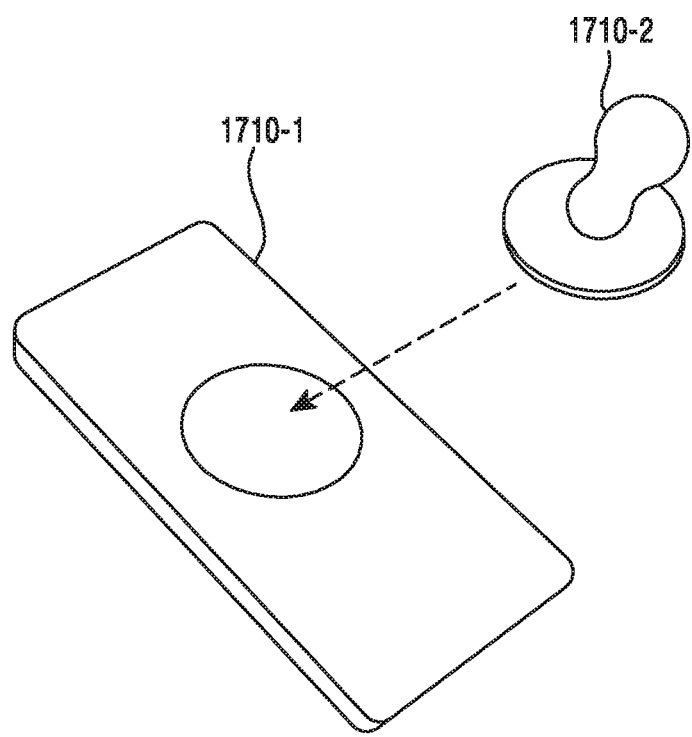
FIG. 17A illustrates a second example of a plurality of combinable accessory devices according to various embodiments of the disclosure.

FIG. 17A illustrates a second example of a plurality of combinable accessory devices according to various embodiments of the disclosure. FIG. 17A illustrates a first accessory device 1710-1 in the form of a cover and a second accessory device 1710-2 that can be tagged to the first accessory device 1710-1, as a plurality of accessory devices that can be combined.

Referring to FIG. 17A, the first accessory device 1710-1 of a parent accessory is primarily coupled to the electronic device 100, and in this state, the second accessory device 1710-2 of a child accessory may be additionally tagged (e.g., contacted, attached, or mounted) to a predetermined portion of the first accessory device 1710-1. By the tagging, a content associated with the second accessory device 1710-2 may be provided. For example, the second accessory device 1710-2 of the child accessory may include an NFC communication module (not shown), and when the second accessory device 1710-2 is tagged to the predetermined portion of the first accessory device 1710-1, the electronic device 100 (e.g., the processor 610) may recognize each of the accessory IDs from the first accessory device 1710-1 and the second accessory device 1710-2 and may provide the corresponding content based on the recognized accessory ID.

For example, the service types of the first accessory device 1710-1 and the second accessory device 1710-2 may be configured as an accessory device dedicated to a specific game. The service items may include avatars and items (e.g., one or more of a portion, a buff function item, a weapon, and an armor), and the service detailed items may be an avatar's gender, occupation, ability, level, personality, and the like, or may be a grade, a usage effect, a waiting time for reuse, a buff application effect retention period of the corresponding item. The service detailed items may designate the attack, defense, appearance, and the like of the weapon or armor. The policy may be defined so as to enhance the performance/effect of the service detailed items according to the number of the game-dedicated accessory devices which are mounted, to provide a new content, to enable the operation of each game-dedicated accessory device according to a time limit for providing the content or the limitation period, or to reinforce the effect of new content or buff function by the number in a predetermined area of a specific guild member (SNS group member) in an online game equipped with the corresponding game-dedicated accessory devices.

Figure 17B:
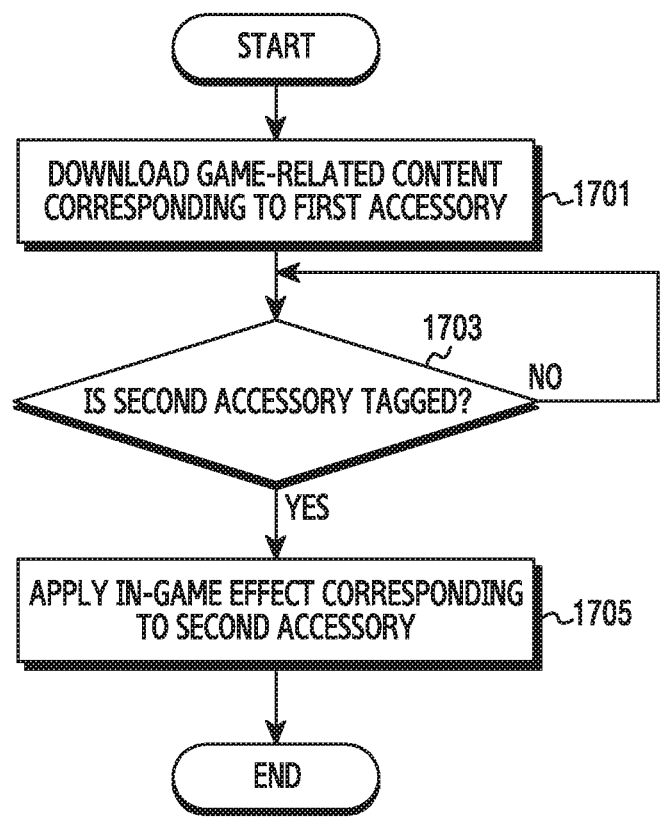
FIG. 17B is a flowchart for providing contents in accordance with a second embodiment of a plurality of combinable accessory devices according to various embodiments of the disclosure.

One example of the operation in which the contents are provided through the first accessory device 1710-1 and the second accessory device 1710-2 is shown in FIG. 17B. FIG. 17B is a flowchart for providing contents in accordance with a second embodiment of a plurality of combinable accessory devices according to various embodiments of the disclosure. FIG. 17B illustrates a case where the first accessory device 1710-1 and the second accessory device 1710-2 provide a game-related content.

Referring to FIG. 17B, in operation 1701, the electronic device 100 (e.g., the processor 610) according to one embodiment may download a game-related content corresponding to the first accessory device 1710-1. When the first accessory device 1710-1 that is a game cover is mounted to the electronic device 100, the electronic device 100 may download the content corresponding to the first accessory device 1710-1 and may change a wallpaper, icons, or widgets into image/animation associated with the corresponding game.

In operation 1703, the electronic device 100 (e.g., the processor 610) according to one embodiment may determine whether the second accessory device 1710-2 is tagged. Whether the second accessory device 1710-2 is tagged may be determined by detection of an NFC signal of a communication module (e.g., the communication module 640) based on the sensing result of the Hall sensor (e.g., the Hall sensor 632).

In operation 1705, when the second accessory device 1710-2 is tagged, the electronic device 100 (e.g., the processor 610) according to one embodiment may apply an effect within the game corresponding to the second accessory device 1710-2. That is, during game execution, the processor 610 may apply effects associated with characters, items, and the like. When the second accessory device 1720-1 is tagged in a state in which the first accessory device 1710-1 is mounted to the electronic device 100, the processor 610 may provide additional contents. According to one embodiment, the second accessory device 1710-2 may be implemented in the form of a character figure. For example, the figure may be a tangible object having a shape occupying a certain space, and may have an appearance for expressing a specific character. The processor 610 may ascertain the accessory ID of the second accessory device 1710-2 in the form of a figure based on the previously stored authentication information, and then may inspect whether authentication on the additional figure is performed. When the electronic device is connected to the first accessory device 1710-1 through the communication module (e.g., the communication module 510-2) of the second accessory device 1710-2 and whether authentication is performed is determined using the accessory ID transmitted to the electronic device 100, other buffs, items, or additional effects may be granted depending on the character represented by the second accessory device 1710-2 during game execution. This function may be implemented through the second accessory device 1710-2 for each character, item, and buff. Through the second accessory device 1710-2 using the form of the figure, new experience may be provided to a user. In addition, content extensions may be enabled through various types of figures. That is, when only one accessory device is mounted, other contents and functions based on the association relationship other than the provided content and function.

Figure 18A:
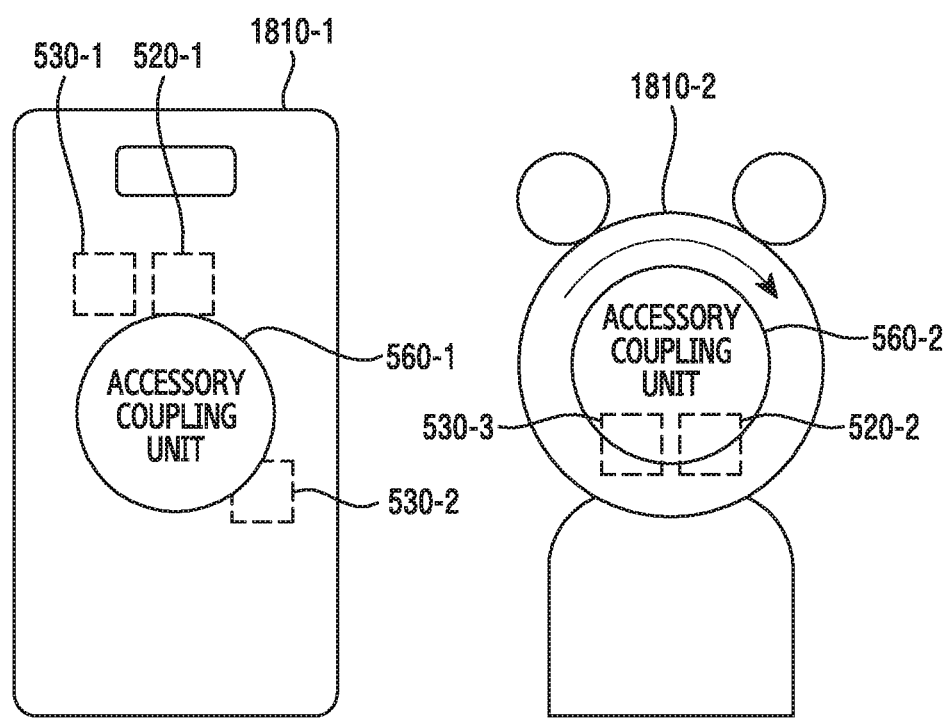
FIG. 18A illustrates a third example of a plurality of combinable accessary devices according to various embodiments of the disclosure.

FIG. 18A illustrates a third example of a plurality of combinable accessory devices according to various embodiments of the disclosure. FIG. 18A illustrates a first accessory device 1810-1 in the form of a cover and a second accessory device 1810-2 in the form of a cradle that can be coupled to the first accessory device 1810-1, as a plurality of accessory devices that can be combined.

Referring to FIG. 18A, the first accessory device 1810-1 according to various embodiments may include an authentication module 520-1 for authentication in the electronic device 100, a sensor association unit 530-1 for sensing the mounting of the first accessory device 1810-1, a sensor association unit 530-2 for sensing an awake mode, and an accessory coupling unit 560-1 for coupling with the second accessory device 1810-2. The second accessory device 1810-2 may include an authentication module 520-2 for authentication, a sensor association unit 530-3 for sensing the mounting of the second accessory device 1810-2, and an accessory coupling unit 560-2 for coupling with the first accessory device 1810-1.

According to one embodiment, upon the mounting of the first accessory device 1810-1, the electronic device 100 may sense the mounting of the first accessory device 1810-1. For example, a first Hall sensor (e.g., the Hall sensor 632-1) of the electronic device 100 may sense a magnetic signal from the first accessory device 1810-1. Alternatively, an optical sensor (e.g., the proximity sensor 634) of the electronic device 100 may sense a light change due to the mounting of the first accessory device 1810-1. Alternatively, a communication module (e.g., the communication module 640) of the electronic device 100 may sense an NFC signal above a certain intensity. When the corresponding accessory device is determined to be in the mounted state, the processor 610 of the electronic device 100 may receive the accessory ID from the first accessory device 1810-1.

According to one embodiment, the second accessory device 1810-2 may be coupled to the first accessory device 1810-1 so that the second accessory device 1810-2 may be directly/physically brought into contact with the electronic device 100 or may be positioned to be indirectly adjacent to the electronic device 100. The electronic device 100 may be mounted to the second accessory device 1810-2 and may be rotated using the accessory coupling unit 560-1 of the first accessory device 1810-1. The accessory coupling units 560-1 and 560-2 may be constituted of at least one of a magnet, a slot, and a groove. The processor 610 of the electronic device 100 may determine the mounting of the second accessory device 1810-2 using a proximity sensor (e.g., the proximity sensor 340G and the proximity sensor 634), an optical sensor (e.g., the optical sensor 340N), a Hall sensor (e.g., the Hall sensor 340O and the Hall sensor 632), and the like, and may receive the accessory ID of the second accessory device 1810-2 from the second accessory device 1810-2. According to one embodiment, when the electronic device 100 rotates using the accessory coupling units 560-1 and 560-2, the sensor module of the electronic device 100 stimulated by the one or more sensor association units 530-3 included in the second accessory device 1810-2 may be changed, so that the content or function may be changed accordingly.

According to one embodiment, the electronic device 100 (e.g., the processor 610) may ascertain whether there is an association relationship between the first accessory device 1810-1 and the second accessory device 1810-2, or may transmit the accessory IDs to be determined by the server 120 or 130. When the association relationship is ascertained to be present, the processor 610 may provide a predetermined content or function. For example, when the second accessory device 1810-2 is an electronic device cradle for a car, a navigation function/map associated with the first accessory device 1810-1 may be provided. For example, when the first accessory device 1810-1 is a cover that provides a content associated with a movie character and the second accessory device 1810-2 is an electronic device cradle for a car, the presence or absence of an association relationship therebetween may be discerned based on the accessory ID included in each accessory device, so that the processor 610 may provide the navigation function/map content to be guided through a movie character's voice.

According to one embodiment, a button (not shown) or the like may be further included in the second accessory device 1810-2. An additional control function may be provided via the button (not shown) or the like. For example, through the button (not shown), the electronic device 100 may be controlled to be in an always-on state, or another kind of control signal may be generated. To this end, the button (e.g., the function driving unit 550) may control the sensor association unit 530-3 or the function driving unit (e.g., the function driving unit 550) of the second accessory device 1810-2 so as to stimulate the Hall sensor (e.g., the Hall sensor 632) of the electronic device 100. According to one embodiment, the button may control the sensor association unit 530-1 or 530-2 or the function driving unit of the first accessory device 1810-1 so as to stimulate the sensor module (e.g., the sensor module 630) of the electronic device 100. For example, when the button is pressed, physical or electrical control may be applied to the accessory coupling unit 560-1 through the accessory coupling unit 560-2 of the second accessory device 1801-2, and stimulation may be applied to the sensor module (e.g., the sensor module 630) of the electronic device 100 using a sensor association unit or a function driving unit, which is not shown, included in the first accessory device 1810-1 associated with the accessory coupling unit 560-1.

Figure 18B:
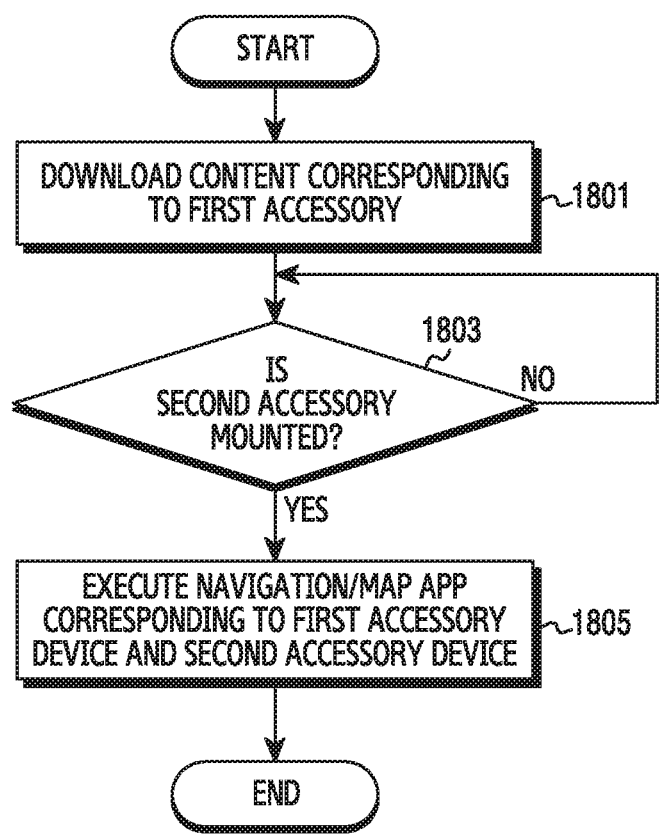
FIG. 18B is a flowchart for providing contents in accordance with a third example of a plurality of combinable accessory devices according to various embodiments of the disclosure.

One example of the operation in which the contents are provided through the first accessory device 1810-1 and the second accessory device 1810-2 is shown in FIG. 18B. FIG. 18B is a flowchart for providing contents in accordance with a third example of a plurality of combinable accessory devices according to various embodiments of the disclosure.

FIG. 18B illustrates a case where the first accessory device 1810-1 and the second accessory device 1810-2 are used in a vehicle.

Referring to FIG. 18B, in operation 1801, the electronic device 100 (e.g., the processor 610) according to one embodiment may download a content corresponding to the first accessory device 1810-1. For example, when the first accessory device 1810-1 is a commodity related to a particular character, the processor 610 may receive a content associated with the character and may change components of UI/UX to a character-related image. Alternatively, when the accessory device 1810-2 is a commodity associated with a particular automobile model, the processor 610 may receive a content associated with a particular model automobile and may change components of UI/UX to an image associated with the automobile.

In operation 1803, the electronic device 100 (e.g., the processor 610) according to one embodiment may determine whether the second accessory device 1810-2 is mounted. For example, the processor 610 may determine the mounting of the accessory device 1810-2 by detecting the sensor association unit 530-3 using the second Hall sensor (e.g., the Hall sensor 632). In operation 1805, when the second accessory device 1810-2 is mounted, the electronic device (e.g., the processor 610) according to one embodiment may execute a navigation/map app corresponding to the first accessory device 1810-1 and the second accessory device 1810-2.

Figure 19:
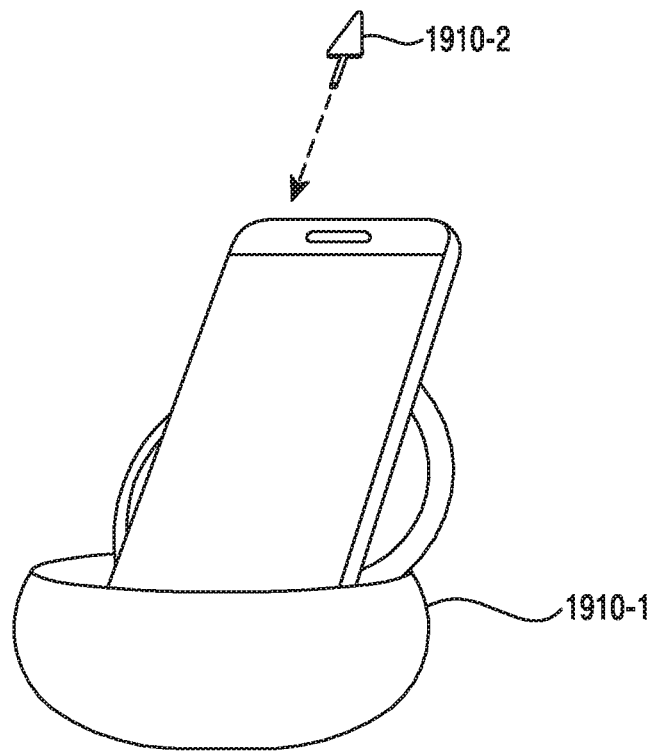
FIG. 19 illustrates a fourth example of a plurality of combinable accessory devices according to various embodiments of the disclosure.

FIG. 19 illustrates a fourth example of a plurality of combinable accessory devices according to various embodiments of the disclosure.

FIG. 19 illustrates a first accessory device 1910-1 in the form of a cradle and a second accessory device 1910-2 in the form of an ornament that can be coupled to an earphone terminal, as a plurality of accessory devices that can be combined.

According to one embodiment, when the first accessory device 1910-1 is mounted, the electronic device 100 (e.g., the processor 610) may determine that it is in a cradle-mounted state. For example, a USB connector (e.g., the connector 660-2) of the first accessory device 1910-1 is connected to a USB port (e.g., the USB port of the wired communication module 644) of the electronic device 100, a magnetic field signal from the first accessory device 1910-1 is sensed by the first Hall sensor (e.g., the Hall sensor 632-1) of the electronic device 100, a light change is sensed by an optical sensor (e.g., the optical sensor 340N) of the electronic device 100, an NFC signal above a certain intensity is sensed, or a charging signal is sensed from a wireless charger, so that the cradle-mounted state may be determined. When the electronic device 100 is determined to be in the cradle-mounted state, the processor 610 may receive the accessory ID from the first accessory device 1910-1.

According to one embodiment, when the second accessory device 1910-2 is mounted, the electronic device 100 (e.g., the processor 610) may sense the mounting of the second accessory device 1910-2 through one or more of an ear jack, plug insertion, and wireless connection. Next, the processor 610 may receive the accessory ID of the second accessory device 1910-2. The processor 610 may determine whether there is an association relationship between the first accessory device 1910-1 and the second accessory device 1910-2 or may transmit the accessory IDs so as to be determined by the server 120 or 130. When the association relationship is ascertained to be present, the processor 610 may provide a predetermined content or function.

For example, when the first accessory device 1910-1 is an electronic device cradle for a car, a basic navigation function may be provided and a content or function associated with the second accessory device 1910-2 may be provided. Specifically, a changed navigation service such as voice support of a character associated with the ear jack type second accessory device 1910-2, language change, shop information guidance, and the like may be provided. As another example, in a case in which the first accessory device 1910-1 is a wireless charging dock, a wireless charging theme may be displayed when the dock is mounted, and a wireless charging theme (e.g., an animation in which the character is reflected) in which a content (e.g., children's character content) associated with the second accessory device 1910-2 is reflected may be provided or function change/addition (e.g., theme change such as a kid's mode in which the character is reflected or additional display) may be performed when the second accessory device 1910-2 is mounted.

Figure 20:
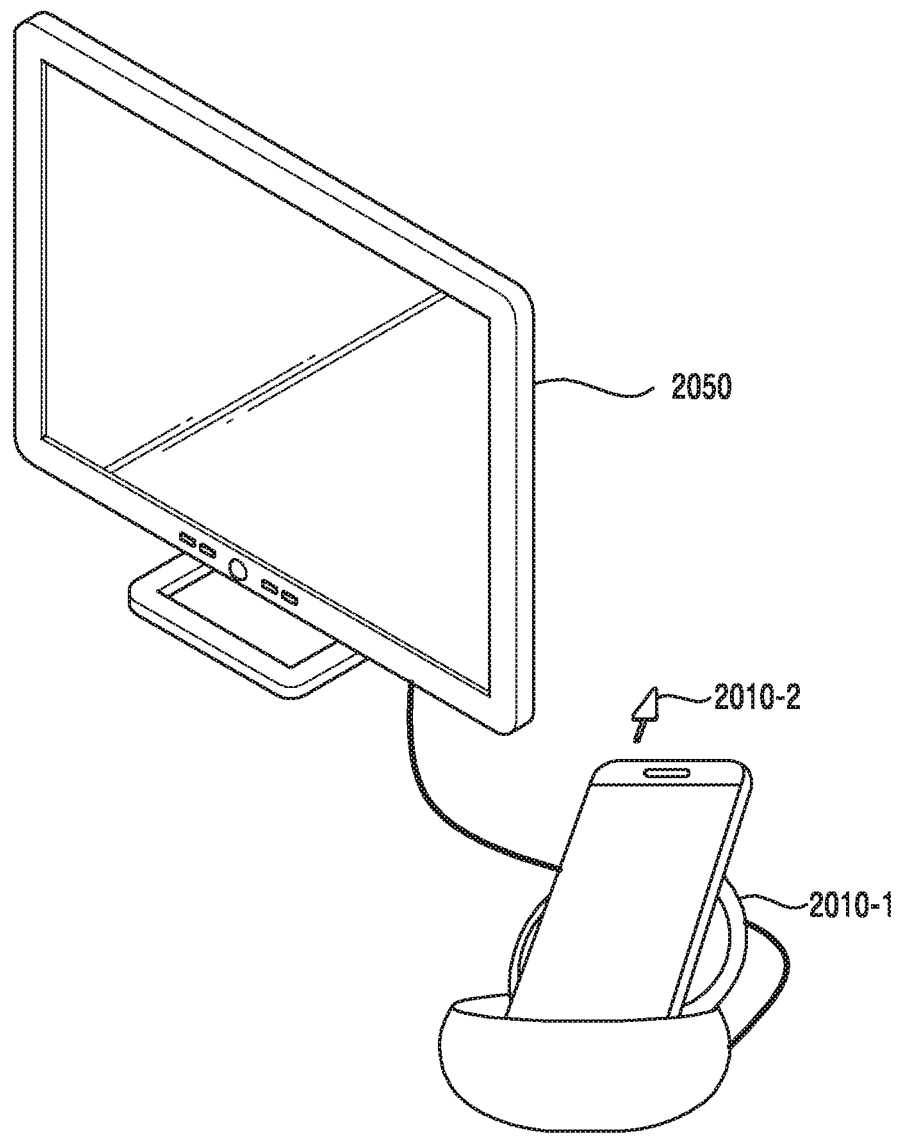
FIG. 20 illustrates a fifth example of a plurality of combinable accessory devices according to various embodiments of the disclosure.

FIG. 20 illustrates a fifth example of a plurality of combinable accessory devices according to various embodiments of the disclosure.

FIG. 20 illustrates a first accessory apparatus 2010-1 in the form of a cradle that can be connected to an external device 2050 and a second accessory device 2010-2 in the form of an ornament that can be coupled to an earphone terminal, as a plurality of accessory apparatuses that can be combined.

According to one embodiment, when the first accessory device 2010-1 is mounted, the electronic device 100 may determine that it is in a cradle-mounted state. In this case, the electronic device 100 may receive the accessory ID from the first accessory device 2010-1. For example, the electronic device 100 may receive the accessory ID through NFC, mounting of a USB type-C based accessory device, or identification via an authentication chip. Next, the electronic device 100 may identify an external device (e.g., display, speaker, etc.) 2050 connected to the first accessory device 2010-1. For example, using information (e.g., one or more of model name, device type, resolution, audio characteristic, and support codec) associated with the external device 2050 included in the accessory ID of the first accessory device 2010-1 received by the electronic device 100, the electronic device 100 may identify the external device 2050.

According to one embodiment, the identified external device 2050 may provide a content or function (e.g., mirroring, audio output, reprocessing the content for the electronic device 100 into monitor/TV content to output, etc.) in conjunction with the electronic device 100. The content output by the external device 2050 may be a separate content suitable for the corresponding resolution/audio selected by the electronic device 100 or the server 120 or 130, or may be generated by processing another content. According to one embodiment, the processing of the content may be performed by a processor (not shown) of the server 120 or 130 receiving the request of the processor 610 of the electronic device 100 or the electronic device 100, and the processor 610 may transmit the processed content to the external device 2050 through the first accessory device 2010-1. According to one embodiment, the processing of the content may be performed by the processor (not shown) of the first accessory device 2010-1 based on information associated with the external device. According to one embodiment, the first accessory device 2010-1 may transmit the content received from the electronic device 100 together with the information associated with the external device 2050 to a media server (not shown). Next, the media server may process the content using the information and then may transmit the processed content to the first accessory device 2010-1.

According to one embodiment, when the second accessory device 2010-2 is mounted, the electronic device 100 (e.g., the processor 610) may sense the mounting of the second accessory device 2010-2 through an ear jack, plug insertion, wireless connection, or the like. Next, the processor 610 may receive the accessory ID from the second accessory device 2010-2. The processor 610 may determine whether there is an association relationship between the first accessory device 2010-1 and the second accessory device 2010-2 or may transmit the accessory IDs to the server 120 or 130 so that the accessory IDs may be determined by the server 120 or 130. When the association relationship is ascertained to be present, the processor 610 may provide a predetermined content or function. For example, the content or function may be changed/controlled/added with respect to the control function of the external device 2050 provided by the first accessory device 2010-1.

According to one embodiment, a UX/UI-related service may be provided. When the first accessory device 2010-1 is an accessory cradle that provides the mirroring function to the external device 2050, the connected external device 2050 may display a theme associated with the first accessory device 2010-1 or the external device 2050. When the second accessory device 2010-2 is mounted, the processor 610 may change the corresponding image or content by associating the content or function associated with the second accessory device 2010-2 with the theme. For example, when the electronic device 100 is mounted to the first accessory device 2010-1 of the cradle type, a USB type C connector (not shown) of the first accessory device 2010-1 and a USB connector (e.g., the wired communication module 644) of the electronic device 100 may be connected to functionally perform communication between the electronic device 100 and the first accessory device 2010-1, and the processor 610 may determine a service (e.g., cradle-related theme) of the first accessory device 2010-1 using the first accessory ID of the first accessory device 2010-1. At this time, the processor 610 may use at least a part (e.g., service ID) of the accessory ID of the first accessory device 2010-1 to discern a content type (e.g., one or more of resolution of displayable image, image quality, outputable audio performance, GUI layout, and icon to be displayed) to be output to the external device 2050 by the first accessory device 2010-1, or to transmit the at least a part of the accessory ID of the first accessory device 2010-1 to the first server 120. The first server 120 may receive the type of the content to be output which is discerned using the DB (e.g., the content/function/policy information DB 124) included in the first server 120, may determine the content type based on the received type, may process the content to be output via a smartphone according to the content type, and then may output the processed content to the external device 2050 through the first accessory device 2010-1. For example, a GUI of the electronic device 100 may not be displayed on a monitor (e.g., the external device 2050) connected to the first accessory device 2010-1 in which the electronic device 100 is mounted, and a user UI (e.g., UI/UX similar to PC) associated with the first accessory device 2010-1 may be displayed thereon. At this time, when an ear cap (e.g., the second accessory device 2010-2) associated with a music content is additionally mounted to the electronic device 100, an image or an application included in the music theme associated with the ear cap may be applied to the UI of the external device 2050 connected to the first accessory device 2010-1. At this time, since the music theme is associated with the first accessory device 2010-1, a content or function in which the content type is reflected may be provided.

According to one embodiment, a game-related service may be provided. When the first accessory device 2010-1 is a mirroring accessory cradle, an application, UX/UI, and content of the electronic device 100 may be selected or changed so as to be suitable for display characteristics (e.g., resolution) or audio characteristics (e.g., multi-channel, etc.) of the connected external device 2050. According to one embodiment, by the second accessory device 2010-2, a content or function (e.g., buff function or an avatar) associated with the corresponding game may be selected/added/changed so as to be suitable for resolution or audio characteristics supported by the first accessory device 2010-1.

Figure 21:
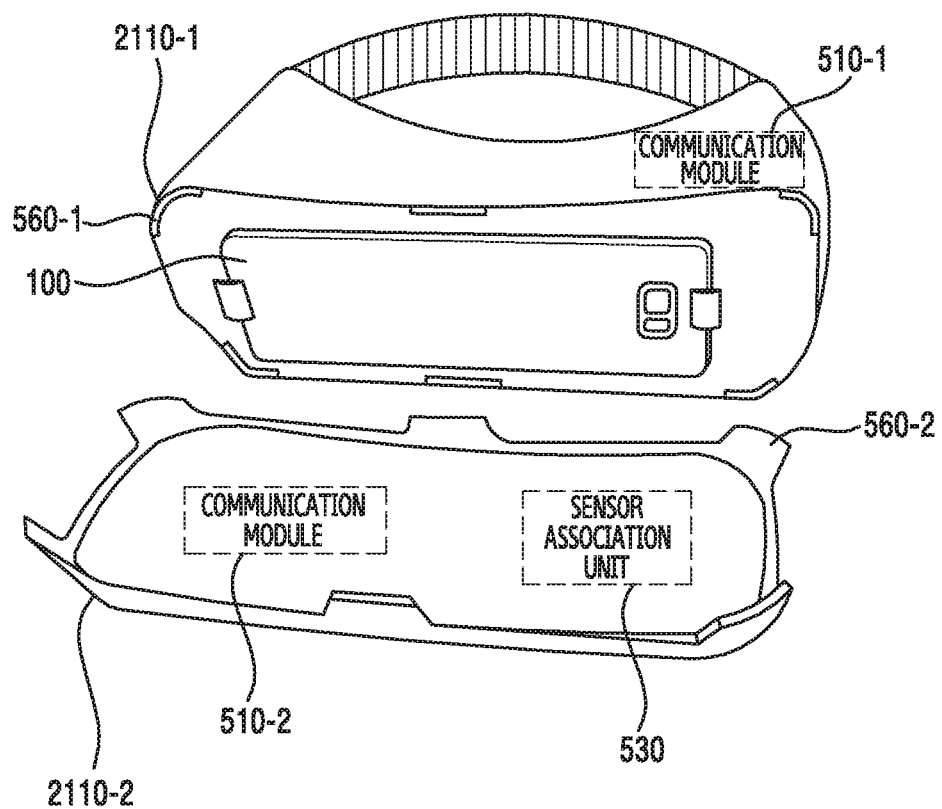
FIG. 21 illustrates a sixth example of a plurality of combinable accessory devices according to various embodiments of the disclosure.

FIG. 21 illustrates a sixth example of a plurality of combinable accessory devices according to various embodiments of the disclosure.

FIG. 21 illustrates a first accessory device 2110-1 in the form of an HMD and a second accessory device 2110-2 in the form of a cover, as a plurality of accessory devices that can be combined. For example, the first accessory device 2110-1 may include one or more accessory coupling units 560-1 which can be coupled to one or more of the electronic device 100 and the second accessory device 2110-2, and a communication module 510-1 for exchanging information with the electronic device 100. For example, the second accessory device 2110-2 may include an accessory coupling unit 560-2 that can be coupled with one or more of the first accessory device 2110-1 and the electronic device 100, and a communication module 510-2 for exchanging information with the electronic device 100 or the first accessory device 2110-1. For example, the second accessory device 2110-2 may include a sensor association unit 530 (e.g., a blocking member (e.g., a light blocking member or a conductive member) stimulating a Hall sensor) capable of stimulating a sensor module (e.g., the Hall sensor 632 or the proximity sensor 634) of the electronic device 100.

According to one embodiment, when the first accessory device 2110-1 is connected to the electronic device 100 via a wired or wireless communication means (e.g., the communication module 510-1), the electronic device 100 (e.g., the processor 610) may determine that it is in an HMD connection state. When the electronic device 100 is determined to be in the HMD connection state, the processor 610 may receive the accessory ID from the first accessory device 2110-1. For example, the processor 610 may determine the connection with the first accessory device 2110-1 based on NFC or a USB type-C, may receive the accessory ID from the first accessory device 2110-1, and may verify validity based on the accessory ID. Accordingly, a content or function in conjunction with the electronic device 100 may be provided. For example, the processor 610 may operate in a virtual reality (VR) image output mode.

According to one embodiment, when the second accessory device 2110-2 is mounted, the electronic device 100 (e.g., the processor 610) may sense the mounting of the second accessory device 2110-2 through one or more of NFC signal sensing, ear jack insertion, plug insertion, wireless connection, and signal reception of the sensor module (e.g., the Hall sensor 632 or the proximity sensor 634). According to one embodiment, the processor 610 may receive the accessory ID of the second accessory device 2110-2 via a wired or wireless communication module associated with the above-described mounting sensing means. The processor 610 may ascertain whether there is an association relationship between the first accessory device 2110-1 and the second accessory device 2110-2 or may transmit the accessory IDs to be determined by the server 120 or 130. When the association relationship is ascertained to be present, the processor 610 may provide a predetermined content or function. For example, the processor 610 may provide a stereoscopic (3D) content associated with the second accessory device 2110-2, which has been processed to match the characteristics of the VR content provided by the first accessory device 2110-1. On the other hand, when the first accessory device 2110-1 is not mounted, the processor 610 may provide a general 2D content associated with the second accessory device 2110-2 mounted to the electronic device 100. According to one embodiment, the second accessory device 2210-2 may attach and detach the NFC module (e.g., the communication module 510-2) via an additional coupling unit (not shown). For example, the second accessory device 2210-2 includes an additional coupling unit (not shown) in the form of a cardholder or a wallet and a user replaces a card with the embedded NFC module, and thereby the accessory ID of the second accessory device 2210-2 may be changed.

Figure 22:
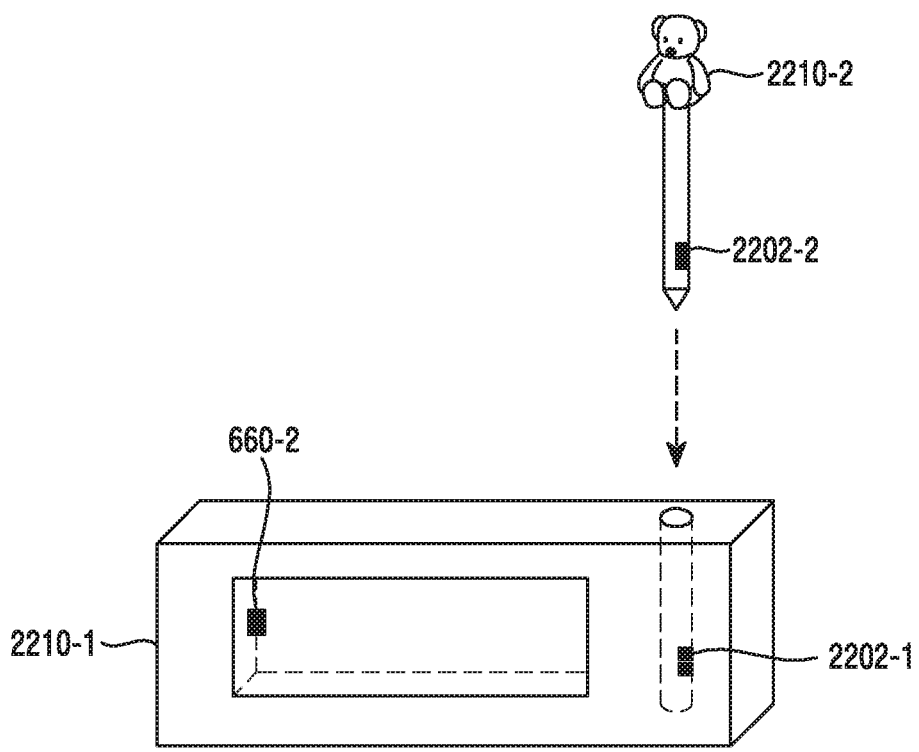
FIG. 22 illustrates a seventh example of a plurality of combinable accessory devices according to various embodiments of the disclosure.

FIG. 22 illustrates a seventh example of a plurality of combinable accessory devices according to various embodiments of the disclosure.

FIG. 22 illustrates a first accessory device 2210-1 in the form of a cradle and a second accessory device 2210-2 in the form of a pen that can be coupled to the first accessory device 2210-1, as a plurality of accessory devices that can be combined.

According to one embodiment, when the first accessory device 2210-1 is mounted (e.g., connected to the USB connector 660-2), the electronic device 100 may determine that it is in a cradle-mounted state. In this case, the electronic device 100 (e.g., the processor 610) may receive the accessory ID from the first accessory device 2210-1. For example, the processor 610 may detect the mounting of the first accessory device 2210-1 based on the NFC (not shown) and the USB type-C module 660-2, and may receive the accessory ID. The processor 610 may then provide a content or function (e.g., a character theme or a kid's theme) in conjunction with a first accessory ID.

According to one embodiment, when the second accessory device 2210-2 is mounted, the electronic device 100 (e.g., the processor 610) may detect the mounting of the second accessory device 2210-2 through one or more of an SAW sensor, an optical sensor, and electrode contact. For example, when the first accessory device 2210-1 includes a first electrode 2202-1 and the second accessory device 2210-2 includes a second electrode 2202-2, the contact of the first accessory device 2210-1 and the second accessory device 2210-2 may be detected by the contact of the first electrode 2202-1 and the second electrode 2202-2. Next, the processor 610 may receive the accessory ID from the second accessory device 2210-2. According to one embodiment, the processor 610 may ascertain whether there is an association relationship between the first accessory device 2210-1 and the second accessory device 2210-2, or may transmit the accessory IDs to be determined by the server 120 or 130. When the association relationship is ascertained to be present, the processor 610 may provide a predetermined content or function. For example, the processor 610 may provide a kid's mode in association with the first accessory device 2210-1, and the contents displayed in the kid's mode may include a content (e.g., theme, character voice audio, etc.)

associated with a character attached to the pen type of the second accessory device 2210-2.

Figure 23A:
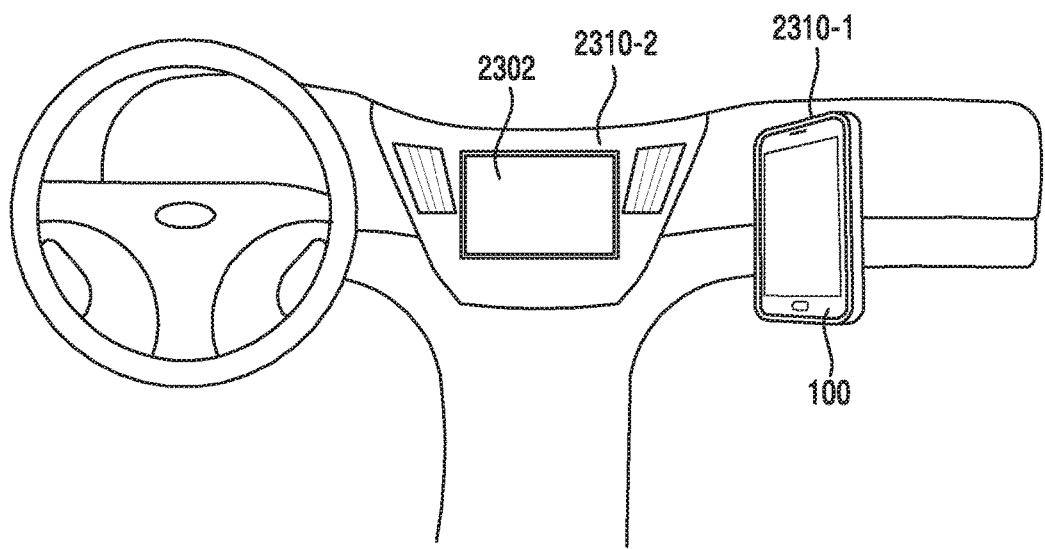
FIGS. 23A and 23B illustrate an eighth example of a plurality of combinable accessory devices according to various embodiments of the disclosure.
Figure 23B:
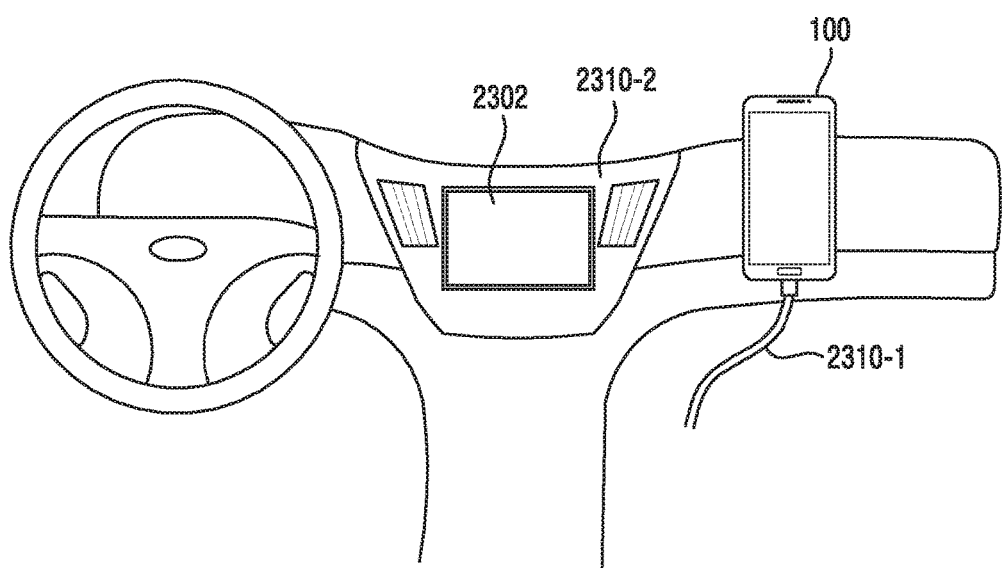

FIGS. 23A and 23B illustrate an eighth example of a plurality of combinable accessory devices according to various embodiments of the disclosure. FIGS. 23A and 23B illustrate a first accessory device 2310-1 and a vehicle-related second accessory device 2310-2, as a plurality of accessory devices that can be combined.

Referring to FIG. 23A, the first accessory device 2310-1 in the form of a cover may be mounted to the electronic device 100. The second accessory device 2310-2 is related to a vehicle, and may be a device installed in the vehicle. For example, the second accessory device 2310-2 may include a control device installed in a head unit of the vehicle. The second accessory device 2310-2 may include a display 2302 and a wireless communication module (not shown) supporting BT or the like. The electronic device 100 in which the first accessory device 2310-1 is mounted may be electrically/mechanically coupled to the second accessory device 2310-2. According to another embodiment, as shown in FIG. 23B, the first accessory device 2310-1 may be implemented in the form of a cable rather than a cover. At this time, the first accessory device 2310-1 in the form of a cable may further perform a function of connecting the electronic device 100 and the second accessory device 2310-2 in the form of a vehicle. According to still another embodiment, the first accessory device 2310-1 may have other forms such as an ear jack, a BT headset, and the like.

Figure 23C:
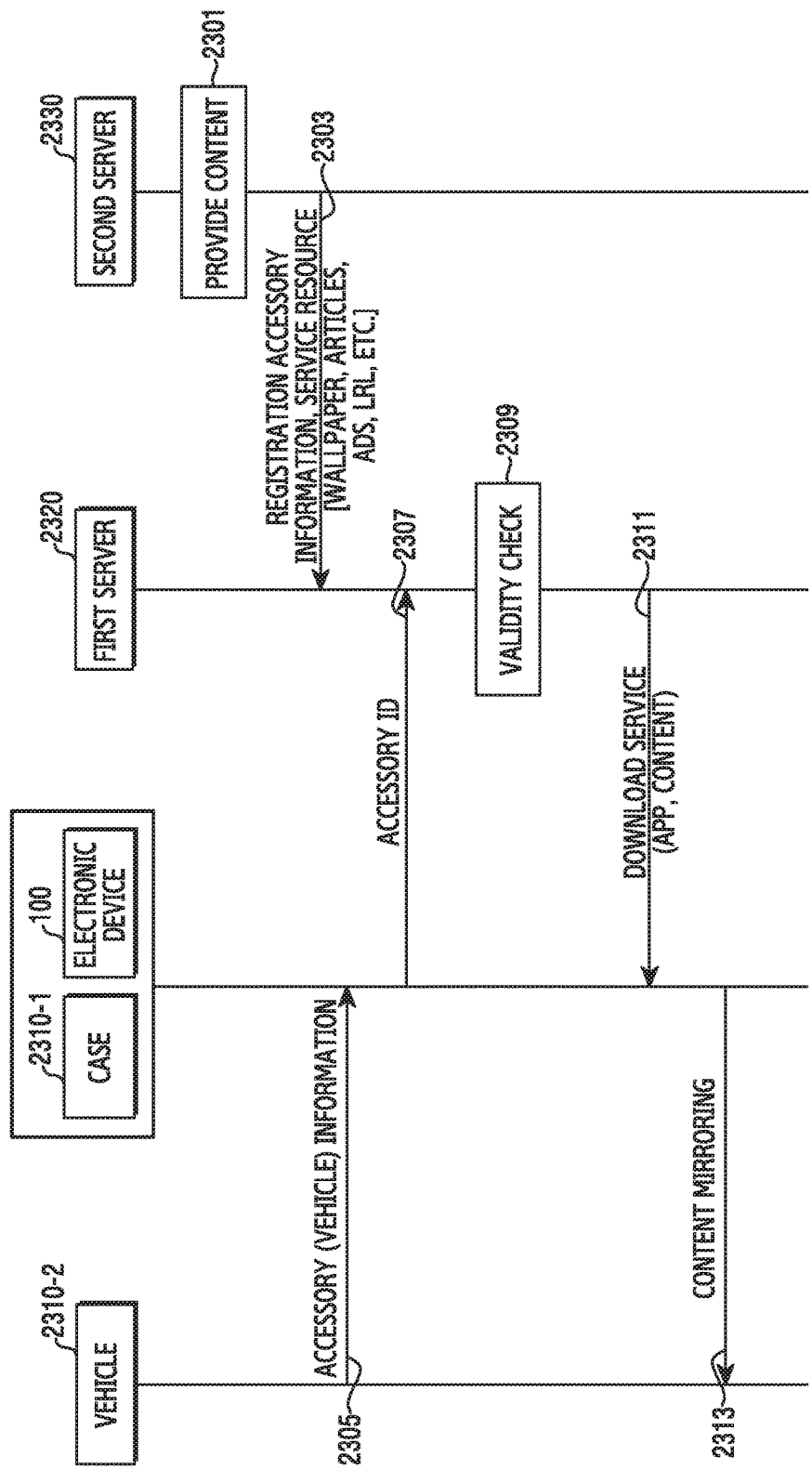
FIG. 23C illustrates an example of signal exchange for providing contents corresponding to a vehicle and accessory devices in the form of a cover according to various embodiments of the disclosure.

FIG. 23C illustrates an example of signal exchange for providing contents corresponding to a vehicle and accessory devices in the form of a cover according to various embodiments of the disclosure. FIG. 23C illustrates an operation of providing a new function via the accessory device 2310-2 in the form of a vehicle connected to the electronic device 100.

Referring to FIG. 23C, in operation 2301, the second server 2330 according to one embodiment may provide contents. The second server 2330 may be a server for managing the contents, and may be referred to as a third party server. In operation 2303, the second server 2330 according to one embodiment may transmit registration accessory information and service resources to the first server 2320. For example, the service resource may include one or more of a wallpaper, a feature, personalized feature information, an advertisement, an application package (APK) file, and URL information.

In operation 2305, the electronic device 100 in which the first accessory device 2310-1 according to one embodiment is mounted may receive the accessory ID (e.g., accessory type or related information) of the second accessory device 2310-2 from the second accessory device 2310-2. For example, the type or related information of the second accessory device 2310-2 may be transmitted via an accessory manager installed in the second accessory device 2310-2.

In operation 2307, the electronic device 100 (e.g., the processor 610) in which the first accessory device 2310-1 according to one embodiment is mounted may transmit received information to the first server 2320. For example, the processor 610 may transmit the accessory ID of the first accessory device 2310-1 to the first server 2320 via the communication module 640 of the electronic device 100. For example, the processor 610 may transmit the accessory ID of the second accessory device 2310-2 received from the second accessory device 2310-2 to the first server 2320.

In operation 2309, according to one embodiment, the electronic device 100 or the first server 2320 may perform validity check. At this time, the electronic device 100 or the first server 2320 may ascertain model information, specification information, and the like of the second accessory device 2310-2 from the accessory ID (e.g., service ID field) of the second accessory device 2310-2. The electronic device 100 (e.g., the processor 610) or the first server 2320 may determine whether there is an association relationship between the accessory ID (e.g., service ID) of the first accessory device 2310-1 and the accessory ID of the second accessory device 2310-2. For example, the electronic device 100 (e.g., the processor 610) or the first server 2320 may determine whether the model information, the specification information, and the like included in the accessory ID of the second accessory device 2310-2 are included in the accessory ID of the first accessory device 2310-1. For example, the electronic device 100 (e.g., the processor 610) or the first server 2320 may determine whether there is the association relationship between the accessory ID of the first accessory device 2310-1 and the accessory ID of the second accessory device 2310-2 using the accessory information DB 106 or 126. When validity is ascertained through whether authentication on the accessory device is successful, whether the accessory ID is registered in the accessory information DB, or whether the association relationship is present or absent, the electronic device 100 (e.g., the processor 610) or the first server 2320 may determine a device to which the corresponding content and function is to be provided.

In operation 2311, the first server 2320 according to one embodiment may transmit a new application or content for services to the electronic device 100 equipped with the first accessory device 2310-1. The content (e.g., wallpaper, information of the second accessory device 2310-2, APK file, URL information, advertisement, etc.) to be provided to the electronic device 100 (e.g., the processor 610) or the second accessory device 2310-2 may be selectively provided to one or more of the electronic device 100 and the second accessory device 2310-2 by the second server 2330 through the first server 2320. For example, when the accessory ID of the first accessory device 2310-1 is valid, the first server 2320 may provide a content associated with the electronic device 100 (operating system, resolution, etc.) to the electronic device 100, and when validity check on the accessory ID of the second accessory device 2310-2 has been performed, the first server 2320 may also provide a content associated with the second accessory device 2310-2.

In operation 2313, the electronic device 100 (e.g., the processor 610) equipped with the first accessory device 2310-1 according to one embodiment may transmit a signal (e.g., a control signal or a content for mirroring) for displaying a content to the second accessory device 2310-2. For example, the content displayed on a display (e.g., the display 360) of the electronic device 100 and the content displayed on the display 2302 of the second accessory device 2310-2 may provide similar functions, but may be different contents (e.g., a GUI having different resolutions or colors or audio corresponding to speaker characteristics) processed to be suitable for each hardware characteristic.

Figure 23D:
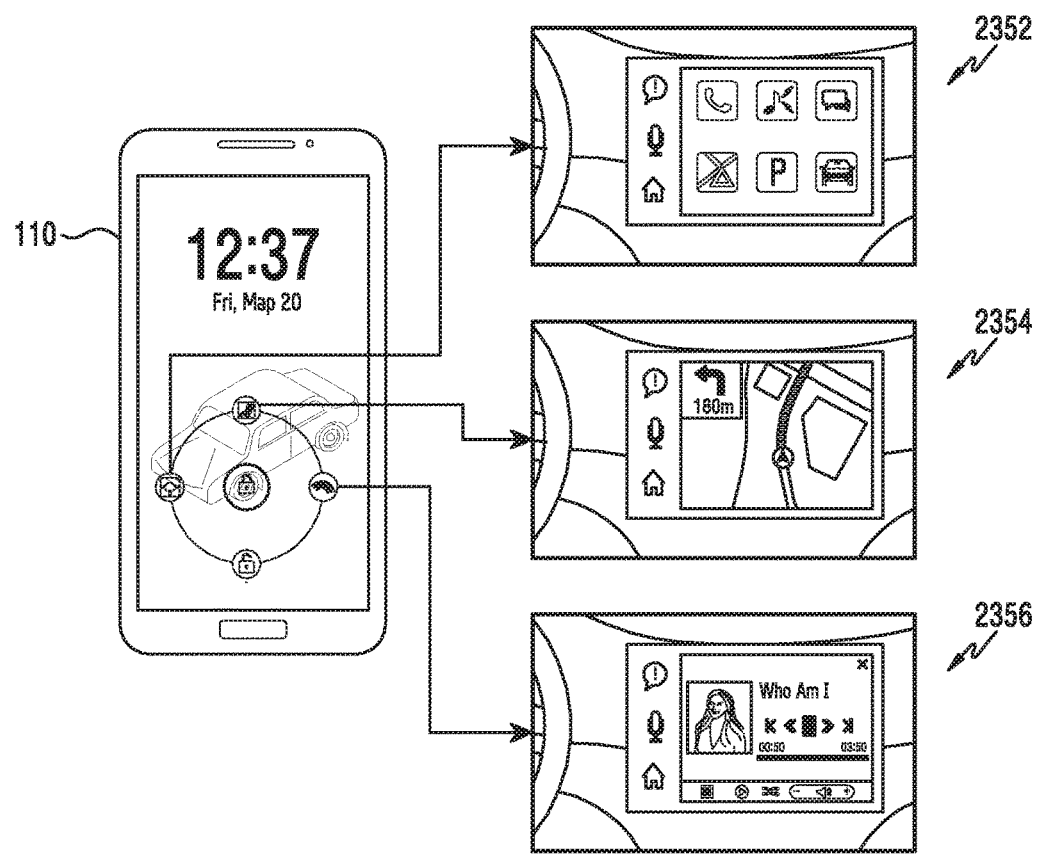
FIGS. 23D and 23E illustrate examples of contents corresponding to a vehicle and accessory devices in the form of a cover according to various embodiments of the disclosure.
Figure 23E:
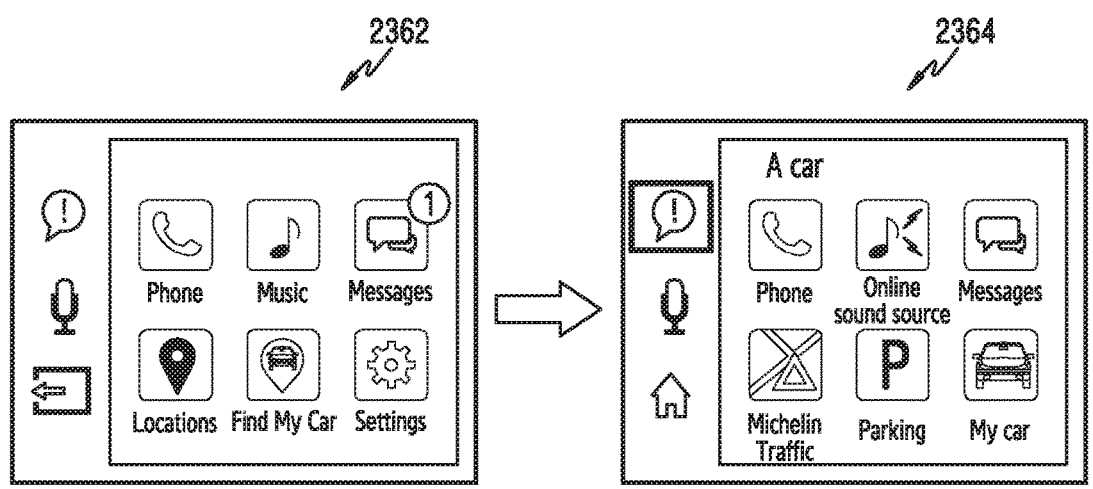

FIGS. 23D and 23E illustrate examples of contents corresponding to a vehicle and accessory devices in the form of a cover according to various embodiments of the disclosure.

According to another embodiment, the electronic device 100 (e.g., the processor 610) and the second accessory device 2310-2 may provide different contents. For example, as shown in FIG. 23D, when validity check is successful, a wallpaper including an image of the corresponding vehicle model and application menus (e.g., map, navigation, vehicle management, etc.) associated with a vehicle may be provided from a lock screen of the electronic device 100, and the display 2302 of the second accessory device 2310-2 may display a screen 2352, 2354 or 2356 for a selected function through the menu. For example, when navigation is selected in the UI of the electronic device 100, the second accessory device 2310-2 may display a navigation screen 2354 by executing the navigation. For example, the navigation application may be executed by the second accessory device 2310-2. As another example, the navigation application may be executed by the electronic device 100 (e.g., the processor 610), and the processor 610 may process a navigation-related content to be displayed on the display 2302 of the second accessory device 2310-2 and may transmit the processed content to the second accessory device 2310-2. Alternatively, as shown in FIG. 23E, the second accessory device 2310-2 may be connected to the electronic device 100, so that an interface displayed on the head unit of the vehicle may be changed. That is, when the second accessory device 2310-2 is directly connected to the electronic device 100 or connected thereto via the first accessory device 2310-1, the wallpaper of the screen displayed on the vehicle's display 2302 may be changed from the previous screen 2362 to a screen 2364 provided through the electronic device 100, and a new application (e.g., online music source search or vehicle management) instead of the previously displayed application (e.g., sound source or configuration) may be displayed. The new application may provide a function that is similar to an existing application but is optimized for the corresponding vehicle.

According to the embodiment of FIG. 23C, the electronic device 100 may download the corresponding content after validity check has been performed successfully. According to another embodiment, the electronic device 100 may download data associated with the corresponding application or service from the first server 2320 in advance, and then may instruct the execution of an operation of the corresponding application or service when validity check is performed successfully.

Figure 24:
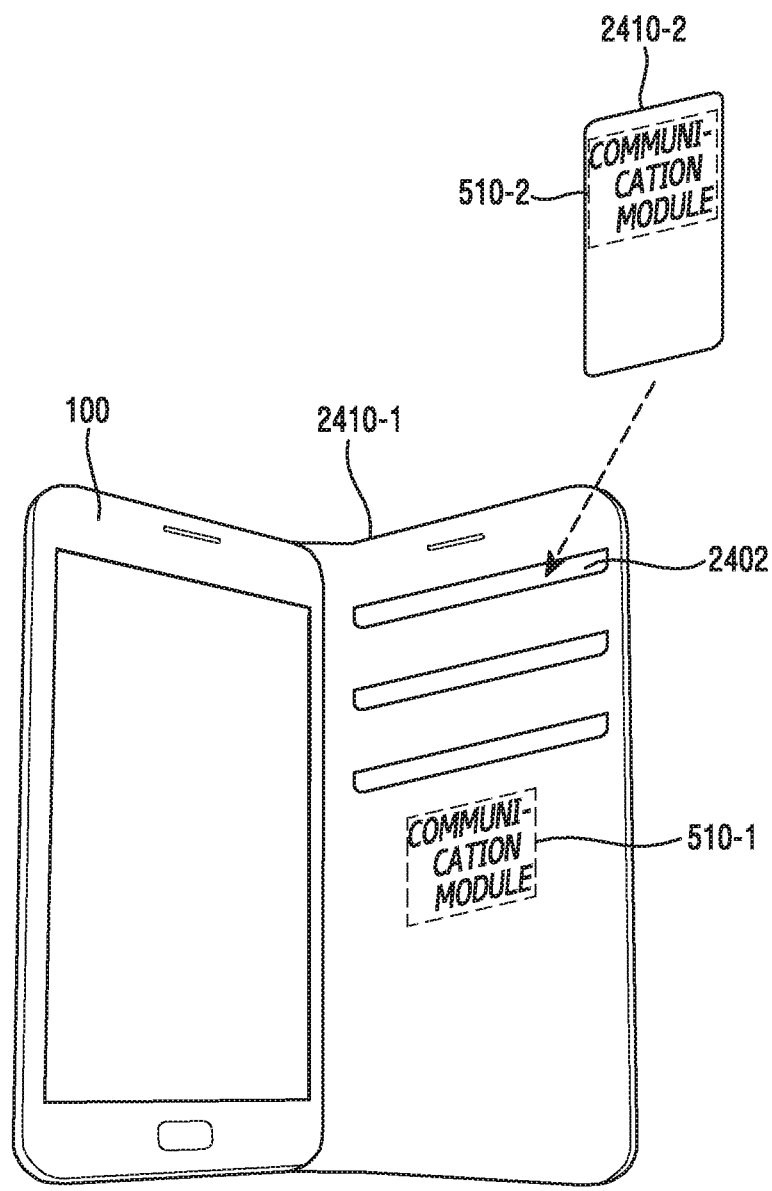
FIG. 24 illustrates a ninth example of a plurality of combinable accessory devices according to various embodiments of the disclosure.

FIG. 24 illustrates a ninth example of a plurality of combinable accessory devices according to various embodiments of the disclosure. FIG. 24 illustrates a first accessory device 2410-1 in the form of a cover with a holder and a second accessory device 2410-2 in the form of a card that can be inserted into the holder, as a plurality of accessory devices that can be combined.

Referring to FIG. 24, the first accessory device 2410-1 according to various embodiments may have the form of a cover including a holder 2402 capable of accommodating a credit card or a point card, together with the communication module 510-1 capable of transmitting the accessory ID to the electronic device. The second accessory device 2410-2 in the form of a card having the built-in communication module 510-2 (e.g., NFC module) may be mounted to the holder 2402 of the first accessory device 2410-1. The communication module 510-2 (e.g., NFC module) may store accessory information (e.g., accessory ID) about the second accessory device 2410-2.

According to one embodiment, the electronic device 100 may perform a function associated with a predetermined payment application (e.g., payment 485) by the first accessory device 2410-1. For example, the first accessory device 2410-1 may include an accessory rear portion having an accessory coupling portion 560 that is coupled to the electronic device 100 as shown in FIG. 24, an accessory front portion for covering and protecting a front housing of the electronic device 100, and a foldable portion that connects the accessory front portion and the accessory rear portion and can be easily folded. At this time, the front portion and the rear portion can be folded in the front or rear direction using the foldable portion. The first accessory device 2410-1 may be coupled to the electronic device 100, and the accessory front portion may cover the front portion of the electronic device 100 or may be folded to abut or contact the accessory rear portion in the opposite direction. For example, when the rear portion of the first accessory device 2410-1 is coupled to the electronic device 100, or when the front portion is folded adjacent to or in contact with the rear portion, the processor of the electronic device 100 may receive the accessory ID of the first accessory device 2410-1. For example, when the front portion of the first accessory device 2410-1 is folded to be adjacent to or in contact with the rear portion, the processor of the electronic device 100 may receive the accessory ID of the second accessory device 2410-2.

According to one embodiment, a payment application may be executed by the electronic device 100 that has received the accessory ID of the first accessory device 2410-1, and the electronic device 100 may receive authentication and payment information (e.g., a credit card number or a virtual account number) by the accessory ID of the first accessory device 2410-1 and may transmit the received information to a server for financial services.

According to one embodiment, the electronic device 100 may authenticate the accessory ID of the second accessory device 2410-2 via an associated server (e.g., the first server 120) and may provide an additional service based on the two accessory IDs. For example, when an association relationship therebetween is ascertained, additional services such as discount service, additional point accumulation, extension of installment period, etc. may be provided. Further, a third accessory device (not shown) in the form of a card may be further mounted. In this case, a service according to the association relationship of the second accessory device 2410-2 and the third accessory device (not shown) may be further provided. For example, the association relationship may be determined based on whether two cards are associated with an affiliate card service, an affiliate store, an affiliate online shopping mall, an affiliate product, or the like.

According to one embodiment, the first accessory device 2410-1, which is a cover including an accessory coupling unit (e.g., a plurality of holders 2402), may include a sensor association portion (not shown). The sensor association unit (not shown) may stimulate the sensor module (e.g., the sensor module 630) of the electronic device 100 to enable the processor 610 of the electronic device 100 to detect the opening and closing of the cover, and the processor 610 may receive a plurality of accessory IDs from NFC cards (e.g., the second accessory device 2410-2) stored in the accessory coupling unit. At this time, the processor 610 may determine the association relationships corresponding to the respective NFC cards, and may provide the content or function according to the association relationship.

According to the various embodiments described above, a content corresponding to a combination of a plurality of accessory devices may be provided. According to another embodiment, three or more accessory devices may be provided as one package.

Figure 25:
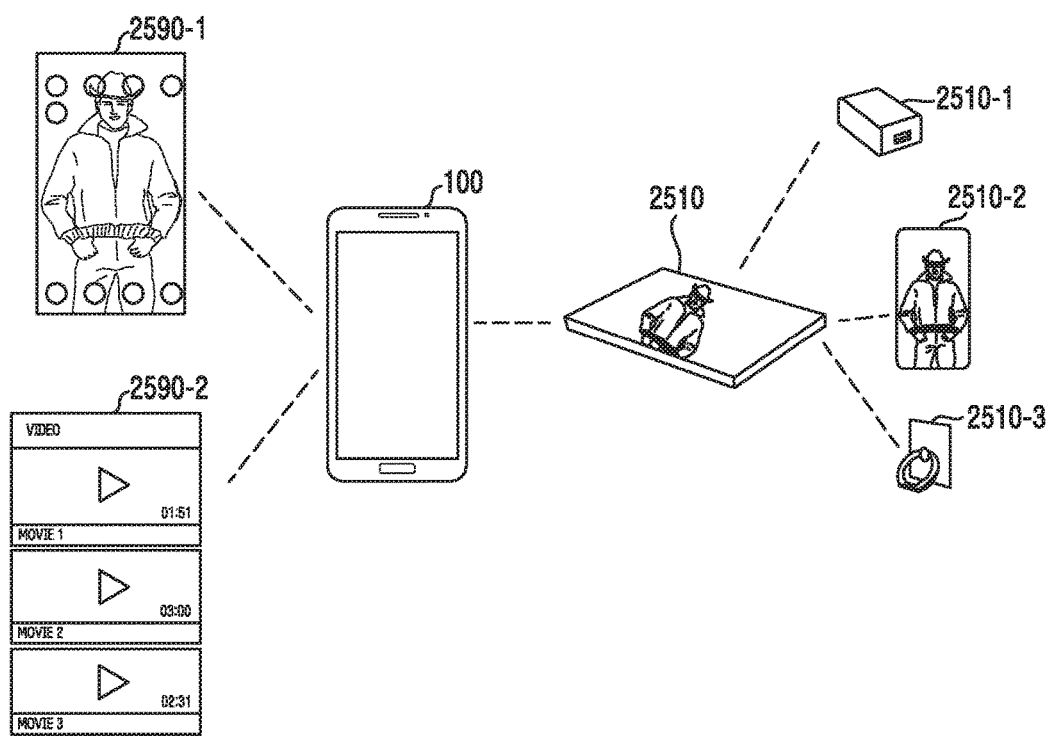
FIG. 25 illustrates a first example of package configuration of accessory devices according to various embodiments of the disclosure.

FIG. 25 illustrates a first example of package configuration of accessory devices according to various embodiments of the disclosure.

Referring to FIG. 25 illustrates a package 2510 including a plurality of accessory devices 2510-1 to 2510-3 and related contents 2590-1 and 2590-2. The package 2510 for the electronic device 100 may be constituted of a cover type accessory device 2510-1, a battery type accessory device 2510-2, and a cradle (e.g., ring) type accessory device 2510-3, and can be sold. When one or more accessory devices 2510-1, 2510-2, or 2510-3 configured as the package 2510 are mounted to the electronic device 100, the contents 2590-1 and 2590-2 (e.g., a theme change, a trailer video, a private video, or a preview ticket) may be provided. According to one embodiment, the contents provided by each of the accessory devices 2510-1 to 2510-3 included in one package 2510 may be different or the same. For example, a first theme may be applied when the cover type accessory device 2510-1 is mounted, and a second theme may be applied when the cradle type (e.g., ring) accessory device 2510-3 is mounted.

Figure 26:
FIG. 26 illustrates an example of lifetime of content provided by an accessory device according to various embodiments of the disclosure.
Figure 26:
Figure 26:
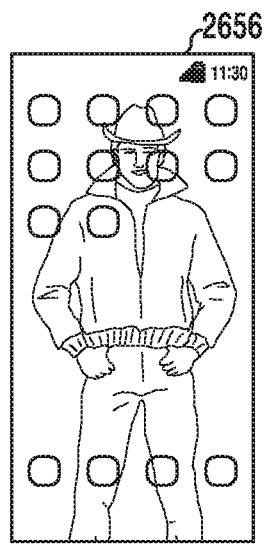
Figure 26:
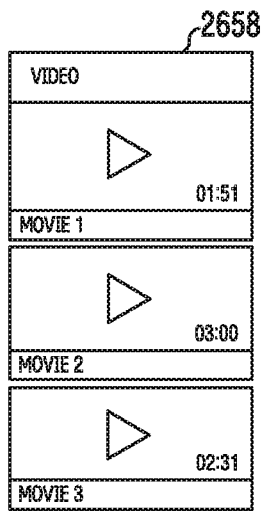
Figure 26:

FIG. 26 illustrates an example of lifetime of content provided by an accessory device according to various embodiments of the disclosure. FIG. 26 sequentially illustrates contents provided according to a lifetime from the mounting of the accessory device (e.g., accessory device 110) to the removal thereof.

Referring to FIG. 26, a screen associated with the content of the accessory device may be displayed in a welcome state 2652, and at least at the same time, the electronic device 100 may perform an operation of authentication and downloading authentication and content/function/policy. In a lock screen state 2654 and a theme state 2656, a changed screen at the time of locking and unlocking the electronic device 100 may be displayed. In a video viewer state 2658, an additional content associated with the mounting of the accessory device may be provided. When the accessory device is removed from the electronic device 100, in a goodbye state 2660, the corresponding screen (associated with the accessory device content) may be displayed, and the content and function such as a lock screen, theme, or the like applied to the electronic device 100 may be released or deleted. The screen or text displayed in the welcome state 2652 and the goodbye state 2660 may be stored in the memory of the accessory device and may be configured to be provided to the electronic device 100 even before the electronic device 100 download the content from the server (e.g., the server 120 or 130) or even after the content is deleted from the electronic device 100.

Figure 27:
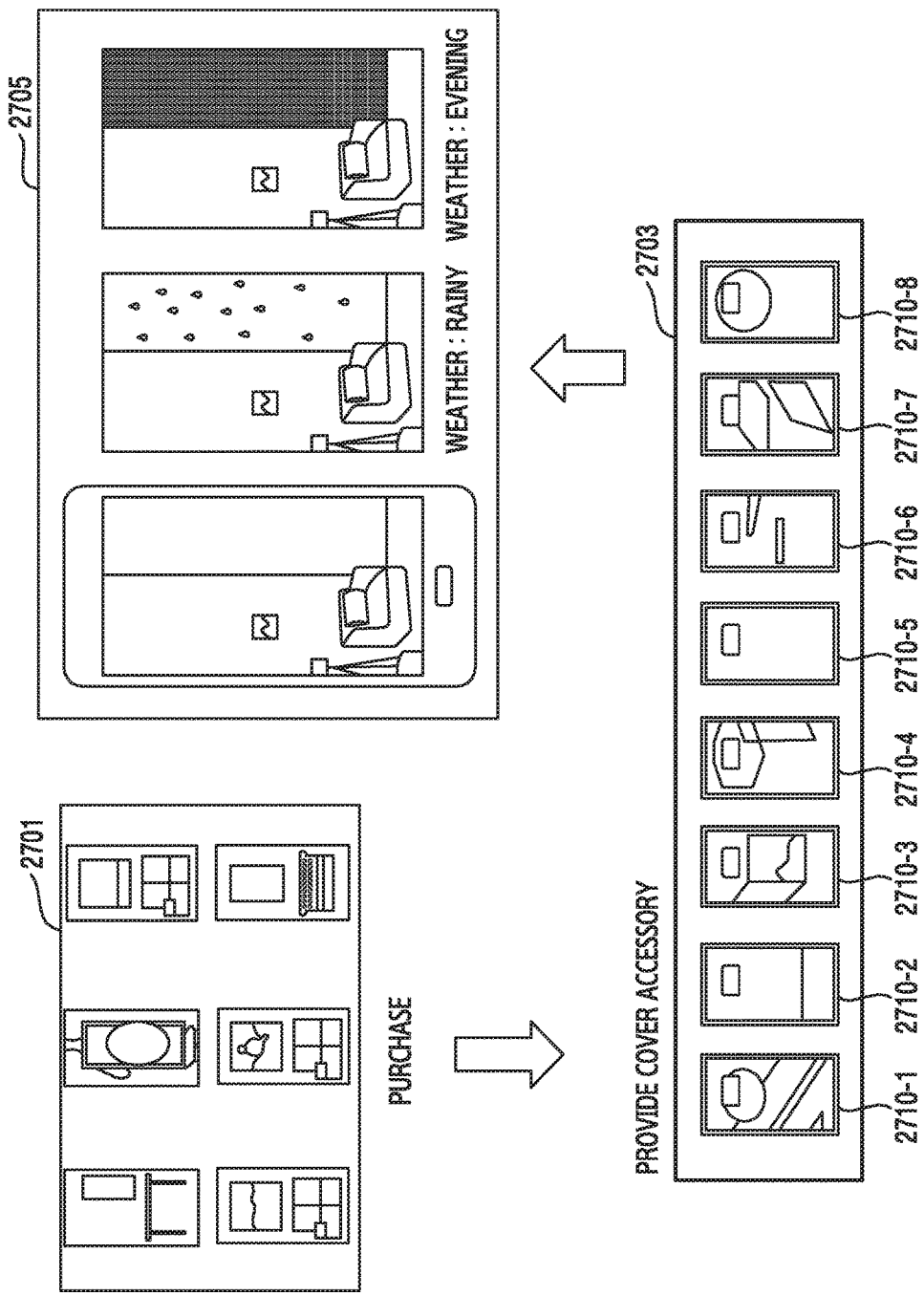
FIG. 27 illustrates a second example of package configuration of accessory devices according to various embodiments of the disclosure.

FIG. 27 illustrates a second example of package configuration of accessory devices according to various embodiments of the disclosure. Unlike the other embodiments in which the corresponding content is provided according to the selection of the accessory device, the embodiment of FIG. 27 may differ from the previous embodiments in that a user directly selects and purchases the corresponding content (e.g., a theme to be displayed on the screen) and various accessories devices 2710-1 to 2710-8 are provided according to the purchased content. For example, when a user purchases a product in operation 2701, cover type accessory devices 2710-1 to 2710-8 are provided in operation 2703. The plurality of accessory devices 2710-1 to 2710-8 that can provide the content selected by the user may provide the same content when they are mounted to the electronic device, and may provide a unique additional content for each corresponding accessory device in addition to the content selected by the user in operation 2705. For example, upon the mounting of any cover accessory device, the electronic device may provide different screens displayed on the display depending on the weather (e.g., sunny, rain, or wind). Upon the mounting of any other cover accessory device, the electronic device may provide different screens displayed on the display depending on time (e.g., morning, lunch, or evening).

Figure 28:
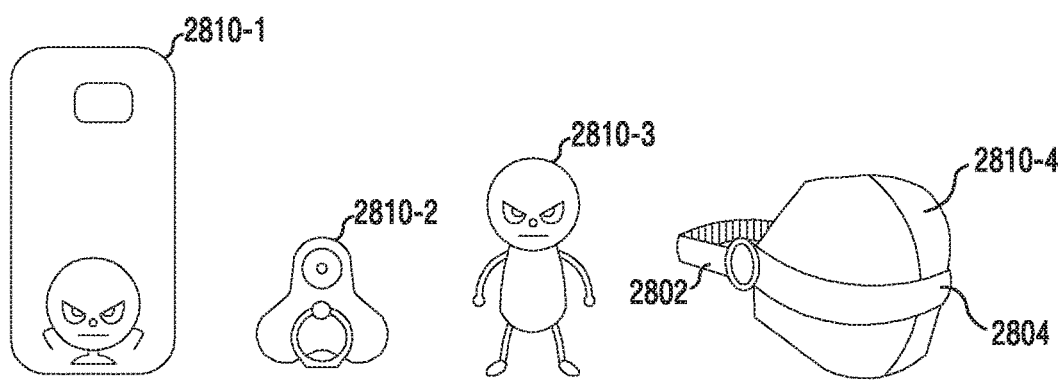
FIG. 28 illustrates a third example of package configuration of accessory devices according to various embodiments of the disclosure.

FIG. 28 illustrates a third example of package configuration of accessory devices according to various embodiments of the disclosure. FIG. 28 illustrates a package including an accessory device 2810-4 which is variably operable, as a configuration of a package including accessory devices 2810-1 to 2810-4.

Referring to FIG. 28, one accessory device 2810-4 of the plurality of accessory devices 2810-1 to 2810-4 included in the package is variably shaped and may be configured to provide different functions depending on the changed type. For example, the accessory device 2810-4 may provide a VR function and may include a fixing portion 2802 fixed to a user's head and a mechanism portion 2804 which can be vertically opened and closed. During execution of a game through the VR function, the accessory device 2810-4 may provide a first function in the currently executed game in a state in which the mechanism portion 2804 (e.g., an area corresponding to the eye part of a mask) is tilted upward, and may provide a second function (e.g., a function of enhancing game character's ability value) different from the first function in a state in which the mechanism portion 2804 is brought down and closed.

Figure 29:
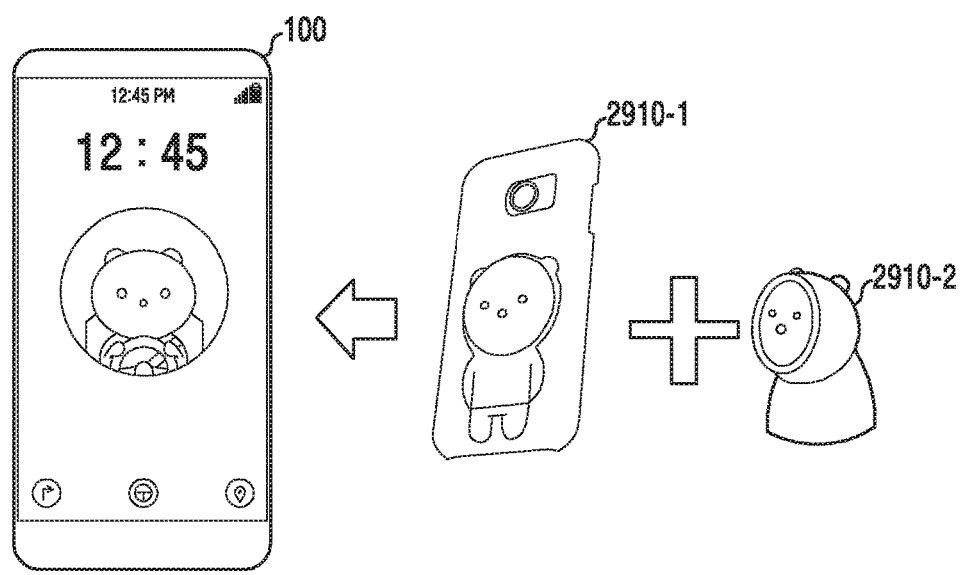
FIG. 29 illustrates a fourth example of package configuration of accessory devices according to various embodiments of the disclosure.

FIG. 29 illustrates a fourth example of package configuration of accessory devices according to various embodiments of the disclosure. FIG. 29 illustrates function provision of the electronic device 100 equipped with a plurality of accessory devices 2910-1 and 2910-2 included in a package.

Referring to FIG. 29, when the electronic device 100 is coupled to a cover type accessory device 2910-1 and an electronic device cradle for a car type accessory device 2910-2, the electronic device 100 may change the corresponding screen into a screen associated with driving of a vehicle. For example, the electronic device 100 may change a wallpaper into a driving character screen and may provide shortcuts for a function such as driving-related map or navigation, thereby helping a user to easily perform operations.

Figure 30:
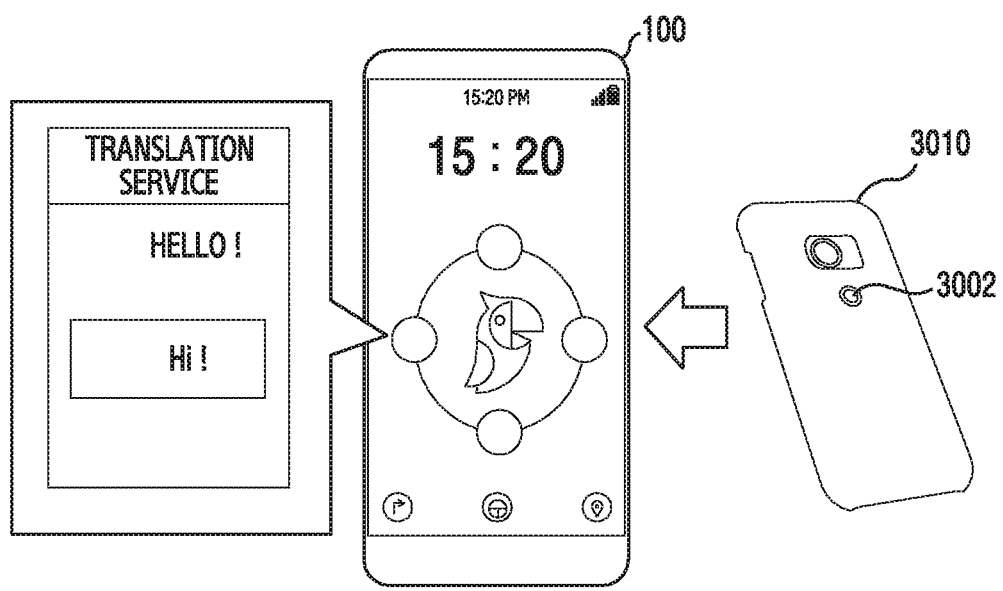
FIG. 30 illustrates an example of an execution method of a function corresponding to an accessory device according to various embodiments of the disclosure.

FIG. 30 illustrates an example of an execution method of a function corresponding to an accessory device according to various embodiments of the disclosure. FIG. 30 illustrates function provision of the electronic device 100 via a button 3002 included in an accessory device 3010.

Referring to FIG. 30, the cover type accessory device 3010 mounted to the electronic device 100 may include a separate button 3002. The button 3002 may be configured to help quick execution of the corresponding application. According to one embodiment, when the button 3002 is detected to be pressed, the electronic device 100 may provide a function associated with the accessory device 3010. For example, when the button 3002 of the accessory device 3010 is pressed, the electronic device 100 may execute a real time translation application.

The term "module" as used herein may include a unit consisting of hardware, software, or firmware, and may, for example, be used interchangeably with the term "logic", "logical block", "component", "circuit", or the like. The "module" may be an integrated component, or a minimum unit for performing one or more functions or a part thereof. The "module" may be mechanically or electronically implemented and may include, for example, an application-specific integrated circuit (ASIC) chip, a field-programmable gate arrays (FPGA), or a programmable-logic device, which has been known or are to be developed in the future, for performing certain operations. At least some of devices (e.g., modules or functions thereof) or methods (e.g., operations) according to various embodiments may be implemented by an instruction which is stored a computer-readable storage medium (e.g., the memory 230) in the form of a program module. The instruction, when executed by a processor (e.g., the processor 120), may cause the one or more processors to execute the function corresponding to the instruction. The computer-readable storage medium may include a hard disk, a floppy disk, a magnetic medium (e.g., a magnetic tape), an optical media (e.g., compact disc (CD)-ROM, DVD), a magneto-optical media (e.g., a floptical disk), an inner memory, etc. The instruction may include a code made by a complier or a code that can be executed by an interpreter. The programming module according to the disclosure may include one or more of the aforementioned components or may further include other additional components, or some of the aforementioned components may be omitted. Operations performed by a module, a programming module, or other elements according to various embodiments may be executed sequentially, in parallel, repeatedly, or in a heuristic manner. At least some operations may be executed according to another sequence, may be omitted, or may further include other operations.

In the above-described specific embodiments of the disclosure, an element included in the electronic device has been expressed in the singular or the plural according to the presented specific embodiments. However, the singular form or plural form is selected for convenience of description suitable for the presented situation, and various embodiments of the disclosure are not limited to a single element or multiple elements thereof. Further, either multiple elements expressed in the description may be configured into a single element or a single element in the description may be configured into multiple elements.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
    a communication interface;
    at least one processor configured to be connected to the communication interface; and
    a memory connected to the at least one processor,
    wherein the memory stores instructions that instruct the at least one processor to:
        perform validity check on a first accessory device in response to detection of mounting of the first accessory device,
        determine a first content corresponding to the first accessory device, and
        provide a second content corresponding to a combination of the first accessory device and a second accessory device having an association relationship with the first accessory device, in response to detection of mounting of the second accessory device.

2. The electronic device of claim 1, further comprising:
    at least one sensor configured to be connected to the at least one processor,
    wherein the instructions further instruct the at least one processor to:
        wake up in response to an interruption caused in response to detection of a predefined signal by the at least one sensor during operation in a sleep mode, and
        recognize mounting or dismounting of the first accessory device or the second accessory device by receiving a signal from the first accessory device or the second accessory device through the communication interface.

3. The electronic device of claim 1, wherein the instructions further instruct the at least one processor to:
    control the communication interface so that signals of different types are received in a plurality of time intervals;
    recognize the first accessory device based on a first signal of a first type received in a first time interval among the plurality of time intervals; and
    recognize the second accessory device based on a second signal of a second type received in a second time interval among the plurality of time intervals.

4. The electronic device of claim 1, wherein the instructions further instruct the at least one processor to:
    transmit at least a part of accessory-related information received from the second accessory device to a server and to ascertain whether the second accessory device is registered by receiving a response;
    ascertain presence or absence of the association relationship between the first accessory device and the second accessory device based on the accessory-related information; and
    download a content corresponding to the combination of the first accessory device and the second accessory device when the association relationship is present.

5. The electronic device of claim 4, wherein the instructions further instruct the at least one processor to ascertain the presence or the absence of the association relationship based on at least one of service IDs (identifiers) indicating accessory types of the first accessory device and the second accessory device, service classification types corresponding to the first accessory device and the second accessory device, or client codes of the first accessory device and the second accessory device.

6. The electronic device of claim 4, wherein the memory stores information about the association relationship between the first accessory device and the second accessory device.

7. The electronic device of claim 2,
    wherein the at least one sensor includes at least one of a first sensor for sensing an approach of the first accessory device and a second sensor for sensing an approach of the second accessory device, and
    wherein the second sensor is installed at a position different from that of the first sensor.

8. The electronic device of claim 1,
    wherein the first accessory device is a cover mountable to the electronic device,
    wherein the second accessory device includes a detachable structure from the first accessory device, and
    wherein the second content includes one or more of contents dependent on the first content.

9. The electronic device of claim 1,
    wherein the first accessory device comprises a cover mountable to the electronic device,
    wherein the second accessory device has a form of a figure that can be tagged to the first accessory device, and
    wherein the second content includes one or more of contents dependent on the first content.

10. The electronic device of claim 1,
    wherein the first accessory device comprises a cover mountable to the electronic device or a cable connectable to the electronic device, wherein the second accessory device comprises a head unit of a vehicle connectable to the electronic device via a wireless channel or the cable, wherein the first content includes a content associated with a model of the vehicle, and wherein the second content allows an interface displayed on a display provided in the head unit to be changed.

11. An operation method of an electronic device, the operation method comprising:

performing a validity check on a first accessory device in response to detection of mounting of the first accessory device;

determining a first content corresponding to the first accessory device;

performing a validity check on a second accessory device having an association relationship with the first accessory device, in response to detection of mounting of the second accessory device; and providing a second content corresponding to a combination of the first accessory device and the second accessory device.

12. The operation method of claim 11, further comprising:

waking-up the electronic device in response to an interruption caused in response to detection of a predefined signal by a sensor during operation in a sleep mode; and recognizing mounting or dismounting of the first accessory device or the second accessory device by receiving a signal from the first accessory device or the second accessory device.

13. The operation method of claim 11, further comprising:

transmitting at least a part of accessory-related information received from the second accessory device to a server;

ascertaining whether the second accessory device is registered based on a response from the server;

ascertaining presence or absence of an association relationship between the first accessory device and the second accessory device based on the accessory-related information; and downloading a content corresponding to a combination of the first accessory device and the second accessory device when the association relationship is present, wherein the presence or absence of the association relationship is ascertained based on at least one of service IDs (identifiers) indicating accessory types of the first accessory device and the second accessory device, service classification types corresponding to the first accessory device and the second accessory device, or client codes of the first accessory device and the second accessory device.

* * * * *